(12) United States Patent
Kanzaki et al.

(10) Patent No.: US 8,918,257 B2
(45) Date of Patent: *Dec. 23, 2014

(54) TRANSMISSION CONTROL APPARATUS AND ADJUSTMENT METHOD FOR OUTPUT CHARACTERISTIC THEREOF

(71) Applicant: Mitsubishi Electric Corporation, Chiyoda-ku, Tokyo (JP)

(72) Inventors: Shozo Kanzaki, Chiyoda-ku (JP); Fumiaki Arimai, Chiyoda-ku (JP); Hiroyoshi Nishizaki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 38 days.

This patent is subject to a terminal disclaimer.

(21) Appl. No.: 13/709,229

(22) Filed: Dec. 10, 2012

(65) Prior Publication Data

US 2013/0327423 A1    Dec. 12, 2013

(30) Foreign Application Priority Data

Jun. 12, 2012  (JP) ................................ 2012-132523

(51) Int. Cl.
*G06F 7/00* (2006.01)
*F16H 61/06* (2006.01)
*F16H 61/02* (2006.01)
*F16H 59/68* (2006.01)
*F16H 61/00* (2006.01)

(52) U.S. Cl.
CPC .......... *F16H 61/061* (2013.01); *F16H 61/0251* (2013.01); *F16H 2059/683* (2013.01); *F16H 2061/0053* (2013.01); *F16H 2342/10* (2013.01)
USPC ................. 701/51; 701/61; 701/87; 701/95; 180/336; 180/337; 180/441; 477/13; 477/156; 477/31; 477/34; 477/95; 192/3.51; 192/58.8; 192/85.63; 192/215; 192/220.4; 137/487.5

(58) Field of Classification Search
CPC ........... F16H 61/0251; F16H 2342/10; F16H 2061/0258; F16H 61/061; F16H 61/143; F16H 2061/1284; Y10S 477/906
USPC .......... 701/51, 61, 87, 95; 180/336, 337, 441, 180/442; 192/215, 220.4, 3.51, 58.8, 85.63; 477/15, 156, 31, 34, 45, 50, 95, 63, 65, 477/131, 906; 137/487.5
See application file for complete search history.

(56) References Cited

U.S. PATENT DOCUMENTS

| 4,414,863 | A  | * | 11/1983 | Heino .............................. 477/63 |
| 5,995,356 | A  | * | 11/1999 | Glavmo et al. ............... 361/154 |
| 6,089,364 | A  | * | 7/2000  | Kunii .......................... 192/85.63 |
| 8,392,077 | B1 | * | 3/2013  | Kanzaki et al. ................. 701/51 |

FOREIGN PATENT DOCUMENTS

JP  2007-265395 A  10/2007
JP  2010-242806 A  10/2010

* cited by examiner

*Primary Examiner* — Gertrude Arthur Jeanglaude
(74) *Attorney, Agent, or Firm* — Sughrue Mion, PLLC; Richard C. Turner

(57) ABSTRACT

In a linear solenoid 107n, an electromagnetic coil 71n, a pressure sensor 72n, and label resistors 73n and 74n for correcting an inherent variation in a pressure detection characteristic are integrated; the standard characteristic of the pressure sensor 72n is stored in a control module 120M; when driving is started, the resistance values of the label resistors 73n and 74n are read, the pressure detection characteristic of the utilized pressure sensor 72n is corrected, and an excitation current for the electromagnetic coil 71n is controlled in such a way that a target adjusted hydraulic pressure is obtained. Even when due to a change in the oil temperature, the valve opening characteristic of the linear solenoid 107n changes, the adjusted hydraulic pressure is controlled to be constant.

19 Claims, 29 Drawing Sheets

FIG. 8

| B10 | B9 | B8 | B7 | B6 | B5 | B4 | B3 | B2 | B1 |
|---|---|---|---|---|---|---|---|---|---|
| BLANK | 256 | 128 | 64 | 32 | 16 | 8 | 4 | 2 | 1 |

| GRADIENT COEFFICIENT | | | | | | | | BLANK | ADJUSTMENT COEFFICIENT | |
|---|---|---|---|---|---|---|---|---|---|---|
| (8) 111 1.04 | (7) 110 1.03 | (6) 101 1.02 | (5) 100 1.01 | (4) 011 1.00 | (3) 010 0.99 | (2) 001 0.98 | (1) 000 0.97 | | 00001 ~ 11110 | ADJUSTMENT COEFFICIENT |
| 512 | 448 | 320 | 256 | 192 | 128 | 64 | 0 | | 1 ~ 3 | 0.95 |
| 512 | 448 | 320 | 256 | 192 | 128 | 64 | 0 | | 4 ~ 6 | 0.96 |
| 512 | 448 | 320 | 256 | 192 | 128 | 64 | 0 | | 7 ~ 9 | 0.97 |
| 512 | 448 | 320 | 256 | 192 | 128 | 64 | 0 | | 10 ~ 12 | 0.98 |
| 512 | 448 | 320 | 256 | 192 | 128 | 64 | 0 | | 13 ~ 15 | 0.99 |
| 512 | 448 | 320 | 256 | 192 | 128 | 64 | 0 | | 16 ~ 18 | 1.00 |
| 512 | 448 | 320 | 256 | 192 | 128 | 64 | 0 | | 19 ~ 21 | 1.01 |
| 512 | 448 | 320 | 256 | 192 | 128 | 64 | 0 | | 22 ~ 24 | 1.02 |
| 512 | 448 | 320 | 256 | 192 | 128 | 64 | 0 | | 25 ~ 27 | 1.03 |
| 512 | 448 | 320 | 256 | 192 | 128 | 64 | 0 | | 28 ~ 30 | 1.04 |

TRANSMISSION CONTROL APPARATUS AND ADJUSTMENT METHOD FOR OUTPUT CHARACTERISTIC THEREOF

BACKGROUND OF THE INVENTION

1. Field of the Invention

The present invention relates to a transmission control apparatus that controls a transmission mounted in a vehicle and particularly to improvement of a plurality of linear solenoids that generate adjustment hydraulic pressure outputs corresponding to supply currents in a transmission control apparatus, improvement of a supply current control apparatus for the linear solenoid, and an adjustment method for output characteristic of the transmission control apparatus.

2. Description of the Related Art

As is well known, a transmission control apparatus for determining the transmission gear ratio of a transmission mounted in a vehicle includes a plurality of linear solenoids that is selectively supplied with a current in accordance with the selection position of the gearshift lever, the vehicle speed, and the accelerator-pedal depressing degree and generates an adjustment hydraulic pressure output corresponding to the supply current, for the purpose of determining the transmission gear ratio; and a supply current control apparatus that controls the supply current for the linear solenoid.

Because a transmission control apparatus for determining the transmission gear ratio of a vehicle transmission needs to be adjusted in the combination with a plurality of linear solenoids incorporated in the transmission, it is configured as a system inseparably integrated with the transmission; i.e., there is established electromechanical integration in which the transmission control apparatus and the transmission are combined with each other. Patent Document 1 describes that in a transmission control apparatus cited as an example of conventional apparatus and illustrated in FIGS. 16A and 16B, an electronic control unit 122, which is a centralized control apparatus for collectively controlling a plurality of linear solenoids 121, is configured with a microcomputer 123, a plurality of linear solenoids, and a plurality of drive control apparatuses 124 that correspond to the respective linear solenoids 121, and for the purpose of performing thermal correction for a linear solenoid 121 having temperature dependency, the characteristic parameters of the corresponding drive control apparatus 124 are adjusted in the production step for a transmission.

In FIG. 6 of Patent Document 1, there is provided a plurality of linear solenoid modules 1 that are each configured by integrating a linear solenoid 3 and a linear solenoid control circuit 4, and the linear solenoid control circuits 4, which are distributed control apparatuses in the respective linear solenoid modules 1, are connected with the respective output ports of a single microprocessor 63 in an electronic control unit 62. In each of the production steps for the linear solenoid modules 1, characteristic adjustment parameters at a time when the integrated linear solenoid 3 and linear solenoid control circuit 4 are combined with each other are written in a characteristic parameter storage device 6 (refer to FIG. 1 of Patent Document 1) in the linear solenoid control circuit 4. As a result, in the production step for the transmission, it is not required to adjust the characteristic parameters for each combination of the linear solenoid 3 and the linear solenoid control circuit 4.

In contrast, FIGS. 1 and 9 in Patent Document 2 discloses a flow-rate control apparatus in which for accurately controlling the flow rate of a pressure fluid that flows out from each of orifices 48a through 48c selected by on/off valves 46a through 46c, a linear solenoid valve 64 and a pressure sensor 78 are provided at upstream positions, the upstream pressure corresponding to the effective cross-sectional area of the selected orifice is set, a controller controls the excitation current for the linear solenoid 64 in such a way that the set upstream pressure and the detected pressure detected by the pressure sensor 78 coincide with each other.

PRIOR ART REFERENCE

Patent Document

[Patent Document 1] Japanese Patent Application Laid-Open No. 2010-242806
[Patent Document 2] Japanese Patent Application Laid-Open No. 2007-265395

(1) Explanation for Problems in the Prior Art

A linear solenoid module 1 in a conventional transmission control apparatus described in Patent Document 1 is configured by integrating a linear solenoid 3 and a linear solenoid control circuit 4; because under this combination, adjustment for correcting the temperature dependency characteristic of the linear solenoid 3 is preliminarily performed, it is not required to perform adjustment work for a plurality of linear solenoids 3 when the combination in the entire transmission is made. However, in the case where an abnormality is caused in either the linear solenoid or the linear solenoid control circuit and it is tried to replace only one of them, it is required to perform combination adjustment for the linear solenoid module and to rewrite stored information in the characteristic parameter storage device; thus, there is posed a problem that expensive adjustment equipment and an engineer who can perform adjustment work are required in the maintenance and replacement site. Accordingly, in practice, the linear solenoid and the linear solenoid control circuit need to be concurrently replaced; thus, there is posed a problem that the replacement components cost much, resulting in diseconomy and going against resource conservation.

A conventional flow-rate control apparatus disclosed in Patent Document 2 accurately controls the flow rate of a fluid such as a gas, by use of a base member 18 formed of a laminated body of a plurality of metal plates included in the flow path of a fluid and a flexible thin-film valve body 26 to which a linear solenoid applies pressure; because due to an inherent variation in the pressure detection characteristic of the pressure sensor 78, an inherent variation in the valve-body pressing force vs. current characteristic of a linear solenoid, and an inherent variation caused by the structure of a flow-rate control mechanism, it is difficult for the controller to perform accurate pressure control, it is required to perform control-characteristic adjustment work between the controller and the flow-rate control apparatus equipped with a linear solenoid valve and a pressure sensor. Accordingly, there has been a problem that in the case where an abnormality is caused in anyone of the controller and the flow-rate control apparatus including a linear solenoid and a pressure sensor and hence it needs to be replaced by non-defective one, expensive adjustment facilities and an engineer capable of performing the adjustment work are required at the maintenance/replacement site.

SUMMARY OF THE INVENTION (2) Explanation for the Objective of the Present Invention The first objective of the present invention is to provide a linear solenoid whose usability is improved in such a way that in the case where an abnormality is caused in either a linear solenoid or a supply current control apparatus and it is tried to replace any one of them by non-defective one, it is not required to readjust the combination of them and a transmission control apparatus utilizing a supply current control apparatus suitable for the solenoid. The second objective of the present invention is to suppress the effect of a characteristic change depending on the oil temperature so as to prevent the advantage of improving the usability from being impaired, even when the linear solenoid or the supply current control apparatus is solely replaced. Moreover, the third objective of the present invention is to suppress as much as possible the cost hike caused by achieving the first and the second objective so as to prevent the advantage of improving the usability from being impaired.

The fourth objective of the present invention is to provide an output characteristic adjustment method, for a transmission control apparatus, that can accurately correct an inherent variation in the pressure detection characteristic of an applied pressure sensor by combining a plurality of label resistors.

The fifth objective of the present invention is to provide an output characteristic adjustment method, for a transmission control apparatus, that can perform a correction equivalent to a broken-line characteristic, by use of a single label resistor.

A transmission control apparatus according to the present invention is provided with a plurality of linear solenoids, each of which acts on a hydraulic pressure adjustment valve incorporated in a vehicle transmission and generates an adjustment hydraulic pressure output corresponding to a supply current; and a supply current control apparatus that controls the supply current for the linear solenoid. In the linear solenoid, an electromagnetic coil, a pressure sensor that detects an adjusted hydraulic pressure that has been adjusted through the adjustment hydraulic pressure output, and a single or a plurality of label resistors having a resistance value that serves as parameter data for correcting an inherent variation in the performance characteristic of the pressure sensor are integrated with one another. The supply current control apparatus includes a control module and a driving circuit that operates with a supply voltage, which is the output voltage of a power supply on/off device connected between a vehicle battery and all the plurality of linear solenoids or between the vehicle battery and each of the linear solenoids, and with a control voltage, which is the output voltage of a constant voltage power source that is supplied with electric power from the vehicle battery; the driving circuit is provided with a measurement circuit for measuring the resistance value of the label resistor and a control on/off device that is discretely and directly connected with the other terminal of the linear solenoid; the control module includes
a microprocessor that generates a command signal for controlling the conduction state of the control on/off device, a RAM memory that collaborates with the microprocessor, a program memory, a nonvolatile data memory that is provided in part of the region of the program memory or is provided in such a way as to be separated from the program memory, and a multi-channel A/D converter to which, as a reference voltage, the control voltage is applied. The program memory includes a control program that functions as a label resistor reading and conversion means. In collaboration with the driving circuit, the microprocessor controls an energizing current for the electromagnetic coil in such a way that the adjusted hydraulic pressure detected by the pressure sensor becomes equal to a target setting hydraulic pressure. The label resistor reading and conversion means operates in such a way as to calculate the resistance value of the label resistor based on the proportion of a measured current that flows from the measurement circuit to the label resistor to a measured voltage applied to the label resistor, in such a way as to calculate or selectively determine parameter data for correcting an inherent variation in the pressure detection characteristic of the pressure sensor, based on the calculated resistance value, and in such a way as to store the parameter data in the data memory or the RAM memory. The operation of the label resistor reading and conversion means is implemented at an operation start timing when the power switch is turned on, and even when the linear solenoid is replaced for maintenance, the pressure detection characteristic of the pressure sensor is adjusted in accordance with the resistance value of a label resistor added to a replacement linear solenoid.

A first output characteristic adjustment method is to adjust the output characteristic of the transmission control apparatus. Standard detection characteristic data based on the pressure detection characteristics of pressure sensors for a plurality of linear solenoids, as samples, is stored in the program memory or the data memory in the transmission control apparatus. Discrete detection characteristic data based on the pressure detection characteristic of the pressure sensor for the linear solenoid in the transmission control apparatus is obtained through actual measurement and is stored in the program memory or the data memory. The standard detection characteristic data is approximated with a standard broken-line characteristic consisting of a first line segment having a first gradient $\theta 10$ and a second line segment having a second gradient $\theta 20$, and includes first standard data (P10, V10, $\theta 10$) based on a first actually measured pressure P10 and a first detection output V10 on the first line segment and second standard data (P20, V20, $\theta 20$) based on a second actually measured pressure P20 and a second detection output V20 on the second line segment. The discrete detection characteristic data is approximated with a discrete broken-line characteristic consisting of a first line segment having a first gradient $\theta 1n$ and a second line segment having a second gradient $\theta 2n$, and includes first discrete data (P10, V1$n$, $\theta 1n$) based on the first actually measured pressure P10 and a first detection output V1$n$ on the first line segment and second discrete data (P20, V2$n$, $\theta 2n$) based on the second actually measured pressure P20 and a second detection output V2$n$ on the second line segment. The resistance values of one group of the plurality of label resistors are adjusted to resistance values for specifying the value of the first adjustment coefficient (V1$n$/V10) based on the first detection output V1$n$ in the first discrete data and the first detection output V10 in the first standard data and the value of the first gradient coefficient ($\theta 1n$/$\theta 10$) based on the first gradient $\theta 1n$ in the first discrete data and the first gradient $\theta 10$ in the first standard data. The resistance values of the other group of the plurality of label resistors are adjusted to resistance values for specifying the value of the second adjustment coefficient (V2$n$/V20) based on the second detection output V2$n$ in the second discrete data and the second detection output V20 in the second standard data and the value of the second gradient coefficient ($\theta 2n$/$\theta 20$) based on the second gradient $\theta 2n$ in the second discrete data and the second gradient $\theta 20$ in the second standard data. The microprocessor reads the resistance values of the plurality of label resistors and extracts, through predetermined equations or a data table, the values of the first adjustment coefficient (V1$n$/V10) and the first gradient coefficient ($\theta 1n$/$\theta 10$), which configure a first correction coefficient, and the values of the second adjustment coefficient (V2$n$/V20) and the second gradient coefficient ($\theta 2n$/$\theta 20$), which configure a second correction coefficient, specifies the equation for the first line segment in the discrete detection characteristic, based on the first standard data (P10, V10, $\theta 10$) and the first correction coefficient, specifies the equation for the second line segment in the discrete detection characteristic, based on the second standard data (P20, V20, θ20) and the second correction coefficient, and obtains, based on the specified discrete broken-line characteristic, an adjusted detection hydraulic pressure from the detection output of the pressure sensor.

A second output characteristic adjustment method is to adjust the output characteristic of the transmission control apparatus. Standard detection characteristic data, as an average characteristic, based on the relationship between a plurality of actually measured hydraulic pressures obtained by measuring hydraulic pressures applied to pressure sensors for a plurality of linear solenoids, as samples, and a plurality of actually measured detection output voltages obtained by measuring the output voltages of the plurality of linear solenoids is stored in the program memory or the data memory in the transmission control apparatus. Discrete detection characteristic data based on the relationship between an actually measured hydraulic pressure obtained by measuring a hydraulic pressure applied to the pressure sensor for the linear solenoid and an actually measured detection output voltage obtained by measuring the output voltage of the linear solenoid is stored in the program memory or the data memory. The standard detection characteristic data is approximated with a standard broken-line characteristic consisting of a first line segment and a second line segment; there is calculated a combination line in such a way that the relative error between the first line segment and the combination line and the relative error between the second line segment and the combination line become minimal; and the standard detection characteristic data is configured with standard data (P0, V0, θ0) including a detection output V0 on the combination line corresponding to a predetermined actually measured pressure P0 and the gradient θ0 of the combination line and with difference data ΔVi0, which is the error between the average characteristic corresponding to the plurality of actually measured pressures Pi and the combination line.

The discrete detection characteristic data is approximated with a discrete broken-line characteristic consisting of a first line segment and a second line segment; there is calculated a combination line in such a way that the relative error between the first line segment and the combination line and the relative error between the second line segment and the combination line become minimal; and the discrete detection characteristic data is configured with discrete data (P0, Vn, θn) including a detection output Vn on the combination line corresponding to the predetermined actually measured pressure P0 and the gradient θn of the combination line. The resistance value of the label resistor is adjusted to a resistance value for specifying the value of a first adjustment coefficient (Vn/V10) based on the detection output Vn on the combination line in the discrete detection characteristic and the detection output V0 on the combination line in the standard detection characteristic and the value of a first gradient coefficient (θn/θ0) based on the gradient θn of the combination line in the discrete detection characteristic and the gradient θ0 of the combination line in the standard detection characteristic. The microprocessor reads the resistance value of the label resistor and extracts, through predetermined equations or a data table, the values of the first adjustment coefficient (Vn/V0) and the first gradient coefficient (θn/θ0), which configure the first correction coefficient, specifies a combination line, which is the same as the combination line for the discrete detection characteristic, based on the standard data (P0, V0, θ0) and the first correction coefficient, specifies a first correction broken line characteristic consisting of a first line segment and a second line segment, by algebraically adding the difference data ΔVi0 to the specified combination line, and obtains, through the specified first correction broken line characteristic, an adjusted detection hydraulic pressure from the detection output of the pressure sensor.

In a transmission control apparatus according to the present invention, a hydraulic pressure sensor for detecting an adjusted hydraulic pressure is provided in a linear solenoid that controls an hydraulic pressure adjustment valve, and an excitation current for an electromagnetic coil is controlled in such a way that a target hydraulic pressure and a detected hydraulic pressure coincide with each other, and concurrently, an inherent variation in the pressure detection characteristic of the hydraulic pressure sensor is corrected by the resistance value of a label resistor; therefore, unlike a transmission control apparatus of a type in which only the excitation current for an electromagnetic coil is controlled in accordance with a target hydraulic pressure, even when a change in the fluid viscosity caused by a temperature change in the activation oil makes the adjustment characteristic of the hydraulic pressure adjustment valve fluctuate, the adjusted hydraulic pressure is directly monitored and the excitation current is corrected, so that even when the oil temperature changes, a target adjusted hydraulic pressure can be obtained; thus, there is demonstrated an effect that stable transmission control can be implemented for a change in the oil temperature.

In a transmission control apparatus according to the present invention, because a microprocessor provided in the supply current control apparatus reads the label resistor while it does not perform supply-current control, there is demonstrated an effect that the control load on the microprocessor is reduced and hence an inexpensive microprocessor can be utilized.

Furthermore, in a transmission control apparatus according to the present invention, when a supply current control apparatus is produced and shipped, adjustment work for the apparatus is performed by use of a linear solenoid that serves as a reference sample, and when a linear solenoid is produced and shipped, there is preliminarily performed the work in which a label resistor for correcting the inherent variation in the pressure sensor is integrated with the linear solenoid, so that it is not required that at a vehicle production stage in which both a linear solenoid and a label resistor are assembled or when a linear solenoid or a supply current control apparatus is replaced for maintenance in the market, combination adjustment for both the linear solenoid and the label resistor is performed; thus, there is demonstrated an effect that a supply current control apparatus, assembly of which and maintenance replacement of which are easy, can be obtained.

In a transmission control apparatus according to the present invention, no IC memory for storing parameter data is included in a linear solenoid, and hence the inherent variation of the pressure sensor can simply be corrected by reading the resistance value of a label resistor; thus, there is demonstrated an effect that because the number of wiring leads between the linear solenoid and the supply current control apparatus is suppressed from increasing, the economical efficiency can be raised.

In the first output characteristic adjustment method, for a transmission control apparatus, according to the present invention, the pressure detection characteristic of a pressure sensor is approximated with a broken line consisting of a first line segment and a second line segment; two label resistors are provided in a linear solenoid; and the difference between the characteristic of a subject linear solenoid and a standard characteristic obtained through a plurality of samples is represented by the adjustment coefficient and the gradient coefficient for each line segment.

Accordingly, a complicated pressure detection characteristic can be represented by the resistance values of the label resistors; thus, there is demonstrated an effect that an inherent variation in the pressure detection characteristic of a pressure sensor can be corrected with a simple configuration.

Furthermore, in the second output characteristic adjustment method, for a transmission control apparatus, according to the present invention, the pressure detection characteristic of a pressure sensor is approximated with a broken line consisting of a first line segment and a second line segment; a single label resistor is provided in a linear solenoid; and the difference between the characteristic of a subject linear solenoid and a standard characteristic obtained through a plurality of samples is represented by the first adjustment coefficient and the first gradient coefficient. Accordingly, a complicated pressure detection characteristic can be represented by the resistance values of the label resistors; thus, there is demonstrated an effect that an inherent variation in the pressure detection characteristic of a pressure sensor can be corrected with a simple configuration.

The standard detection characteristic data includes data on difference value between the average characteristic and the combination line; therefore, there is demonstrated an effect that by algebraically adding the difference value data to the combination line related to a utilized pressure sensor, correction equivalent to correction through a broken line characteristic can be performed by use of a single label resistor.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 8 is an explanatory table for explaining how to determine the resistance value of a label resistor in a transmission control apparatus and an output characteristic control method therefor according to Embodiment 1 of the present invention;

DETAILED DESCRIPTION OF THE PREFERRED EMBODIMENTS

Embodiment 1

(1) Detailed Description of Configuration

Figure 1:
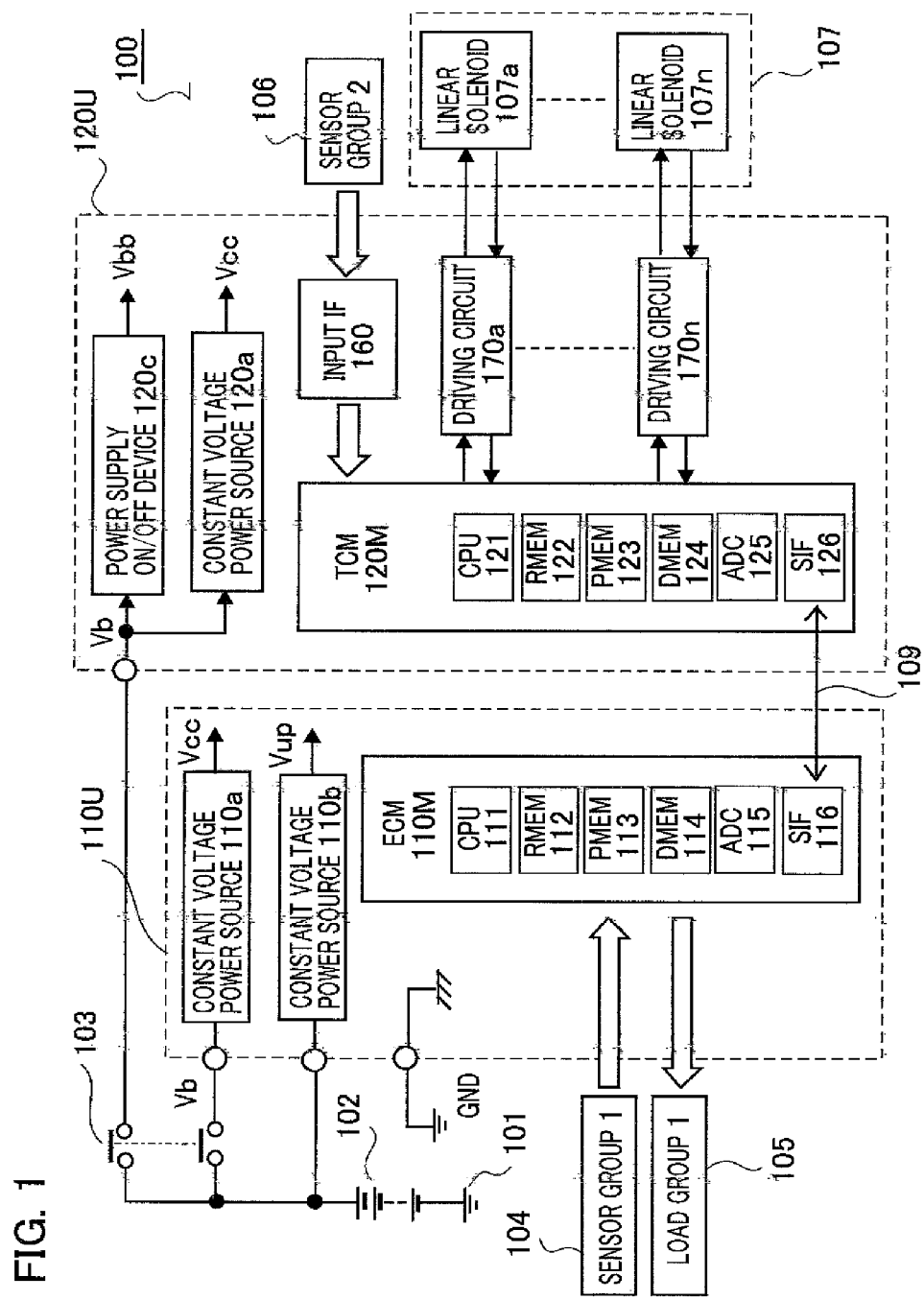
FIG. 1 is a configuration diagram of an overall transmission control apparatus according to Embodiment 1 of the present invention.

Hereinafter, there will be explained a transmission control apparatus and an output characteristic control method therefor according to Embodiment 1 of the present invention. FIG. 1 is a configuration diagram of an overall transmission control apparatus according to Embodiment 1 of the present invention. In FIG. 1, an engine control apparatus 110U provided in an engine room and a supply current control apparatus 120U fixed on the external wall of a gearbox 107 of a vehicle transmission are configured in such a way as to collaborate with each other so as to control supply currents for linear solenoids 107a through 107n incorporated in the gearbox 107. In Embodiment 1, a centralized-control transmission control apparatus 100 is configures with a single supply current control apparatus 120U and four to six, for example, linear solenoids 107a through 107n.

The positive terminal of a vehicle battery 102 whose negative terminal is connected with a vehicle body ground terminal 101 supplies a battery voltage Vb to the engine control apparatus 110U and the supply current control apparatus 120U, by way of an output contact 103 of an unillustrated power supply relay. The power supply relay is energized when an unillustrated power switch is closed; when the output contact 103 of the power supply relay is once closed and the engine control apparatus 110U starts to operate, the energization state is held through a self-holding command signal generated by the engine control apparatus 110U, whereby even when the power switch is opened, the energization state continues; when the engine control apparatus 110U and the supply current control apparatus 120U complete operation stopping processing, the self-holding command signal is cancelled and then the power supply relay is de-energized, whereupon the output contact 103 is opened.

A first group of sensors 104 whose outputs are inputted to the engine control apparatus 110U includes analogue sensors, on/off switch sensors, manual command switches, or the like, such as accelerator position sensor that detects the accelerator-pedal depressing degree, a throttle position sensor that detects the intake valve opening degree of an engine, an air flow sensor that measures intake amount, an exhaust-gas sensor, an engine rotation sensor, a crank angle sensor, a power switch, and an engine starting command switch. The outputs of part of the first group of sensors are directly inputted or transmitted through a communication line 109 also to the supply current control apparatus 120U.

A group of electric loads 105 that respond to the output signals generated by the engine control apparatus 110U include, for example, a fuel-injection electromagnetic valve, an ignition coil (in the case of an gasoline engine), an intake valve opening degree control motor, a starter motor, and the like. A second group of sensors 106 whose outputs are inputted to the supply current control apparatus 120U includes, for example, a vehicle speed sensor and a shift lever switch that indicates the selection position of the shift lever. The outputs of part of the second group of sensors are directly inputted or transmitted through a communication line 109 also to the engine control apparatus 110U.

Inside the engine control apparatus 110U, there is provided a constant voltage power source 110a that is energized from the vehicle battery 102 by way of the output contact 103 of the power supply relay and generates a stabilized control voltage Vcc of, for example, DC [V]; the constant voltage power source 110a supplies electric power to a control module (ECM) 110M and other unillustrated units including interface circuits. In the control module 110M, a microprocessor (CPU) 111, which is a computing processing unit, a computing-processing RAM memory (RMEM) 112, a nonvolatile program memory (PMEM) 113, which is, for example, a flash memory, a nonvolatile data memory (DMEM) 114, a multi-channel A/D converter (ADC) 115, and a serial-parallel converter (SIF) 116 are connected with one another through a bus line.

A constant voltage power source 110b that is directly supplied with electric power from the vehicle battery 102 backs up data written in the RAM memory 112 so that the data is prevented from disappearing when the output contact 103 of the power supply relay is opened; important data among the data written in the RAM memory 112 is transmitted to the data memory 114 while the unillustrated power switch is opened and the output contact 103 of the power supply relay is closed in a delayed manner.

In collaboration with the program memory 113, the microprocessor 111 controls the throttle valve opening degree in accordance with the accelerator-pedal depressing degree and supplies a fuel proportional to the intake amount; in the case of a gasoline engine, the ignition coil is on/off-controlled in accordance with the engine rotation speed and the fuel injection amount. When the transmission gear ratios of the transmission are changed, the microprocessor 111, in collaboration with the supply current control apparatus 120U, adjusts the fuel injection amount in such a way that the engine rotation speed gradually changes.

Inside the supply current control apparatus 120U, there is provided a constant voltage power source 120a that is energized from the vehicle battery 102 by way of the output contact 103 of the power supply relay and generates a stabilized control voltage Vcc of, for example, DC 5[V]; the constant voltage power source 120a supplies electric power to a control module (TCM) 120M and driving circuit units 170a through 170n, described later. In the control module 120M, a microprocessor (CPU) 121, a computing-processing RAM memory (RMEM) 122, a nonvolatile program memory (PMEM) 123, which is, for example, a flash memory, a nonvolatile data memory (DMEM) 124, a multi-channel A/D converter (ADC) 125, and a serial-parallel converter (SIF) 126 are connected with one another through a bus line. The serial-parallel converter 126 and the serial-parallel converter 116 in the control module 110M of the engine control apparatus 110U are connected in series with each other through the communication line 109.

In response to a power supply start command issued by the microprocessor 121, the power supply on/off device 120c that is supplied with electric power from the vehicle battery 102 by way of the output contact 103 of the power supply relay closes and generates a supply voltage Vbb to be supplied to the driving circuit units 170a through 170n, described later. Signals inputted from the second group of sensors 106 are inputted to the microprocessor 121 by way of an input interface circuit 160; the microprocessor 121 controls the power supply to the linear solenoid 107a through 107n through the respective driving circuits 170a though 170n, described later.

In addition, as each of the data memories 114 and 124, a nonvolatile memory may be utilized in which electrical reading and writing can readily be performed on a basis of one byte; however, in the case where the program memories 113 and 123 are flash memories in which collective erasure can electrically be performed on a basis of a block, specific blocks can be utilized as the data memories 114 and 124, respectively.

In the program memories 113 and 123, rewriting of the program is performed when an illustrated program tool or an adjustment tool 190, described later, is connected with the supply current control apparatus 120U; when neither a program tool nor the adjustment tool 190 is connected with the supply current control apparatus 120U, only reading can be performed, and rewriting processing cannot be performed. However, in the data memories 114 and 124, in the case where even when they are included in part of the regions of the program memories 113 and 123, respectively, blocks in which they are stored are different from each other, the microprocessors 111 and 121 can freely perform reading and writing even when no tool is connected with the supply current control apparatus 120U. However, in the case of a flash memory, the number of times of erasure is limited; therefore, in general, data items that have been written in the RAM memories 112 and 122 during driving are transmitted to and stored in the data memories 114 and 124, respectively, immediately after the power switch is opened.

Figure 2:
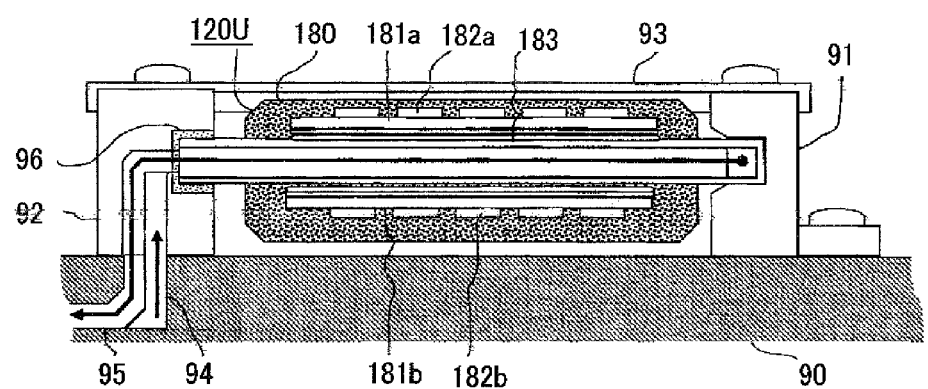
FIG. 2 is a cross-sectional view illustrating a supply current control apparatus, in a transmission control apparatus according to Embodiment 1 of the present invention, that is mounted on a gearbox.

Next, the configuration of the supply current control apparatus 120U will be explained. FIG. 2 is a cross-sectional view illustrating a supply current control apparatus, in a transmission control apparatus according to Embodiment 1 of the present invention, that is mounted on a gearbox. In FIG. 2, the supply current control apparatus 120U is configured with a U-shaped rectangular hollow pipe 183, on the respective external surfaces of which a pair of circuit boards 181a and 181b is adhered and fixed, and circuit components 182a and 182b mounted on the circuit boards 181a and 181b, respectively; they are integrally molded by use of a sealing resin 180. The U-shaped rectangular hollow pipe 183 is configured in such a way as described below: it is extended from the left-rear position to the right-rear position of the paper plane in FIG. 2; it is extended in such a way as to perpendicularly penetrate the paper plane from the rear surface to the front surface thereof at the right end position; it is extended from the right-front position to the left-front position of the paper plane; then, the left-end portion and the right-end portion thereof are exposed from the sealing resin 180.

The supply current control apparatus 120U is fixed with screws to the outer surface of an external wall 90 of the gearbox 107 by the intermediary of a pair of mounting feet 91 and 92 and is protected by a protection cover 93. In the one mounting foot 92, there are provided a gear oil inlet pipe 94 that communicates with one opening end of the U-shaped rectangular hollow pipe 183 and a gear oil outlet pipe 95 that communicates with the other opening end thereof; the pair of opening ends of the rectangular hollow pipe 183 is fixed to the mounting foot 92 by the intermediary of the packing 96.

Figure 3:
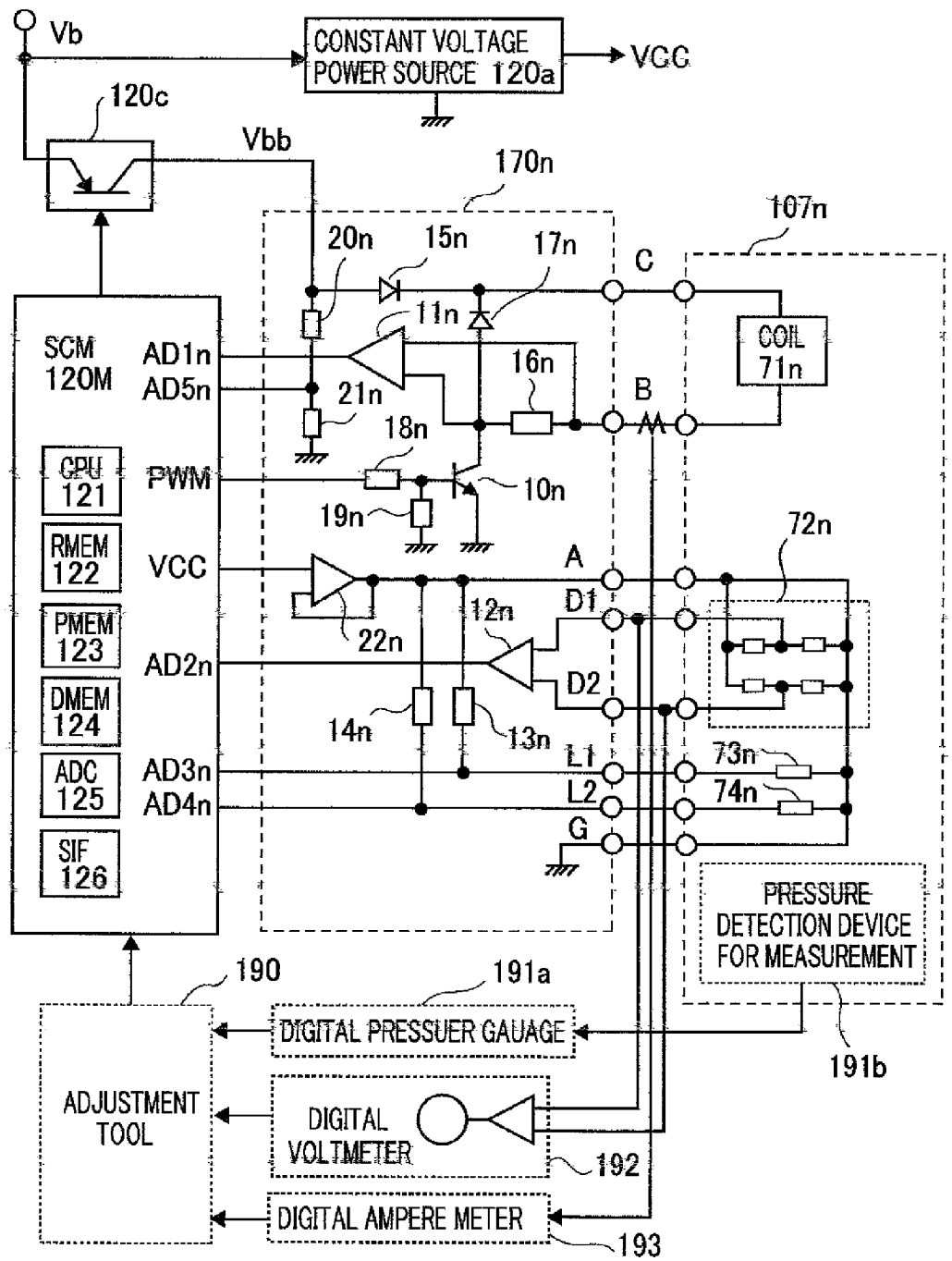
FIG. 3 is a circuit diagram of a driving circuit unit in a transmission control apparatus according to Embodiment 1 of the present invention.

Next, the driving circuit unit will be explained. FIG. 3 is a circuit diagram of the driving circuit unit in a transmission control apparatus according to Embodiment 1 of the present invention; among the driving circuit units 170a through 170n, the driving circuit unit 170n is illustrated as a representative, and the linear solenoid 107n corresponding to the driving circuit unit 170n is concurrently illustrated. The other driving circuit units and the linear solenoids corresponding thereto are configured in the same manner. In FIG. 3, the linear solenoid 107n that acts on a hydraulic pressure adjustment valve, described later, is configured with an electromagnetic coil 71n having a low-resistance value of, for example, several ohms, a pressure sensor 72n that detects an adjusted hydraulic pressure, and a pair of label resistors 73n and 74n.

The main circuit of the driving circuit 170n that supplies electric power to the linear solenoid 107n is configured with a reverse-flow prevention diode 15n connected between the power supply on/off device 120c and an upstream side terminal C of the electromagnetic coil 71n; a control on/off device 10n connected to the circuit ground position; a current detection resistor 16n, having a minute resistance of several milliohms, connected between the control on/off device 10n and a downstream side terminal B and a commutation diode 17n; the commutation diode 17n is connected in parallel with a series circuit consisting of the electromagnetic coil 71n and the current detection resistor 16n.

When the power supply on/off device 120c and the control on/off device 10n are closed, an excitation current is supplied to the electromagnetic coil 71n by way of the power supply on/off device 120c, the electromagnetic coil 71n, the current detection resistor 16n, and the control on/off device 10n; the value of the voltage across the current detection resistor 16n is proportional to the value of the excitation current. In this situation, when the control on/off device 10n is opened, the excitation current that has been flowing in the electromagnetic coil 71n attenuates while flowing back thereto through the commutation diode 17n; the value of the voltage across the current detection resistor 16n is proportional to the value of the excitation current that flows back and attenuates.

Provided that when the vehicle battery 102 is replaced, the positive and negative electrodes are set the other way around, there exists a possible risk that the power supply on/off device 120c and the control on/off device 10n become reversely conductive and hence a power-source shortcircuit is caused through the commutation diode 17n; the reverse-flow prevention diode 15n prevents the power-source shortcircuit. This countermeasure also applies to the case where the power supply on/off device 120c and the control on/off device 10n are each formed of not an illustrated junction-type transistor but a field-effect transistor.

The microprocessor 121 in the control module 120M generates a control command signal PWM; when the output logic becomes "H", the microprocessor 221 supplies the base current to the control on/off device 10n byway of a driving resistor 18n so as to close the control on/off device 10n; when the output logic becomes "L", the control on/off device 10n is securely opened by means of an open-circuit stabilizing resistor 19n connected between the base terminal and the emitter terminal thereof.

The voltage across the current detection resistor 16n is amplified by a differential amplifier 11n and is inputted to the multi-channel A/D converter 125 through an analogue input port AD1n. The supply voltage Vbb, which is the output voltage of the power supply on/off device 120c, is applied to division resistors 20n and 21n; the connection point between the division resistors 20n and 21n is connected with the multi-channel A/D converter 125 by way of an analogue input port AD5n; this input signal makes it possible to constantly monitor the value of the supply voltage Vbb.

A buffer amplifier 22n is connected between the output terminal of the constant voltage power source 120a and a power-source terminal A of the pressure sensor 72n and supplies the control voltage Vcc to the pressure sensor 72n. The buffer amplifier 22n protects the constant voltage power source 120a when a short-to-ground abnormality in the power-source line is caused in the linear solenoid 107n. The negative terminal of the pressure sensor 72n is connected to the negative terminal of the constant voltage power source 120a byway of the ground terminal G. The pressure sensor 72n is formed of a bridge circuit consisting of four resistance elements; a signal voltage generated by the bridge circuit is inputted to the multi-channel A/D converter 125 by way of pressure detection terminals D1 and D2, a differential amplifier 12n, and an analogue input port AD2n.

Respective one terminals of the pair of label resistors 73*n* and 74*n* are connected with the output terminal of the buffer amplifier 22*n* byway of a pair of signal terminals L1 and L2 and series resistors 13*n* and 14*n*, and the respective other terminals thereof are connected to the ground terminal G. The signal voltages at the signal terminals L1 and L2 are inputted to the multi-channel A/D converter 125 through analogue input ports AD3*n* and AD4*n*, respectively.

The series resistor 13*n* and 14*n* can be connected either in the linear solenoid 107*n* or at the downstream sides of the label resistors 73*n* and 74*n*, respectively.

In the case where as illustrated in FIG. 3, the series resistor 13*n* and 14*n* are connected at the upstream sides of the label resistors 73*n* and 74*n*, the resistance values R73*n* and R74*n* of the label resistors 73*n* and 74*n* are calculated through the equations (3a) and (4a) below.

$$R73n = Vad3n / \{(Vcc - Vad3n) / R13n\} \quad (3a)$$
$$= R13n \times (Vad3n / Vcc) / \{1 - (Vad3n / Vcc)\}$$

$$R74n = R14n \times (Vad4n / Vcc) / \{1 - (Vad4n / Vcc)\} \quad (4a)$$

where R13*n* and R14*n* are the resistance values of the series resistors 13*n* and 14*n*, and Vad3*n* and Vad4*n* are the respective voltages, across the label resistors 73*n* and 74*n*, that are inputted to the analogue input ports AD3*n* and AD4*n*.

Provided that the series resistor 13*n* and 14*n* are connected at the downstream sides of the label resistors 73*n* and 74*n*, the resistance values R73*n* and R74*n* of the label resistors 73*n* and 74*n* are calculated through the equations (3b) and (4b) below.

$$R73n = (Vcc - Vad3n) / (Vad3n / R13n) \quad (3b)$$
$$= R13n \times \{1 - (Vad3n / Vcc)\} / (Vad3n / Vcc)$$

$$R74n = R14n \times \{1 - (Vad4n / Vcc)\} / (Vad4n / Vcc) \quad (4b)$$

where R13*n* and R14*n* are the resistance values of the series resistors 13*n* and 14*n*, and Vad3*n* and Vad4*n* are the respective voltages, across the series resistors 13*n* and 14*n*, that are inputted to the analogue input ports AD3*n* and AD4*n*.

The adjustment tool 190 is connected in series with the control module 120M when the standard characteristic data items and discrete characteristic data items related to the adjustment pressure vs. current characteristic of the electromagnetic coil 71*n* and the pressure detection characteristic of the pressure sensor 72*n* are collected or when the current control characteristic of the supply current control apparatus 120U is measured. The adjustment tool 190 includes the man-machine interface functions of an unillustrated operation switch, an unillustrated display panel, and the like.

A pressure gauge 191*a* is formed of a digital pressure gauge, amplifies the output signal of an accurately configured pressure detection device 191*b* that is provided as test equipment for measurement, and inputs, as digital data, the actually measured value of an adjusted hydraulic pressure to the adjustment tool 190. The accuracy of pressure detection by the pressure gauge 191*a* and the pressure detection device 191*b* is higher than the accuracy of pressure detection by the pressure sensor 72*n*.

A voltmeter 192 is formed of a digital voltmeter, amplifies the detection output voltage of the pressure sensor 72*n*, applies digital conversion to the actually measured output voltage, and inputs the digital conversion value to the adjustment tool 190; the amplification factor thereof is set to a value the same as the designing theoretical amplification factor of the differential amplifier 12*n*; the accuracy of voltage detection by the voltmeter 192 is higher than the accuracy of voltage detection by the differential amplifier 12*n* and the multi-channel A/D converter 125.

An ampere meter 193 is formed of a digital ampere meter, connected to the upstream side or the downstream side of the electromagnetic coil 71*n*, measures an excitation current flowing in the electromagnetic coil 71*n*, and inputs the digital conversion value of the excitation current to the adjustment tool 190. The accuracy of current detection by the ampere meter 193 is higher than the accuracy of current detection by the current detection resistor 16*n*, the differential amplifier 11*n*, and the multi-channel A/D converter 125.

In the above explanation, the current detection resistor 16*n* is connected to the negative line of the electromagnetic coil 71*n*; however, the current detection resistor 16*n* may be provided either at the positive line of the electromagnetic coil 71*n* or at the downstream position of the control on/off device 10*n*. As each of the power supply on/off device 120*c* and the control on/off device 10*n*, a field-effect transistor, instead of a junction-type transistor, may be utilized; furthermore, an intelligent power transistor including a shortcircuit protection function may also be utilized. In addition, the power supply on/off device 120*c* may be the output contact of a power-supply electromagnetic relay provided outside the supply current control apparatus 120U.

Figure 4:
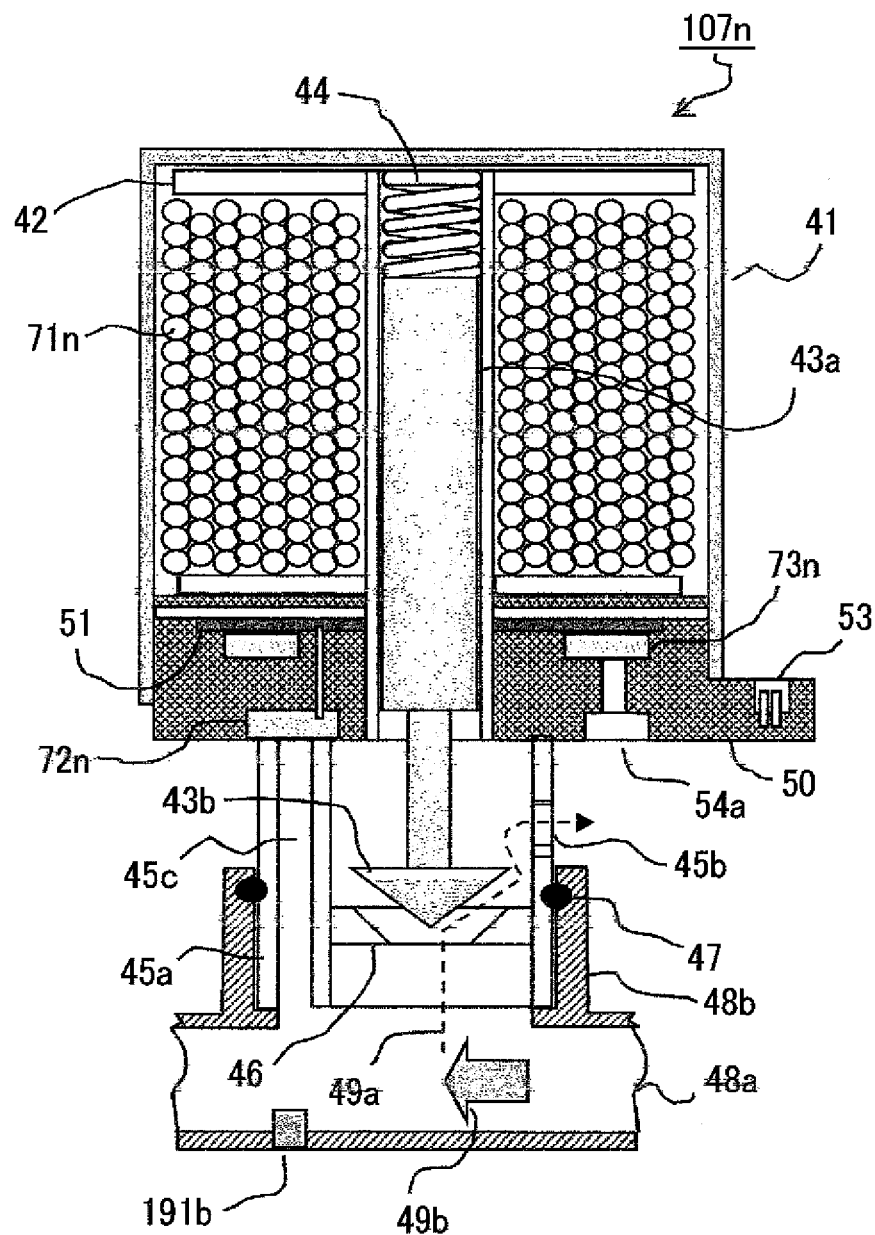
FIG. 4 is a schematic cross-sectional view of a linear solenoid in a transmission control apparatus according to Embodiment 1 of the present invention.

Next, the configurations of the linear solenoids 107*a* through 107*n* illustrated in FIG. 1 will be explained. FIG. 4 is a schematic cross-sectional view of a linear solenoid in a transmission control apparatus according to Embodiment 1 of the present invention. FIG. 4 illustrates the linear solenoid 107*n*, which is one of the plurality of linear solenoids 107*a* through 107*n*; the configurations of the other linear solenoids are the same as that of the linear solenoid 107*n*.

In FIG. 4, the linear solenoid 107*n* is provided with a bobbin 42 mounted inside a yoke 41; the electromagnetic coil 71*n* is wound around the bobbin 42. A plunger 43*a* to be attracted by the electromagnetic coil 71*n* and a relief valve 43*b*, which is a hydraulic pressure adjustment valve, are integrated with each other and pressed downward in FIG. 4 by a spring 44; when the electromagnetic coil 71*n* is energized, due to the electromagnetic force thereof, the plunger 43 resists the pressing force of the spring 44 and moves upward in FIG. 4.

At the opening end of the yoke 41, there are provided a circuit board 51, and the pair of label resistors 73*n* and 74*n* and the label resistor 72*n* that are mounted on the circuit board 51; the circuit board 51, the pair of label resistors 73*n* and 74*n*, and the pressure sensor 72*n* are integrally molded with a sealing resin 50; adjustment openings 54*a* and 54*b*, described later, are provided in the end face of the sealing resin 50. In this regard, however, the label resistor 74*n* and the adjustment opening 54*b* therefor are not illustrated in FIG. 4. The electromagnetic coil 71*n*, the pressure sensor 72*n*, the label resistors 73*n* and 74*n* are configured in such a way that the wiring leads therefor can be extracted through a coupling connector 53. Meanwhile, a fixed valve 46 facing the movable relief valve 43*b* is provided in a cylinder portion 45*a* that is integrally mounted on the yoke 41.

In a pipe portion 48*a*, an activation oil 49*b* having a predetermined pressure is pressure-fed from an unillustrated hydraulic pump to the left side in FIG. 4 so that by means of an illustrated hydraulic cylinder, a hydraulic clutch or a hydraulic brake in the transmission is engaged or released. An opening wall 48b provided on the pipe portion 48a is engaged with the outer circumference of the cylinder portion 45a and sealed with an O-ring 47.

When a gap is produced between the fixed valve 46 having a conical opening portion and the relief valve 43b, part of the activation oil 49b flows into the gearbox 107 through the gap between the foregoing valves and an adjustment flow path 49a leading to an opening portion 45b provided in the cylinder portion 45a. A communication tube 45c provided in the cylinder portion 45a provides the pressure sensor 72n with the hydraulic pressure at the downstream position in the pipe portion 48a. The pressure detection device 191b, illustrated in FIG. 3, is disposed, as the test equipment, at the downstream position in the pipe portion 48a.

The linear solenoid 107n illustrated in FIG. 4 is a normally-closed type in which when the electromagnetic coil 71n is not energized, the spring 44 presses the relief valve 43b in the direction in which the relief valve 43b closes; the following relationships are established:

hydraulic pressure×valve opening area=pressing force of spring−electromagnetic driving force pressing force of spring=spring constant×(initial compression measurement+opened valve moving measurement)

Accordingly, the relationship is established in which when the excitation current for the electromagnetic coil 71n is determined, the hydraulic pressure is determined, and when the excitation current is increased, the valve opening measurement becomes larger and hence the hydraulic pressure decreases.

The hydraulic pressure vs. current characteristic of the linear solenoid described above will be explained later with reference to FIG. 6; each of the linear solenoids 107a through 107n has its inherent variation with respect to the hydraulic pressure vs. current characteristic of a standard linear solenoid; the first factor of the inherent variation is the variation in the pressing force for the compression measurement of the spring 44; the second factor thereof is the variation in the electromagnetic driving force caused by the variation in the magnetic resistance of the yoke 41. The other variation factor that undergoes the effect of the oil temperature is the fact that when the oil temperature rises, the viscosity of the activation oil decreases and hence the hydraulic pressure may be reduced because even when the valve opening measurement is small, a great deal of activation oil is discharged. Moreover, there has been a problem that because undergoing the effect of the oil temperature, the sliding resistance of the plunger 43a increases when the oil temperature is low. The foregoing variation factors of the hydraulic pressure vs. current characteristic of the linear solenoid are the same as those of an unillustrated normally-opened type of linear solenoid.

In the case of a normally-open type of linear solenoid, the spring presses the relief valve in a direction in which the relief valve opens, and the following relationships are established:

hydraulic pressure×valve opening area=electromagnetic driving force−pressing force of spring pressing force of spring=spring constant×(initial compression measurement−opened valve moving measurement)

Accordingly, the relationship is established in which when the excitation current for the electromagnetic coil is determined, the hydraulic pressure is determined, and when the excitation current is increased, the valve opening measurement becomes smaller and hence the hydraulic pressure increases. Regardless of whether the type of the linear solenoid is a normally-closed type or a normally-opened type, the respective variations of the linear solenoids are caused with respect to the standard hydraulic pressure vs. current characteristic. Accordingly, by providing the pressure sensor 72n so as to measure an adjusted hydraulic pressure, the pressure change caused by a variation in the hydraulic pressure vs. current characteristic of a linear solenoid or by a variation in the flowing viscosity depending on the oil temperature can accurately be corrected. However, there exists an inherent variation in the pressure detection characteristic of the pressure sensor 72n; thus, in order to correct this variation, a pair of label resistors 73n and 74n is utilized.

Figure 5:
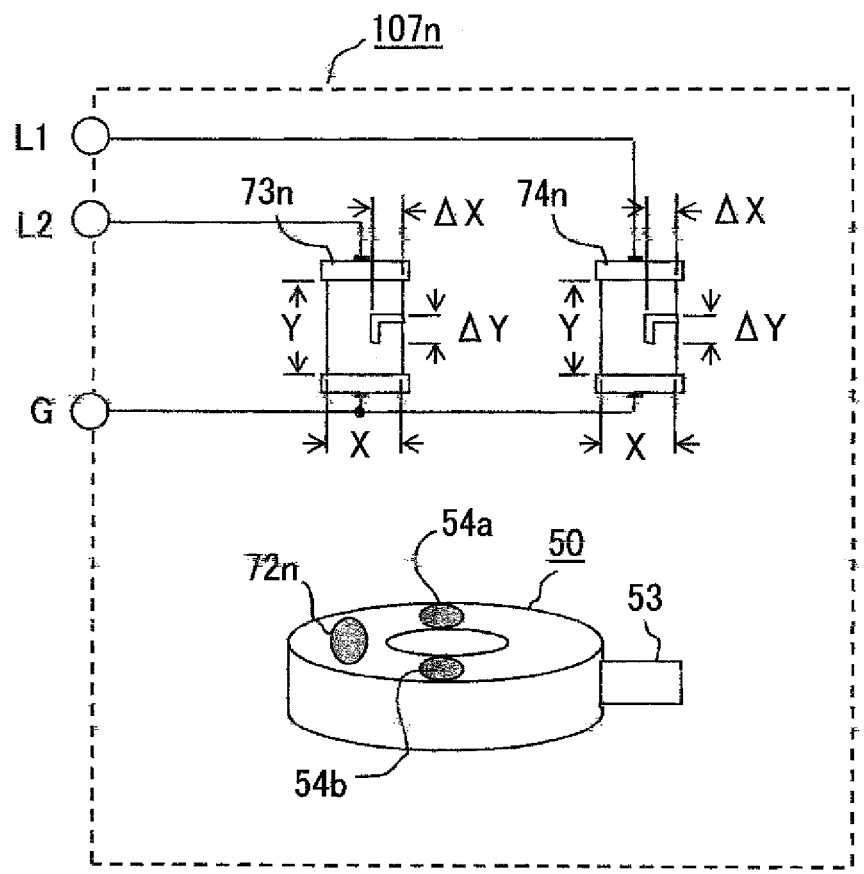
FIG. 5 is a configuration diagram illustrating a label resistor in a transmission control apparatus according to Embodiment 1 of the present invention.

Next, the configurations of the label resistors 73n and 74n illustrated in FIGS. 3 and 4 will be explained. FIG. 5 is a configuration diagram illustrating a label resistor in a transmission control apparatus according to Embodiment 1 of the present invention. FIG. 5 illustrates the label resistors 73n and 74n for the linear solenoid 107n, which is one of the plurality of linear solenoids 107a through 107n; the configurations of the respective label resistors for the other linear solenoids are the same as those of the resistors 73n and 74n. In FIG. 5, each of the pair of label resistors 73n and 74n in the linear solenoid 107n is formed of laser-trimming resistors that are integrally molded with the sealing resin 50; the respective resistance values thereof are adjusted through adjusting windows 54a and 54b.

The laser-trimming resistor is a thin film resistor formed in such a way as to have a width of X, a length of Y, and a thickness of T; letting $\Delta X$ denote the transverse-direction cutting dimension and letting $\Delta Y$ denote the longitudinal-direction cutting dimension, the increased resistance value $\Delta R$, with respect to the initial resistance value $R0$, that is caused due to the cutting is calculated according to the equation (5) below.

$$\Delta R/R0=(\Delta Y/Y)\times\Delta X/(X-\Delta X) \qquad (5)$$

Accordingly, adjustment of the cutting dimensions makes it possible to perform substantial resistance adjustment and a minute-diameter laser beam makes it possible to obtain a resistor that is accurately finished.

Next, the standard adjustment pressure vs. current characteristic of the linear solenoid 107n illustrated in FIG. 3 will be explained. FIG. 6 is a standard characteristic graph related to the adjustment pressure vs. current characteristic of a linear solenoid in a transmission control apparatus and an output characteristic control method therefor according to Embodiment 1 of the present invention; FIG. 6 represents the standard characteristic graph, which is an average pressure vs. current characteristic of a great number of linear solenoids, at a time when the oil temperature is a predetermined temperature, which is a reference temperature. In FIG. 6, the ordinate denotes the value of an adjusted hydraulic pressure, obtained by the linear solenoid, that is measured by the pressure gauge 191a illustrated in FIG. 3; the abscissa denotes the value of a supply current (excitation current), for the electromagnetic coil 71n, that is measured by the ampere meter 193 illustrated in FIG. 3.

Figure 6:
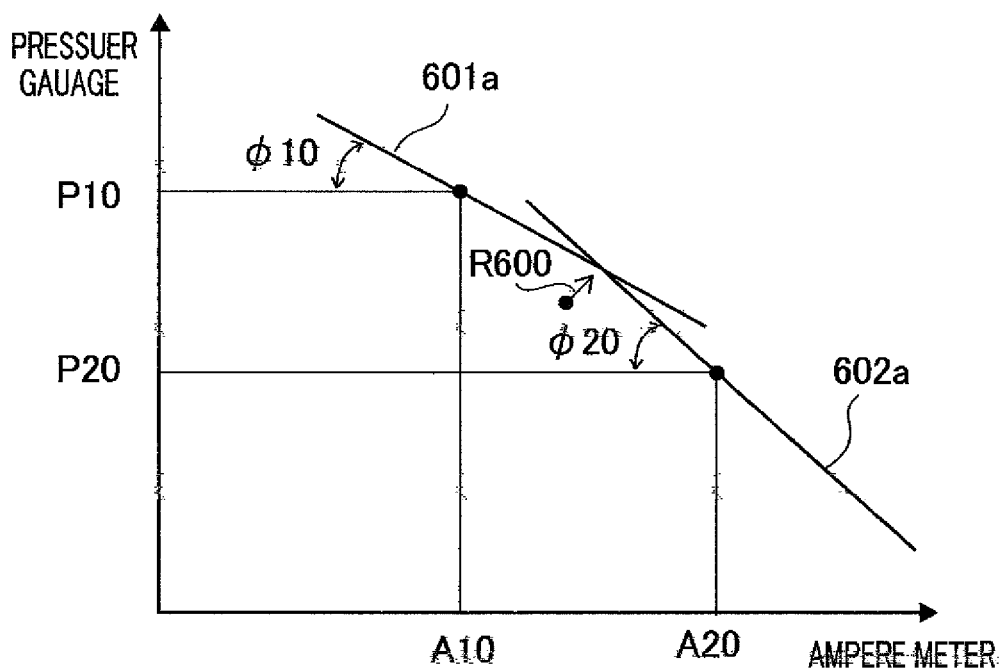
FIG. 6 is a standard characteristic graph related to the adjustment pressure vs. current characteristic of a linear solenoid in a transmission control apparatus and an output characteristic control method therefor according to Embodiment 1 of the present invention.

The characteristic curve in FIG. 6 represents the linear portion of the band where the hydraulic pressure adjustment is performed; when the supply voltage is decreased, the adjusted hydraulic pressure gradually increases up to a predetermined maximum hydraulic pressure equivalent to the pumping hydraulic pressure obtained by the oil pump and is saturated at the upper limit. When the supply current is further increased, the adjusted hydraulic pressure gradually decreases to a predetermined minimum hydraulic pressure determined by the maximum opening area of the relief valve and the pipe resistance of a relief flow path, and is saturated at the lower limit. The standard characteristic can directly be stored in the program memory 113 or the data memory 114. The linear portion can also be approximated with a broken line consisting of a pair of straight lines 601a and 602a.

The straight line 601a passes through coordinates (A10, P10) and its gradient is φ10. The straight line 602a passes through coordinates (A20, P20) and its gradient is φ20. The portion where the straight lines 601a and 602a cross each other is arc-interpolated; the curvature radius thereof is R600. Accordingly, the standard target current corresponding to a given target hydraulic pressure can be calculated by preliminarily storing first data (A10, P10, φ10), second data (A20, P20, φ20), and third data R600 in the program memory 123 or the data memory 124.

Figure 7:
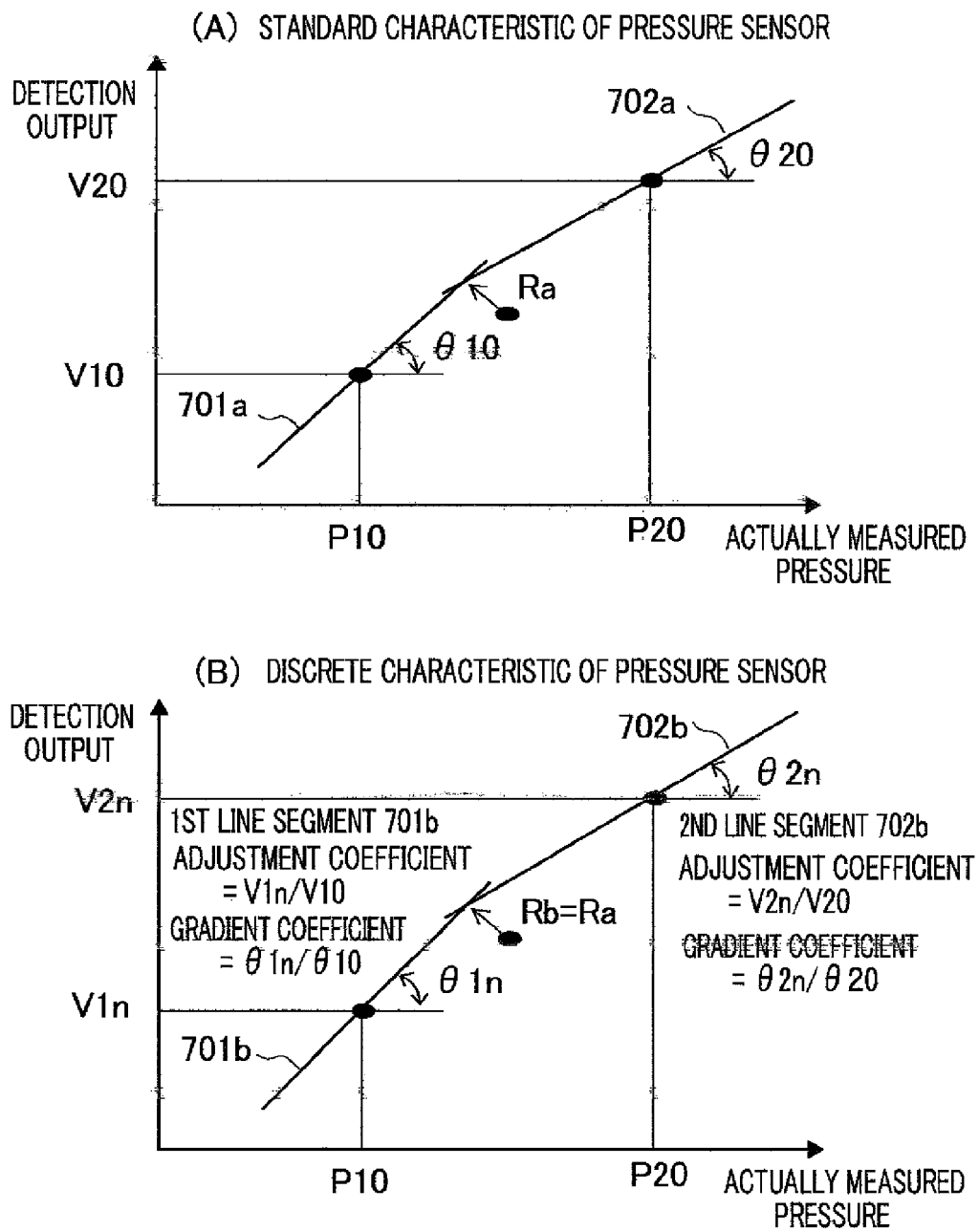
FIG. 7 is a set of characteristic curves related to the pressure detection characteristics of pressure sensors in a transmission control apparatus and an output characteristic control method therefor according to Embodiment 1 of the present invention.

Next, the pressure detection characteristic of the pressure sensor 72n illustrated in FIG. 3 will be explained. FIG. 7 is a set of characteristic curves related to the pressure detection characteristics of pressure sensors in a transmission control apparatus and an output characteristic control method therefor according to Embodiment 1 of the present invention; FIG. 7(A) is a standard characteristic graph representing the average pressure detection characteristic value of the pressure sensor 72n obtained from a plurality of samples; FIG. 7(B) is a discrete characteristic graph representing the pressure detection characteristic of a specific pressure sensor 72n, which is a subject for the outgoing inspection.

In FIG. 7(A), the abscissa denotes the high-accuracy actually measured pressure measured by the pressure detection device 191b and the pressure gauge 191a illustrated in FIG. 3; the ordinate denotes the actually measured detection output voltage of the pressure sensor 72n measured by the voltmeter 192 illustrated in FIG. 3. The standard characteristic represented in FIG. 7(A) can be approximated with a broken line consisting of a first line segment 701a and a second line segment 702a. The first line segment 701a passes through coordinates (P10, V10) and its gradient is θ10; the second line segment 702a passes through coordinates (P20, V20) and its gradient is θ20. The portion where the first line segment 701a and the second line segment 702a cross each other can be interpolated with an arc of a curvature radius Ra.

In FIG. 7(B), the relationship between the abscissa and the ordinate is the same as that in FIG. 7(A). The discrete characteristic represented in FIG. 7(B) can be approximated with a broken line consisting of a first line segment 701b and a second line segment 702b. The first line segment 701b passes through coordinates (P10, V1n) and its gradient is θ1n; the second line segment 702b passes through coordinates (P20, V2n) and its gradient is θ2n. The portion where the first line segment 701b and the second line segment 702b cross each other can be interpolated with an arc of a curvature radius Rb; however, the curvature radius Rb can approximately be replaced by the curvature radius Ra in the standard characteristic.

Here, the proportion V1n/V10 of a first detection output V1n in the discrete characteristic to a first detection output V10 in the standard characteristic will be referred to as a first adjustment coefficient; the proportion θ1n/θ10 of a first gradient θ1n in the discrete characteristic to a first gradient θ10 in the standard characteristic will be referred to as a first gradient coefficient; then, (V1n/V10, θ1n/θ10) will be referred to as a first correction coefficient. Similarly, the proportion V2n/V20 of a second detection output V2n in the discrete characteristic to a second detection output V20 in the standard characteristic will be referred to as a second adjustment coefficient; the proportion θ2n/θ20 of a second gradient θ2n in the discrete characteristic to a second gradient θ20 in the standard characteristic will be referred to as a second gradient coefficient; then, (V2n/V20, θ2n/θ20) will be referred to as a second correction coefficient.

The first and second correction coefficients calculated as described above are expressed by the resistance values of the pair of label resistors 73n and 74n in such a manner as described later. As a result, based on the preliminarily stored standard characteristic data and the first and second correction coefficients that can be obtained by reading the resistance values of the pair of label resistors 73n and 74n, the microprocessor 121 in the supply current control apparatus 120U can obtain the discrete pressure detection characteristic of the pressure sensor 72n included in the utilized linear solenoid 107n.

Next, the method of determining the resistance value of the label resistors 73n and 74n illustrated in FIG. 3 will be explained. FIG. 8 is an explanatory table for explaining how to determine the resistance value of a label resistor in a transmission control apparatus and an output characteristic control method therefor according to Embodiment 1 of the present invention; FIG. 8 represents a bit configuration in the case where the resistance values of the label resistors 73n and 74n are digital-converted and are expressed as binary values. In FIG. 8, the low-order bits (B5 through B1) configure a numerical value area for specifying the adjustment coefficient of "1.04" through "0.95", as the adjustment coefficient; for example, when it is desired to set the adjustment coefficient to "0.95", it is only necessary to set the low-order bits to "00010", which is the center value of "00001" through "00011". As a result, even when considering the adjustment error or the AD conversion error of the label resistor, a one-bit error is caused, the adjustment coefficient "0.95" can accurately be recognized.

In FIG. 8, the adjustment coefficients "0.95" through "1.04" are allocated to "1" through "30", which are obtained by converting the low-order-bits binary values "00001" through "11110" into decimal values. The gradient coefficients "1.04" through "0.97" are allocated to the high-order bits (B9 through B7); for example, when it is desired to set the gradient coefficient to "1.01", it is only necessary to set the high-order bits B9, B8, and B7 to 1, 0, and 0, respectively. In this case, the decimal value "256" is configured; however, for example, when the decimal value is "258", it is suggested that the gradient coefficient "1.02" and the adjustment coefficient "0.95" have been selected.

In the case where the resolution of the multi-channel A/D converter 125 is 10 bits, a voltage obtained through division by the series resistor 13n and the label resistor 73n is inputted to the analogue input port AD3n, and a voltage obtained through division by the series resistor 14n and the label resistor 74n is inputted to the analogue input port AD4n; therefore, by setting the lower limit adjustment values of the label resistors 73n and 74n to values that are larger than the series resistors 13n and 14n, respectively, the input voltages of the analogue input ports AD3n and AD4n can securely become half of the control voltage Vcc; thus, in this case, the multi-channel A/D converter 125 can be regarded as an A/D converter having a resolution of 9 bits.

For that reason, the most significant bit B10 is set to be a blank bit; however, by utilizing a multi-channel A/D converter having a resolution of 12 bits, the selection ranges of the adjustment coefficient and the gradient coefficient can further be expanded. The setting areas for the gradient coefficient and the adjustment coefficient are separated from each other by setting the middle bit B6 to be a blank bit.

In the above explanation, as the first correction coefficient, the first adjustment coefficient ($V1n/V10$) and the first gradient coefficient ($\theta 1n/\theta 10$) have been utilized; however, instead of the first gradient coefficient ($\theta 1n/\theta 10$), the first gradient coefficient can also be calculated by use of the first adjustment coefficient ($V1n/V10$) and a third adjustment coefficient ($V3n/V30$).

Here, $V30$ denotes the standard detection output, on the first line segment 701a, that corresponds to a third actually measured pressure $P30$; $V3n$ denotes the discrete detection output, on the first line segment 701b, that corresponds to the third actually measured pressure $P30$. In this case, the first gradient $\theta 10$ is calculated through the following equation.

The first gradient $\theta 10=(V30-V10)/(P30-P10)$

The first gradient $\theta 1n$ is calculated through the following equation.

The first gradient $\theta 1n=(V3n-V1n)/(P30-P20)$

Accordingly, based on the above two equations, the first gradient coefficient ($\theta 1n/\theta 10$) is calculated through the equation (6) below.

$$\theta 1n/\theta 10=(V3n-V1n)/(V30-V10) \quad (6)$$

Similarly, as the second correction coefficient, the second adjustment coefficient ($V2n/V20$) and the second gradient coefficient ($\theta 2n/\theta 20$) have been utilized; however, instead of the second gradient coefficient, the second gradient coefficient ($\theta 2n/\theta 20$) can also be calculated through the equation (7) below, by use of the second adjustment coefficient ($V2n/V20$) and a fourth adjustment coefficient ($V4n/V40$).

$$\theta 2n/\theta 20=(V4n-V2n)/(V40-V20) \quad (7)$$

where $V40$ denotes the standard detection output, on the second line segment 702a, that corresponds to a fourth actually measured pressure $P40$, and $V4n$ denotes the discrete detection output, on the second line segment 702b, that corresponds to the fourth actually measured pressure $P40$.

Figure 9:
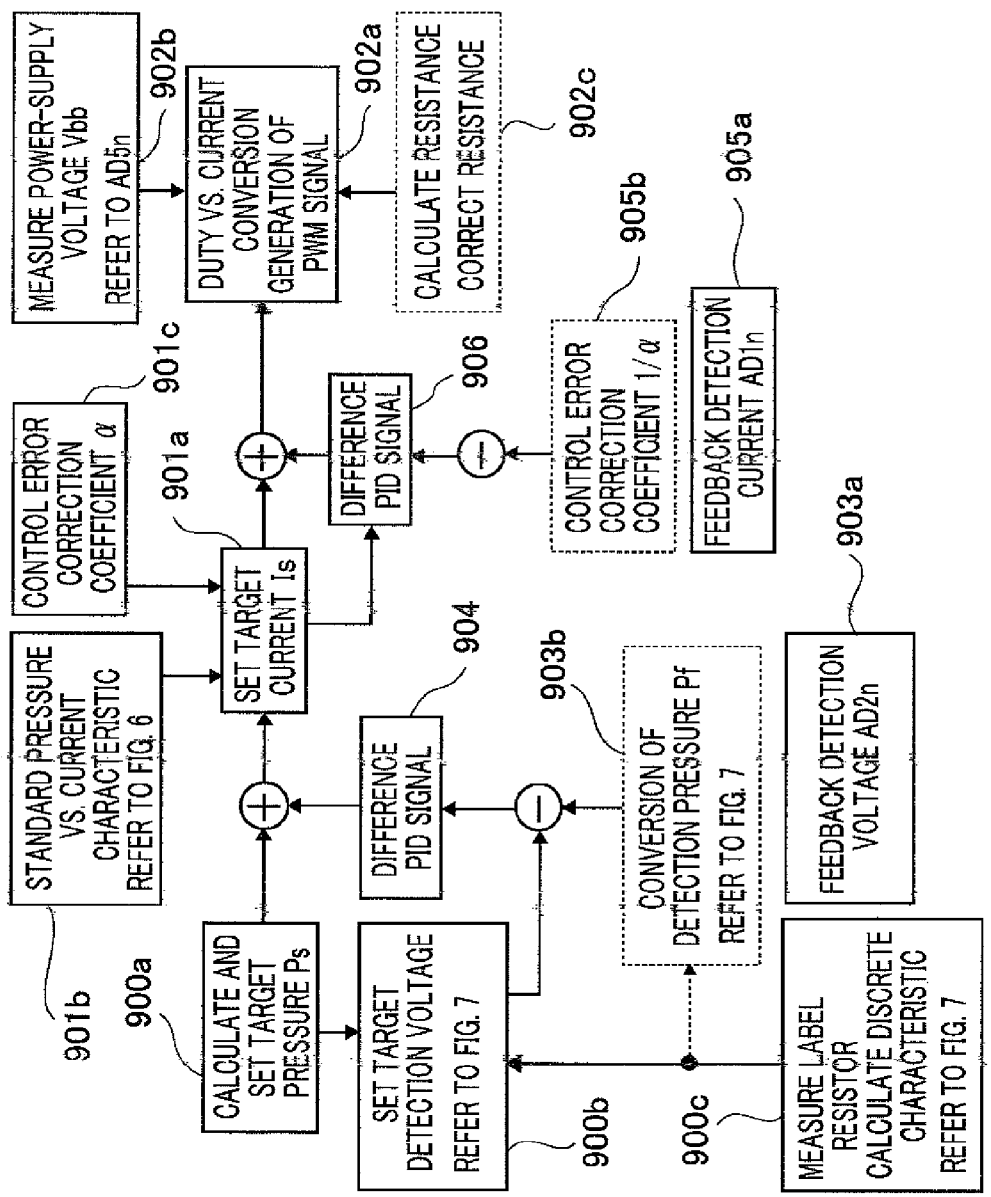
FIG. 9 is a control block diagram of a supply current control apparatus in a transmission control apparatus according to Embodiment 1 of the present invention.

Next, the supply current control apparatus 120U illustrated in FIG. 1 will be explained. FIG. 9 is a control block diagram of a supply current control apparatus in a transmission control apparatus according to Embodiment 1 of the present invention. In the following explanation, there will be described a case where the microprocessor 121 in the control module 120M performs all the control items illustrated in FIG. 9, in collaboration with the program memory 123.

In FIG. 9, in the control block 900a, the microprocessor 121 determines the transmission gear ratio in response to the gearshift switch, the accelerator-pedal depressing degree, and the vehicle speed inputted to the input interface circuit 160 (refer to FIG. 1), selectively determines which linear solenoid among the plurality of linear solenoids 107a through 107n is to be energized, and then generates a target hydraulic pressure signal for the selected linear solenoid, for example, 107n.

In the following control block 900b, the detection output corresponding to a target hydraulic pressure on the abscissa is set in a converting manner by use of the discrete characteristic represented in FIG. 7(B); however, in the case where the control block 903b, described later, is utilized, the detection output is set in a converting manner by use of the standard characteristic represented in FIG. 7(A). In the case where the discrete characteristic is utilized in the control block 900b, firstly, the resistance values of the label resistors 73n and 74n are read in the control block 900c so that the first and second correction coefficients are calculated; then, the discrete characteristic represented in FIG. 7(B) is obtained by use of the standard characteristic graph FIG. 7(A) preliminarily stored in the program memory 123 and the calculated correction coefficients.

In the control block 901a following the control block 900a, the value on the abscissa, which is obtained by setting a target hydraulic pressure on the ordinate in the standard characteristic represented in FIG. 6, is determined as the target current. The standard characteristic represented in FIG. 6 is preliminarily stored in the program memory 123 and is read in the control block 901b. In the control block 901c, a target current Is is multiplied by a correction coefficient $\alpha$; the correction coefficient $\alpha$ is calculated through the following equation when at the stage of outgoing adjustment for the supply current control apparatus 120U, a linear solenoid, as the standard sample, is connected with the supply current control apparatus, a target current Is0 is set by use of the adjustment tool 190, and the excitation current, for the linear solenoid, that is measured by the digital ampere meter 193 connected, as inspection equipment, with the adjustment tool 190 is If0.

The correction coefficient $\alpha=Is0/If0$

When it is desired to set the target current Is, the microprocessor 121 sets $[\alpha \times Is]$, as a correction target current; as a result, the value of the actual excitation current If coincides with the initial target current Is. In this regard, however, in the case where the correction of a control error is implemented in the control block 905b, it is not required to correct the target current in the control block 901c.

In the control block 902a, a control signal PWM having a conductive duty Kd based on the equation (1) below is generated.

$$Kd=Is \times Rc/Vbb \quad (1)$$

where Is is the actual target current obtained through multiplication by the correction coefficient $\alpha$, Rc is the resistance value of the electromagnetic coil 71n at a reference temperature, Vbb is the present value of the power-supply voltage Vbb calculated in the control block 902b, and the power-supply voltage Vbb is obtained by dividing the voltage, which has been inputted to the analogue input port AD5n and has been converted into a digital value, by the voltage division ratio determined by the division resistors 20n and 21n.

In the control block 902c, the resistance value Rc in the foregoing equation (1) is replaced by the present resistance value at the present temperature; the present resistance value is obtained by calculating an average applied voltage, as the moving-average value of the product of the power-supply voltage Vbb and the conductive duties Kd in a plurality of on/off cycles of the control on/off device 10n over the immediate past time, by calculating the average current, as an moving-average value of detection currents during the same period, and by dividing the average applied voltage by the average current; immediately after the start of driving, a predetermined fixed constant, which is the resistance value of the electromagnetic coil 71n at the reference temperature, is utilized.

In the control block 905a, as a value proportional to the voltage across the current detection resistor 16n, the excitation current If for the electromagnetic coil 71n is detected; in the control block 906 after the control block 905a, a PID control signal is generated based on a difference signal proportional to the difference between the actual target current Is obtained through multiplication by the correction coefficient $\alpha$ and the detected excitation current If; then, the PID control signal is algebraically added to the target current for the control block 902a. Accordingly, in the case where there exists an error between the actual target current Is inputted to the control block 902a and the actual excitation current for the electromagnetic coil 71n, the conductive duty Kd is corrected so as to be increased or decreased, as the integral value of the error increases or decreases, so that the steady-state error in the excitation current becomes zero.

As a result, there is corrected a control error caused by an error in the resistance value of the current detection resistor 16n with respect to the designing reference value or by a variation in the input resistance included in the amplification circuit formed of the differential amplifier 11n; therefore, even when the resistance value of the current detection resistor 16n at the reference temperature varies or the resistance value of the current detection resistor 15n varies due to a change in the ambient temperature or self-heating in the current detection resistor 16n, an excitation current that approximately coincides with the target current can be obtained.

It may be allowed that instead of correcting a control error in the control blocks 901c and 901a, the control block 905b is provided and the digital conversion value, at the analogue input port AD1n, that is measured in the control block 905a is preliminarily divided by the correction coefficient α.

In addition, the resistance value of the electromagnetic coil 71n changes depending on the temperature of its own; thus, by taking the changing characteristic, as well, into consideration, there can be implemented current control that further reduces the current control error and immediately responds to a rapid change in the target current; however, even when the control block 902c is not provided, the negative feedback control in the control block 906 makes it possible that in the steady state, an accurate excitation current that coincides with the target current can be obtained.

In the control block 903a, the input voltage, of the analogue input port AD2n, that is proportional to the output voltage of the pressure sensor 72n is converted into a digital value; in the control block 904, the PID signal is generated, based on a difference signal proportional to the difference between the target detection voltage set in the control block 900b and the feedback detection voltage obtained in the control block 903a, and is algebraically added to the target pressure set in the control block 900a.

In the case where in the control block 900b, the target detection voltage is set through the standard characteristic represented in FIG. 7(A), the feedback detection voltage is corrected in the control blocks 903b and 900c and then the difference between the target detection voltage and the feedback detection voltage may be calculated.

(2) Detailed Description of Operation

Figure 10:
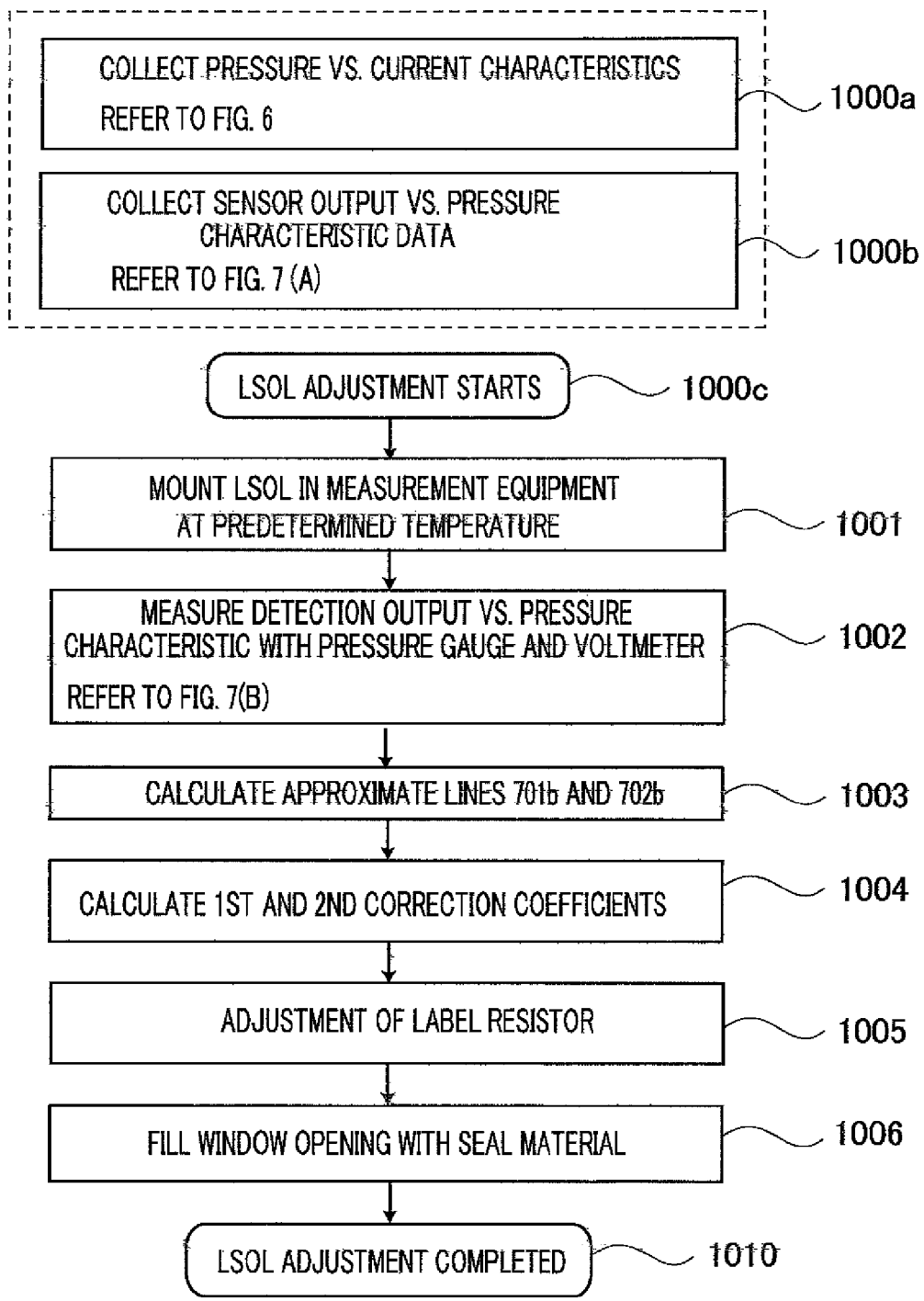
FIG. 10 is a flowchart representing adjustment work for a linear solenoid in a transmission control apparatus and an output characteristic control method therefor according to Embodiment 1 of the present invention.

Hereinafter, there will be explained a transmission control apparatus and an output characteristic adjustment method therefor according to Embodiment 1 of the present invention. FIG. 10 is a flowchart representing adjustment work for a linear solenoid in a transmission control apparatus and an output characteristic control method therefor according to Embodiment 1 of the present invention; outgoing adjustment work for a linear solenoid is represented.

In FIG. 10, the step 1000a is a step in which experiment and measurement that are prior to the outgoing adjustment work are performed; in the step 1000a, the linear solenoid 107n is mounted in a transmission; under an oil temperature environment of the reference temperature, for example, 25° C., various levels of excitation currents are supplied to the electromagnetic coil 71n and the values of the adjusted hydraulic pressures corresponding to the excitation currents measured by the ampere meter 193 are measured by the hydraulic pressure detection device 191b and the hydraulic pressure gauge 191a. Similar measurements are implemented with the plurality of linear solenoids 107n and a plurality of measurement data items are averaged, so that the standard pressure vs. current characteristic graph represented in FIG. 6 is obtained. From this standard characteristic graph, there can be obtained the first data (A10, P10, φ10), the second data (A20, P20, φ20), the data of curvature radius R600, which is the third data; these data items specify a pair of straight lines 601a and 602a represented in FIG. 6.

Here, A10 and A20 denote predetermine supply currents having values of, for example, 25% and 75%, respectively, of the rated current of the electromagnetic coil 71n; P10 and P20 denote the average adjusted hydraulic pressures corresponding to the supply currents A10 and A20, respectively; φ10 and φ20 denote the average gradients of a pair of straight lines 601a and 602a, respectively; R600 denotes a curvature radius suitable for arc-interpolating the portion where the pair of straight lines 601a and 602a cross each other.

Next, in the step 1000b, the relationship between the actually measured pressure measured by the pressure detection device 191b and the pressure gauge 191a and the output voltage of the pressure sensor 72n measured by the voltmeter 192 is measured with a plurality of samples, so that the standard pressure detection characteristic represented in FIG. 7(A) is obtained.

An input amplifier having an amplification factor the same as that of the differential amplifier 12n in the driving circuit 170n is provided in the voltmeter 192; the output voltage of the pressure sensor 72n is measured as a voltage in terms of the input voltage of the analogue input port AD2n. From the standard characteristic graph obtained in the step 1000b, the first standard data (P10, V10, θ10), the second standard data (P20, V20, θ20), and the third standard data (Ra) in FIG. 7(A) are obtained.

The standard data items created in such a way as described above is transferred to the design department of the supply current control apparatus and then is preliminarily stored in the program memory 123 or the data memory 124.

In the step 1000c, respective outgoing adjustment works for the linear solenoids 107a through 107n are started; in the step 1001, a linear solenoid to be adjusted is set in the inspection equipment that is equivalent to a transmission, and the oil temperature in the inspection equipment is set to a reference temperature. In the step 1002, the pressure detection characteristic represented in FIG. 7(B) is measured by the pressure detection device 191b, the pressure gauge 191a, and the voltmeter 192; in the step 1003, the first and second line segments 701b and 702b in FIG. 7(B) are specified; in the step 1004, a first discrete data (P10, V1n, θ1n), a second discrete data (P20, V2n, θ2n) are obtained, and then the first correction coefficient (V1n/V10, θ1n/θ10) and the second correction coefficient (V2n/V20, θ2n/θ20) are calculated.

In the step 1005, based on the list in FIG. 8 and the adjustment coefficients and the gradient coefficients included in the first and second correction coefficients calculated in the step 1004, the resistance values of the label resistors 73n and 74n are adjusted. In the step 1006, the adjustment openings 54a and 54b are filled with the seal material, so that the adjustment work is completed in the step 1010.

Figure 11:
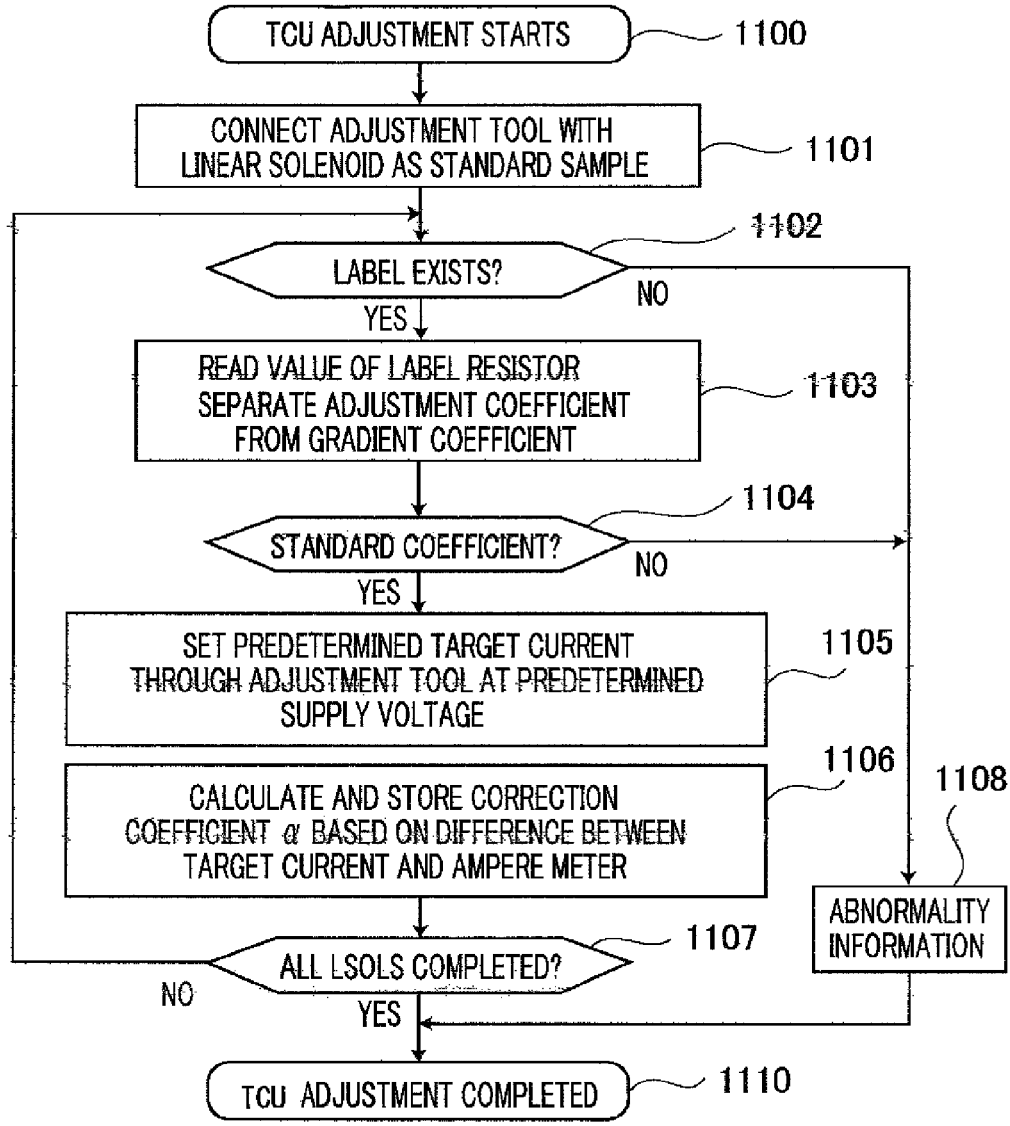
FIG. 11 is a flowchart representing the adjustment operation of a supply current control apparatus in a transmission control apparatus and an output characteristic control method therefor according to Embodiment 1 of the present invention.

Next, the adjustment operation of the supply current control apparatus illustrated in FIG. 1 will be explained. FIG. 11 is a flowchart representing the adjustment operation of a supply current control apparatus in a transmission control apparatus and an output characteristic control method therefor according to Embodiment 1 of the present invention. In FIG. 11, in the step 1100, the outgoing adjustment work for the supply current control apparatus 120U is started. In the step 1101, the adjustment tool 190 with which, as illustrated in FIG. 3, the ampere meter 193 are connected is connected with the supply current control apparatus 120U; concurrently, a linear solenoid, which is a standard sample, is connected with the driving circuit 170n in the supply current control apparatus 120U. The label resistors in the linear solenoid, which is the standard sample, are preliminarily set to their standard states so that the adjustment coefficient and the gradient coefficient each become "1.0".

In the step 1102, the value of the label resistor provided in the linear solenoid connected, as a standard sample, with the driving circuit 170n is read, and it is determined whether or not a predetermined resistance value can be read; in the case where the predetermined resistance value can be read, the result of the determination becomes "YES", and then, the step 1102 is followed by the step 1103; in the case where the predetermined resistance value cannot be read, the result of the determination becomes "NO", and then, the step 1102 is followed by the step 1108.

The resistance value R73n (R74n) of the label resistor 73n (74n) is calculated by dividing the digital conversion value of the voltage Vad3n (Vad4n), across the label resistors 73n (74n), that is inputted to the analogue input port AD3n (AD4n) in FIG. 3 by the value of current flowing in the label resistor 73n (74n). The value of the current flowing in the label resistor 73n (74n) is calculated by dividing the voltage obtained by subtracting the voltage Vad3n (Vad4n) across the label resistor 73n (74n) from the value of the control voltage Vcc by the resistance value R13n (R14n) of the series resistor 13n (R14n).

In the step 1103, the adjustment coefficient and the gradient coefficient are separated from the read resistance value of the label resistor; in the step 1104, it is determined whether or not both the adjustment coefficient and the gradient coefficient, which have been extracted in the step 1103, are the standard coefficient of "1.0"; in the case where both the adjustment coefficient and the gradient coefficient are the standard coefficient of "1.0", the result of the determination becomes "YES", and then the step 1104 is followed by the step 1105; in the case where both the adjustment coefficient and the gradient coefficient are not the standard coefficient of "1.0", the step 1104 is followed by the step 1108, where it is checked whether or not the reading function for the label resistors 73n and 74n are normal.

The step 1105 is a step in which under the condition that the predetermined supply voltage Vbb is, for example, DC 14[V], a predetermined target current Isn, which is, for example, the rated current of the electromagnetic coil 71n, is set through the adjustment tool 190 and is applied to the electromagnetic coil 71n. The step 1106 is a step that functions as a correction control constant storage means in which the excitation current Ifn measured by the ampere meter 193 is read, and then a current correction coefficient [α=Isn/Ifn] for the target current Isn is calculated and stored in the program memory 123 or the data memory 124.

In the case where attention is paid to a monitoring voltage Vfn which is the digital conversion value of a voltage proportional to the voltage V16n, across the current detection resistor 16n, that is inputted to the analogue input port AD1n and correction is applied to the monitoring voltage Vfn, a voltage correction coefficient 1/α becomes Ifn/Isn.

In the step 1107, it is determined whether or not in the step 1106, the calculation and storage of the correction control constant α has been completed for each of the driving circuits 170a through 170n in the supply current control apparatus 120U; in the case where, the calculation and storage of the correction control constant α has not been completed, the result of the determination becomes "NO" and a linear solenoid, which is the standard sample, is connected with the driving circuit that is subject to the adjustment next time, and then the step 1102 is resumed; in the case where the calculation and storage of the correction control constant α has been completed for each of the driving circuits 170a through 170n, the result of the determination becomes "YES", and then the step 1107 is followed by the step 1110 where the adjustment is completed.

In the step 1108, abnormality information is inputted to the adjustment tool 190 in the case where in the step 1102 or 1104, the result of the determination becomes "NO"; then, the step 1108 is followed by the step 1110 where the adjustment is completed.

In the case where an inherent variation in the amplification factor of the differential amplifier 12n cannot be neglected, the detection voltage obtained by the voltmeter 192 and the digital conversion value, of the input voltage to the analogue input port AD2n, that is obtained by the multi-channel A/D converter 125 are compared with each other after the step 1106 has been completed, so that a correction coefficient, with which they coincide with each other, can preliminarily be calculated.

Next, the driving operation of a transmission control apparatus according to Embodiment 1 of the present invention will be explained.

Figure 12A:
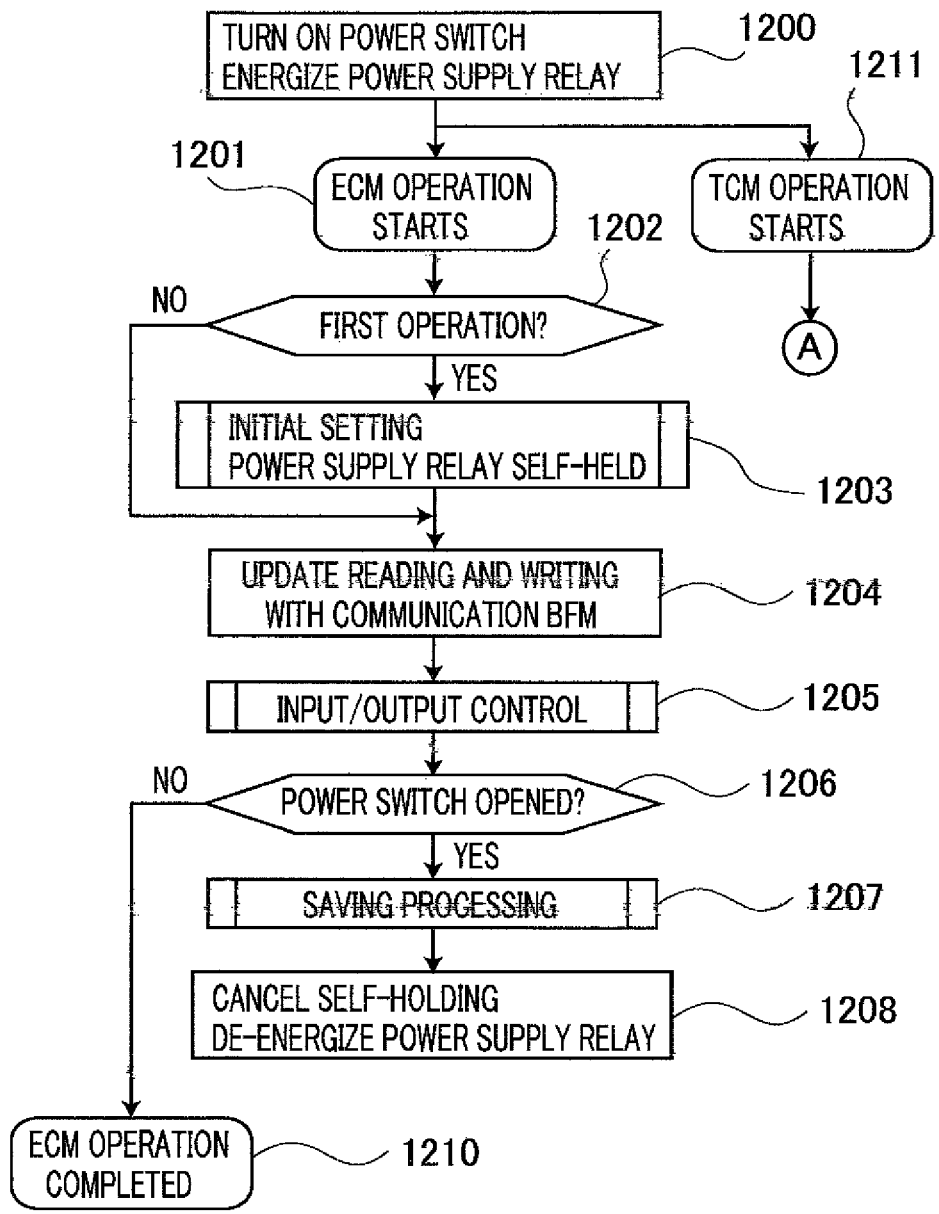
FIGS. 12A and 12B are a set of flowcharts representing the driving operation of a transmission control apparatus according to Embodiment 1 of the present invention.
Figure 12B:
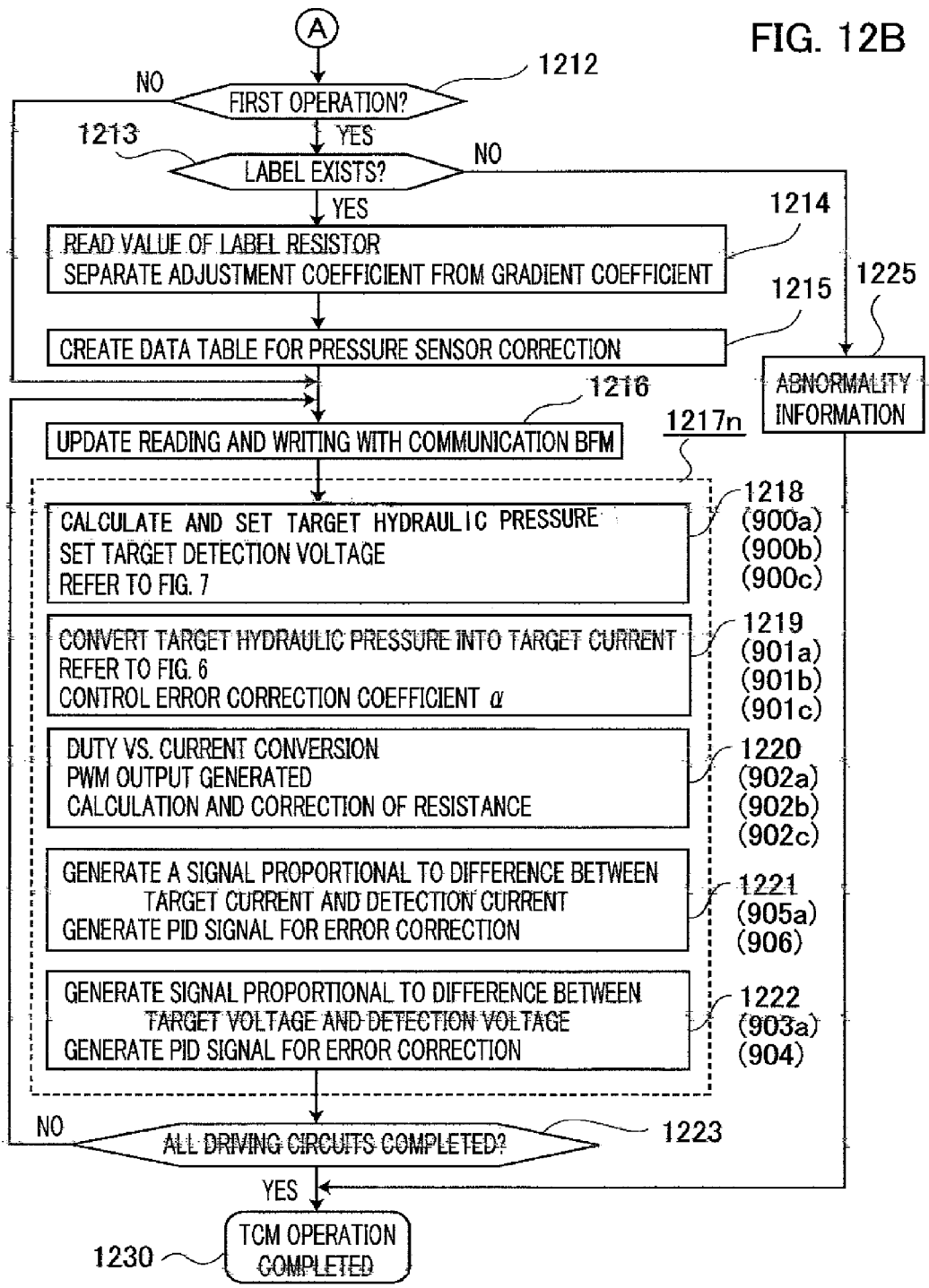

FIGS. 12A and 12B are a set of flowcharts representing the driving operation of the transmission control apparatus according to Embodiment 1 of the present invention. In FIG. 12A, in the step 1200, the unillustrated power switch is closed; the power supply relay in FIG. 1 is energized so as to close the output contact 103; then, electric power is supplied to the engine control apparatus 110U and the supply current control apparatus 120U. In the step 1201, the constant voltage power source 110a in the engine control apparatus 110U generates a predetermined control voltage Vcc, so that the microprocessor 111 starts its operation.

In the step 1211, the constant voltage power source 120a in the supply current control apparatus 120U generates a predetermined control voltage Vcc, so that the microprocessor 121 starts its operation. In the step 1202 following the step 1201, it is determined, from the operation state of an unillustrated flag memory, whether or not the present flow is a control flow that is implemented for the first time after the power switch has been closed; in the case where the present flow is a control flow that is implemented for the first time, the result of the determination becomes "YES", and then the step 1202 is followed by the step block 1203; in the case where the present flow is not a control flow that is implemented for the first time, the result of the determination becomes "NO", and then, the step 1202 is followed by the step 1204. In the step block 1203, initialization processing is applied to the RAM memory 112, and the self-holding command signal for the power supply relay is generated; then, the step block 1203 is followed by the step 1204.

In the step 1204, reading and updating writing are performed in a buffer memory provided in the serial-parallel converter 116 that mutually communicate with the microprocessor 121 in the supply current control apparatus 120U. The step 1204 is timely implemented in the step block 1205, described later. In the step block 1205, the group of electric loads 105 is driven and controlled in response to the operation states of the first group of sensors 104, the operation state of the input signal received from the microprocessor 121 in the step 1204, and the contents of an input/output control program stored in the program memory 113.

In the step block 1205, the throttle valve opening degree, the fuel injection amount, or the ignition timing, in the case of a gasoline engine, is controlled in such a way that the output torque of the engine is generated in accordance with the accelerator-pedal depressing degree and the engine rotation speed; when the transmission gear ratios of the transmission are being changed, control synchronized with the supply current control apparatus 120U is implemented in such a way that the engine rotation speed smoothly rises or falls.

The step 1206 is periodically implemented in the step block 1205; in the step 1206, it is determined whether or not the unillustrated power switch has been opened; in the case where the unillustrated power switch is still closed, the result of the determination becomes "NO", and then the step 1206 is followed by the step 1210 where the operation is completed; in the case where the unillustrated power switch has been opened, the result of the determination becomes "YES", and then the step 1206 is followed by the step 1207.

In the step block 1207, the fact that the power switch has been opened is informed to the supply current control apparatus 120U, and important data items, such as learning information and abnormality occurrence information, that have been written in the RAM memory 112 when the step block 1205 was implemented, are transmitted to and stored in the data memory 114; when a power-off permission signal is received from the supply current control apparatus 120U, the step 1207 is followed by the step 1208. In the step 1208, when the self-holding command signal generated in the step block 1203 is cancelled, the power supply relay is de-energized, whereby the output contact 103 is opened and hence the power supply to the engine control apparatus 110U and the supply current control apparatus 120U is stopped.

In this regard, however, in the engine control apparatus 110U, the constant voltage power source 110b, which is supplied with electric power directly from the vehicle battery 102, continues the power supply to part of the regions of the RAM memory 112. In the step 1210 where the operation is completed, the other control programs are implemented; then, within a predetermined time, the step 1201 is resumed and then the steps 1201 through 1210 are recurrently implemented.

In the step 1212 following the step 1211, it is determined, from the operation state of an unillustrated flag memory, whether or not the present flow is a control flow that is implemented for the first time after the power switch has been closed; in the case where the present flow is a control flow that is implemented for the first time, the result of the determination becomes "YES", and then the step 1212 is followed by the step block 1213; in the case where the present flow is not a control flow that is implemented for the first time, the result of the determination becomes "NO", and then, the step 1212 is followed by the step 1216. In the step 1213, as is the case with the step 1102 in FIG. 11, the values of the label resistors 73n and 74n provided in the linear solenoid 107n, which is actually connected with the driving circuit 170n, are read, and it is determined whether or not predetermined resistance values can be read; in the case where the predetermined resistance values can be read, the result of the determination becomes "YES", and then, the step 1213 is followed by the step 1214; in the case where the predetermined resistance values cannot be read, the result of the determination becomes "NO", and then, the step 1213 is followed by the step 1225.

In the step 1214, the adjustment coefficient and the gradient coefficient are separated from the read resistance values of the label resistors; in the step 1215, based on the adjustment coefficient and the gradient coefficient extracted in the step 1214, there is created a data table for the pressure detection characteristic represented in FIG. 7(B); then, the step 1215 is followed by the step 1216.

In the step 1216, reading and updating writing are performed in a buffer memory provided in the serial-parallel converter 126 that mutually communicate with the microprocessor 111 in the engine control apparatus 110U; the step 1216 is timely implemented in the step block 1217n, described later. In the step block 1217n is a negative feedback control block consisting of the steps 1218 through 1222. In the step 1218, in response to the operation states of the gearshift sensor, the vehicle speed sensor, and the accelerator position sensor inputted from the second group of sensors 106, the target hydraulic pressures are selectively set for, for example, one to two of four to six linear solenoids, and with reference to the data table created in the step 1215, the target detection voltage corresponding to the target hydraulic pressure is set.

In the step 1218, the control blocks 900a, 900b, and 900c represented in FIG. 9 are implemented. In the step 1219, based on the target hydraulic pressure set in the step 1218 and the standard pressure vs. current characteristic, a target current is set, and by use of the correction coefficient α calculated in the step 1106 of FIG. 11, a control error caused in the driving circuit 170n is corrected; in the step 1219, the control blocks 901a, 901b, and 901c represented in FIG. 9 are implemented.

In the step 1220, in accordance with the target current set in the step 1219, the conductive duty of the control on/off device 10n is calculated so as to generate the control signal PWM; the control blocks 902a, 902b, and 902c represented in FIG. 9 are implemented. Accordingly, in the step 1220, the conductive duty can be corrected also through the value of the power-supply voltage Vbb or the present resistance value of the electromagnetic coil 71n. In the step 1221, based on a difference signal proportional to the difference between the target current set in the step 1219 and the detection current proportional to the excitation current, for the electromagnetic coil 71n, that is inputted to the analogue input port AD1n, the PID control signal for the difference signal is generated; the control blocks 905a and 906 represented in FIG. 9 are implemented.

In the step 1222, based on a difference signal proportional to the difference between the target hydraulic pressure set in the step 1218 and the detection voltage proportional to the detection output, of the pressure sensor 72n, that is inputted to the analogue input port AD1n, the PID control signal for the difference signal is generated; the control blocks 903a and 904 represented in FIG. 9 are implemented.

In the step 1223, it is determined whether or not negative feedback control of part, of the linear solenoids 107a through 107n, that are selectively determined has been completed in the step block 1217; in the case where the feedback control has not been completed, the result of the determination becomes "NO", and then the step 1216 is resumed; in the case where the feedback control has been completed, the result of the determination becomes "YES", and then the step 1223 is followed by the step 1230 where the operation is completed. In the step 1230 where the operation is completed, the other control programs are implemented; then, within a predetermined time, the step 1211 where the operation is started is resumed and then the steps following the step 1211 are recurrently implemented.

In the step 1225, in response to the result "NO" of the determination in the step 1213, an abnormality is notified, and then the step 1225 is followed by the step 1230 where the operation is completed.

In the foregoing explanation, the step 1215, which is a label resistor reading and conversion means, is implemented each time and immediately after the power is turned on; therefore, the data table of the pressure vs. current characteristic for the utilized pressure sensor is stored in the RAM memory 122 and does not need to be transmitted to and stored in the nonvolatile data memory 124. However, as the timing of implementing the step 1215, in the case where the label resistor reading and conversion means is implemented when the power switch is turned on for the first time after the terminal of the vehicle battery 102 has been detached and attached, the data table needs to be transmitted to and stored in the nonvolatile data memory 124.

(3) Variant Example of Embodiment 1

In the above explanation, the microprocessor 121 sets a target current corresponding to the target hydraulic pressure and performs negative feedback control so that the value of an actually measured current detected by the current detection resistor 16n coincides with the target current; however, it may also be allowed that the microprocessor 121 performs only setting of a target current, supplies a setting voltage proportional to the target current to a negative feedback control circuit provided in the driving circuit 170n, performs PID control by use of the monitoring voltage, which is obtained by amplifying the voltage across the current detection resistor 16n, as the negative feedback signal, and performs duty control of the control on/off device 10n.

The microprocessor 121 may generate only a target hydraulic pressure and perform negative feedback control in such a way that the target hydraulic pressure and the detection hydraulic pressure coincide with each other or a negative feedback control circuit provided in the driving circuit 170n may directly control the exciting current for the electromagnetic coil 71n.

Figure 13:
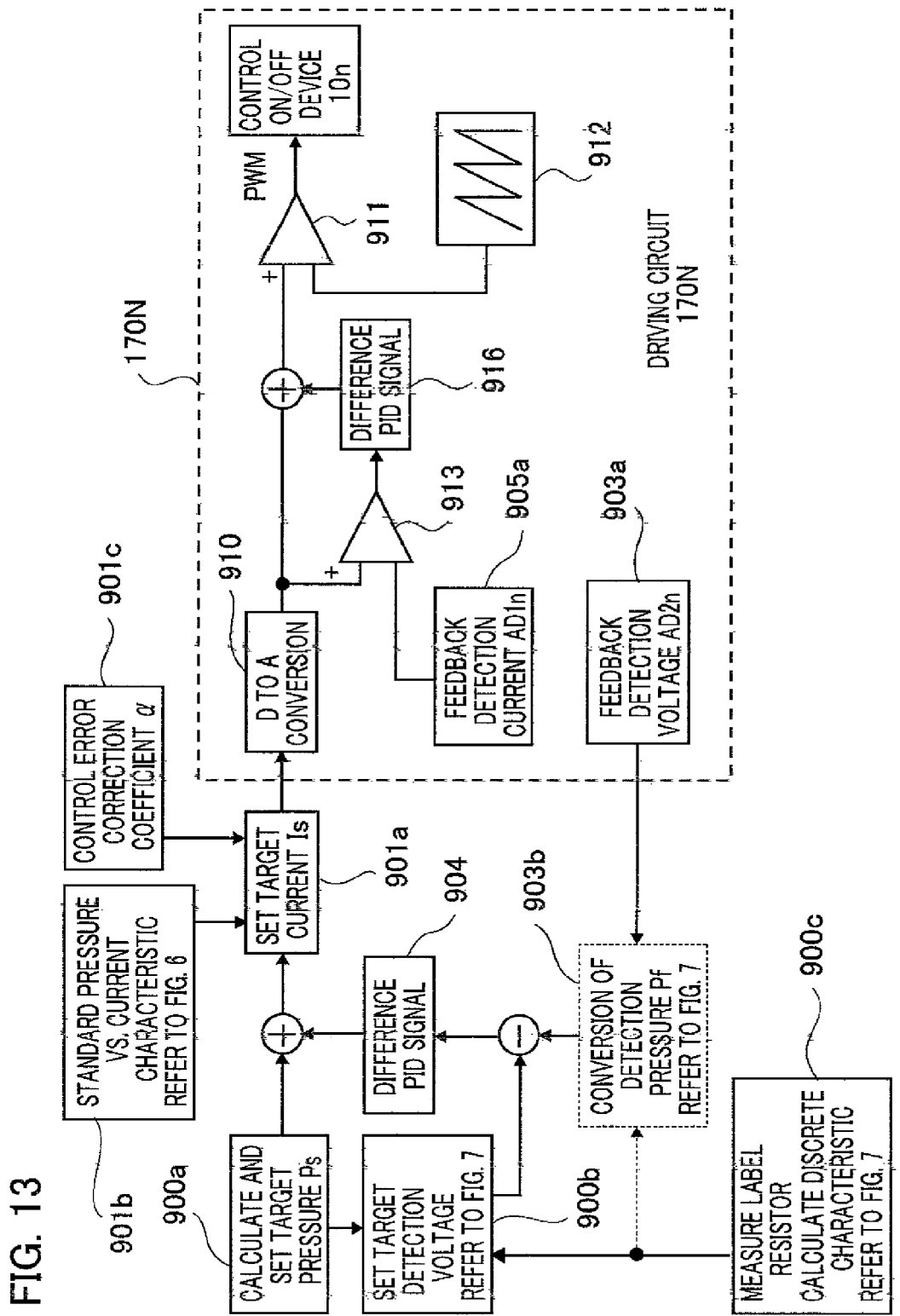
FIG. 13 is a control block diagram illustrating a variant example of supply current control apparatus in a transmission control apparatus according to Embodiment 1 of the present invention.

Next, a variant example of the supply current control apparatus will be explained. FIG. 13 is a control block diagram illustrating a variant example of supply current control apparatus in a transmission control apparatus according to Embodiment 1 of the present invention. In FIG. 13, as is the case with FIG. 9, in collaboration with the program memory 123, the microprocessor 121 implements the control blocks 900a, 900b, and 900c, the control blocks 901a, 901b, and 901c, and the control blocks 903b and 904; however, the hardware in the driving circuit 170N performs the operation of the other control circuits surrounded by the dotted line.

A control circuit 910, which is a D/A conversion circuit, converts the digital value of a target current generated by the microprocessor 121 in the control block 901a into an analogue value. Specifically, the microprocessor 121 generates a pulse signal having a conductive duty proportional to the target current, and in the control circuit 910, the pulse signal is smoothed by a resistor/capacitor circuit, so that an analogue signal voltage proportional to the target current is obtained.

A control circuit 911, which is a comparison circuit, compares the analogue signal voltage obtained from the control circuit 910 with a saw-tooth-wave pulse signal voltage having a predetermined cycle generated by the control circuit 912; in the case where the analogue signal voltage is higher than the saw-tooth-wave pulse signal voltage, an "H"-level logic output is generated so as to perform circuit-closing drive of the control on/off device 10n. A control circuit 913, which is a differential amplifier, compares the analogue signal voltage obtained from the control circuit 910 with the output voltage of the differential amplifier 11n illustrated in FIG. 3 and generates a difference signal proportional to the difference.

In response to a difference signal, proportional to the difference between the target current and a feedback detection current, that is obtained from the control circuit 913, a control circuit 916, which is a negative feedback control circuit, generates a PID control signal to be added to one input of the control circuit 911. Accordingly, in the case where the detection current is smaller than the target current, the proportion of the period in which the output logic of the control circuit 911 is "H" to the cycle of the logic change increases and the excitation current for the electromagnetic coil 71n is made to increase, and in the case where the detection current is larger than the target current, the excitation current is made to decrease.

As described above, by performing the current control for the electromagnetic coil 71n with hardware, the control load on the microprocessor 121 can be reduced.

Figure 14:
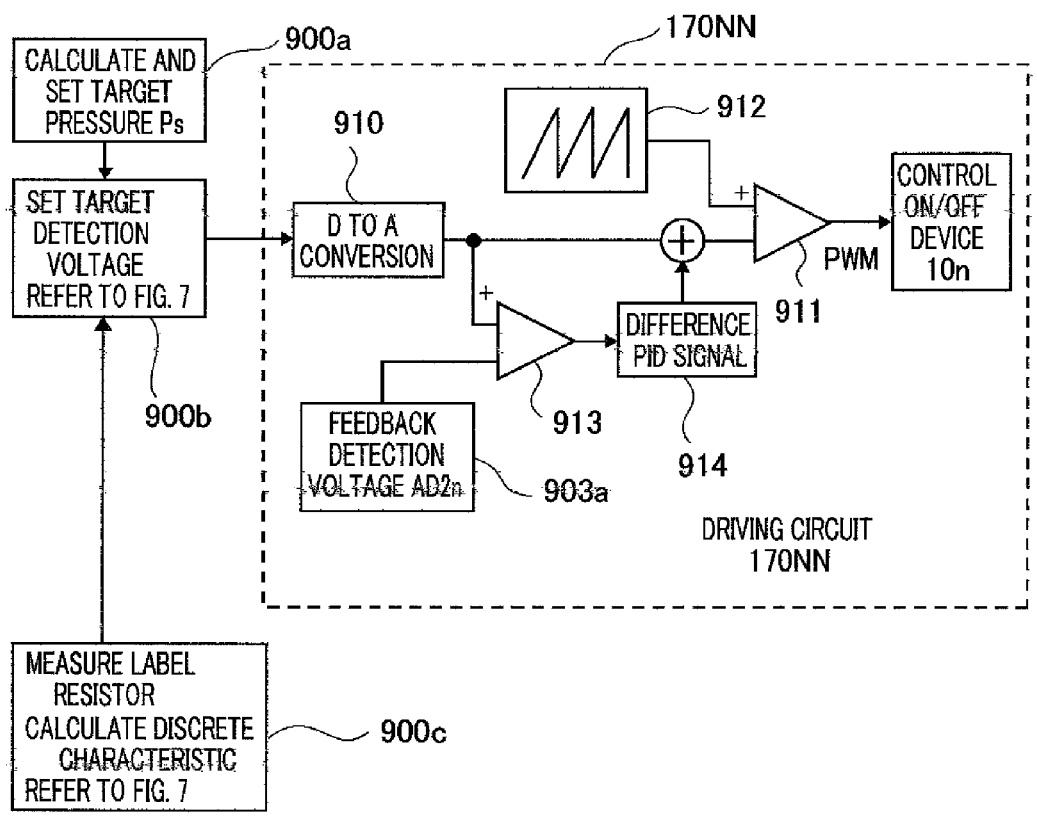
FIG. 14 is a control block diagram illustrating another variant example of supply current control apparatus in a transmission control apparatus according to Embodiment 1 of the present invention.

Next, another variant example of the supply current control apparatus will be explained. FIG. 14 is a control block diagram illustrating another variant example of supply current control apparatus in a transmission control apparatus according to Embodiment 1 of the present invention. In FIG. 14, as is the case with FIG. 9, in collaboration with the program memory 123, the microprocessor 121 implements the control blocks 900a, 900b, and 900c; however, the hardware in the driving circuit 170NN performs the operation of the other control circuits surrounded by the dotted line.

The control circuit 910, which is a D/A conversion circuit, converts the digital value of a target detection voltage, which is generated by the microprocessor 121 in the control block 900b and corresponds to the target pressure, into an analogue value. Specifically, the microprocessor 121 generates a pulse signal having a conductive duty proportional to the target detection voltage, and in the control circuit 910, the pulse signal is smoothed by a resistor/capacitor circuit, so that an analogue signal voltage proportional to the target detection voltage is obtained. The control circuit 911, which is a comparison circuit, compares the analogue signal voltage obtained from the control circuit 910 with a saw-tooth-wave pulse signal voltage having a predetermined cycle generated by the control circuit 912; in the case where the saw-tooth-wave pulse signal voltage is higher than the analogue signal voltage, an "H"-level logic output is generated so as to perform circuit-closing drive of the control on/off device 10n.

The control circuit 913, which is a differential amplifier, compares the analogue signal voltage obtained from the control circuit 910 with the output voltage of the differential amplifier 12n illustrated in FIG. 3 and generates a difference signal proportional to the difference. In response to a difference signal, proportional to the difference between the target detection voltage and a feedback detection voltage, that is obtained from the control circuit 913, a control circuit 914, which is a negative feedback control circuit, generates a PID control signal to be added to one input of the control circuit 911.

Accordingly, in the case where the feedback detection voltage is smaller than the target detection voltage, the proportion of the period in which the output logic of the control circuit 911 is "H" to the cycle of the logic change decreases and the excitation current for the electromagnetic coil 71n is made to decrease, and in the case where the feedback detection voltage is larger than the target detection voltage, the excitation current is made to increase.

As described above, by performing the current control for the electromagnetic coil 71n with hardware, the control load on the microprocessor 121 can be reduced. Because no current detection circuit is provided in this variant example of supply current control apparatus, the circuit configuration is simplified and hence an inexpensive driving circuit can be obtained.

In addition, the operations of the control circuits 912 through 914 illustrated in FIG. 14 can be performed in the microprocessor 121 by the microprocessor 121 and the program memory 123; in this case, the control circuit 910, which is a D/A converter, is not required, and the feedback detection voltage AD2$n$ is A/D-converted by the multi-channel A/D converter 125 and is inputted to the microprocessor 121.

(4) Gist and Feature of Embodiment 1

As is clear from the foregoing explanation, a transmission control apparatus 100 according to Embodiment 1 of the present invention is provided with linear solenoids 107$a$ through 107$n$ that each act on hydraulic pressure adjustment valves incorporated in a vehicle transmission and generate adjustment hydraulic pressure outputs corresponding to supply currents; and a supply current control apparatus 120U for the linear solenoids.

In the linear solenoid, an electromagnetic coil 71$n$, a pressure sensor 72$n$ that detects an adjusted hydraulic pressure, and a plurality of label resistors 73$n$ and 74$n$ having a resistance value that serves as parameter data for correcting an inherent variation in the performance characteristic of the pressure sensor 72$n$ are integrated with one another.

The supply current control apparatus is provided with driving circuit 170$a$ through 170$n$ that operate with a supply voltage Vbb, which is the output voltage of a power supply on/off device 120$c$ connected between a vehicle battery 102 and all the plurality of linear solenoids, and a control voltage Vcc, which is the output voltage of a constant voltage power source 120$a$ that is supplied with electric power from the vehicle battery 102; and a control module 120M.

The driving circuit is provided with a measurement circuit that measures the resistance values of resistors for supplying electric power to the label resistors 73$n$ and 74$n$ and a control on/off device 10$n$ that is discretely and directly connected with the other terminal of the linear solenoid.

The control module includes a microprocessor 121 that generates a command signal for controlling the conduction state of the control on/off device 10$n$, a RAM memory 122 that collaborates with the microprocessor, a program memory 123, a nonvolatile data memory 124 that is provided in part of the region of the program memory or is provided in such a way as to be separated from the program memory, and a multi-channel A/D converter 125 to which, as a reference voltage, the control voltage Vcc is applied.

The program memory 123 is provided with a control program that functions as a label resistor reading and conversion means 1215.

In collaboration with the driving circuits 170$a$ through 170$n$, the microprocessor 121 controls an energizing current for the electromagnetic coil 71$n$ in such a way that the adjusted hydraulic pressure detected by the pressure sensor 72$n$ becomes equal to a target setting hydraulic pressure.

The label resistor reading and conversion means 1215 calculates the resistance values of the label resistors 73$n$ and 74$n$, based on the proportion of the measured current that flows from the measurement circuit to the label resistor 73$n$ (or 74$n$) to the measured voltage applied to the label resistor 73$n$ (or 74$n$), calculates or selectively determines, based on the calculated resistance values, parameter data for correcting an inherent variation in the pressure detection characteristic of the pressure sensor 72$n$, and stores the parameter data in the data memory 124 or the RAM memory 122.

The label resistor reading and conversion means 1215 is implemented at an operation start timing when the power switch is turned on; even when a linear solenoid is replaced for maintenance, the pressure detection characteristic of the pressure sensor 72$n$ can be corrected in accordance with the resistance values of label resistors added to the replaced linear solenoid.

The label resistors 73$n$ and 74$n$ are sealed in an airtight manner with a sealing resin 50; as the label resistors 76$n$, there are utilized laser-trimming resistors whose resistance values are adjusted through the adjusting window 54$a$ and 54$b$ provided in the sealing resin 50 while the resistance values are measured and monitored.

As described above, while the resistance values of the label resistors are measured, laser trimming is performed through the adjusting windows. Accordingly, there is demonstrated a feature that through post-processing after air-tight mounting of the label resistors, continuous adjustment for label resistors having a high-accuracy resistance value can be performed while the resistance values of the label resistors are measured.

The digital conversion values of the label resistor 73$n$ and 74$n$ measured by the microprocessor 121 are each utilized in such a way as to be divided into a group of high-order bits and a group of low-order bits.

Any one of the group of high-order bits and the group of low-order bits of the label resistor 73$n$ (74$n$) is a first parameter for selecting an adjustment coefficient, which is the proportion of a detection output of the pressure sensor corresponding to a predetermined hydraulic pressure to the standard detection output, which is the average value of the detection outputs of a plurality of samples; the other one of the group of high-order bits and the group of low-order bits of the label resistor 73$n$ (74$n$) is a second parameter for selecting a gradient coefficient, which is the proportion of the gradient of the detection output vs. hydraulic pressure characteristic of the pressure sensor to the standard gradient, which is the average value of the gradients of the plurality of samples.

Alternatively, the group of high-order bits and the group of low-order bits of the label resistor 73$n$ (74$n$) represent first and second adjustment coefficients, which are proportions of the first and second detection outputs corresponding to first and second predetermined hydraulic pressures of the pressure sensor to the first and second standard detection outputs, which are average values of the detection outputs of the plurality of samples.

One of the first and second adjustment coefficients becomes the first parameter; based on the first and second adjustment coefficients, the gradient coefficient is calculated and becomes the second parameter.

As described above, a single label resistor provided in the linear solenoid makes it possible to identify the characteristic correction coefficients, i.e., the adjustment coefficient and the gradient coefficient. As a result, an inherent variation in the detection output vs. hydraulic pressure characteristic of a utilized pressure sensor is corrected and the excitation current for an electromagnetic coil is controlled based on the corrected detection output, so that an accurate adjusted hydraulic pressure can be obtained.

An output characteristic adjustment method for a transmission control apparatus according to Embodiment 1 of the present invention is configured in such a way that an adjustment tool 190 is connected with the microprocessor 121 and the standard detection output and a discrete detection characteristic of the pressure sensor 72$n$ are preliminarily measured; standard detection characteristic data of the pressure sensor 72$n$ measured by the adjustment tool 190 is stored in the program memory 123 or the data memory 124; a pressure detection device 191$b$, a pressure gauge 191$a$, and a voltmeter 192 are connected with the adjustment tool 190, and the average characteristic obtained by measuring the relationship, in a plurality of samples, between the actually measured hydraulic pressure obtained by measuring the hydraulic pressure applied to the pressure sensor 72n and the actually measured detection output voltage of the pressure sensor 72n is approximated with a first line segment 701a having a first gradient θ10 and a second line segment 702a having a second gradient θ20; the standard detection characteristic data includes first standard data (P10, V10, θ10) based on a first actually measured pressure P10 on the first line segment 701a and a first detection output V10 and second standard data (P20, V20, θ20) based on a second actually measured pressure P20 on the second line segment 702a and a second detection output V20; discrete detection characteristic data is measured in the outgoing inspection of the linear solenoid 107n; a pressure detection device 191b, a pressure gauge 191a, and a voltmeter 192 are connected with the adjustment tool 190, and the relationship between the actually measured hydraulic pressure obtained by measuring the hydraulic pressure applied to the pressure sensor 72n, which is an inspection subject, and the actually measured detection output voltage of the pressure sensor 72n is measured and is approximated with a first line segment 701b having a first gradient θ1n and a second line segment 702b having a second gradient θ2n; the discrete detection characteristic data includes first discrete data (P10, V1n, θ1n) based on the first actually measured pressure P10 on the first line segment 701b and a first detection output V1n and second discrete data (P20, V2n, θ2n) based on the second actually measured pressure P20 on the second line segment 702b and a second detection output V2n; the resistance values of one of the plurality of label resistors 73n and the plurality of label resistors 74n are adjusted to resistance values for specifying the value of the first adjustment coefficient (V1n/V10) related to the first line segment 701b and the value of the first gradient coefficient (θ1n/θ10), and the resistance values of the other one of the plurality of label resistors 73n and the plurality of label resistors 74n are adjusted to resistance values for specifying the value of the second adjustment coefficient (V2n/V20) related to the second line segment 702b and the value of the second gradient coefficient (θ2n/θ20); the microprocessor 121 reads the resistance values of the plurality of label resistors 73n and 74n and extracts, through predetermined equations or a data table, the values of the first adjustment coefficient (V1n/V10) and the first gradient coefficient (θ1n/θ10), which configure a first correction coefficient, and the values of the second adjustment coefficient (V2n/V20) and the second gradient coefficient (θ2n/θ20), which configure a second correction coefficient; and then the microprocessor 121 specifies the equation for a first discrete line segment 701b based on the first standard data (P10, V10, θ10) and the first correction coefficient, specifies the equation for a second discrete line segment 702b based on the second standard data (P20, V20, θ20) and the second correction coefficient, and obtains, through the specified discrete broken-line characteristic, a corrected detection hydraulic pressure from the detection output of the pressure sensor.

As described above, in the output characteristic adjustment method for a transmission control apparatus according to Embodiment 1 of the present invention, the pressure detection characteristic of a pressure sensor is approximated with a broken line consisting of a first line segment and a second line segment; two label resistors are provided in a linear solenoid; and the difference between the characteristic of a subject linear solenoid and a standard characteristic obtained through a plurality of samples is represented by the adjustment coefficient and the gradient coefficient for each line segment. Accordingly, a complicated pressure detection characteristic can be represented by the resistance values of the label resistors; thus, there is demonstrated a feature that an inherent variation in the pressure detection characteristic of a pressure sensor can be corrected with a simple configuration.

The standard detection characteristic data stored in the program memory 123 or the data memory 124 further includes a curvature radius Ra, as a third standard data, for arc-interpolating the portion where the first line segment 701a and the second line segment 702a cross each other; the portion where the first line segment 701b and the second line segment 702b of the discrete detection characteristic data cross each other is arc-interpolated by use of the curvature radius Ra stored as the third standard data.

As described above, the portion, in a discrete detection characteristic, where broken lines cross each other is arc-interpolated by use of the curvature radius, for the standard detection characteristic, that is stored as a standard characteristic data.

Accordingly, there is demonstrated a feature that a detection error caused by broken-line approximation can be reduced without specifying a curvature radius through label resistors.

The program memory 123 includes a control program that serves as a target current setting means 1219, and an equation or a data table that serves as a standard pressure vs. current characteristic data is stored in the program memory 123 or the data memory 124; the standard pressure vs. current characteristic is a characteristic obtained by averaging, through a plurality of samples, the characteristics, related to the adjusted hydraulic pressure vs. excitation current for the electromagnetic coil 71n, that are measured for the linear solenoids 107a through 107n by use of the ampere meter 193, the pressure detection device 191b, and the pressure gauge 191a provided as test equipment; the target current setting means 1219 calculates the target current, corresponding to a target adjusted hydraulic pressure, that is obtained from the standard characteristic data and sets a target excitation current value for the electromagnetic coil 71n; and the microprocessor 121 and the driving circuits 170a through 170n collaborate with one another and correct the target current at least through an error integration value when there exists an error between the target hydraulic pressure and the corrected detection hydraulic pressure.

As described above, the microprocessor 121 sets a target current, based on the standard pressure vs. current characteristic of a linear solenoid, and corrects the target current, in the case where there exists an error between the target hydraulic pressure and the detection hydraulic pressure.

Accordingly, there is demonstrated a feature that when there occurs a transition from a linear solenoid non-control state in which the electromagnetic coil is not excited or fully excited to a linear solenoid control state in which a predetermined target hydraulic pressure is obtained, the linear solenoid is immediately energized with a target current through which the target hydraulic pressure is to be obtained and hence the target hydraulic pressure can rapidly be obtained.

The program memory 123 or the data memory 124 stores adjustment data, which is a control error correction coefficient α, and the target current setting means 1219 includes a control program that serves as a current control error correction means; with regard to the adjustment data, the correction coefficient α is calculated through the equation [α=Is0/If0], when at the stage of outgoing adjustment for the supply current control apparatus 120U, a linear solenoid, as the standard sample, is connected with the supply current control apparatus, a target current Is0 is set by use of the adjustment tool 190 connected with the microprocessor 121, and the value of the excitation current, for the linear solenoid, that is measured by the digital ampere meter 193 connected, as inspection equipment, with the adjustment tool 190 is If0; when it is desired to set a target current Is, the microprocessor 121 sets [α×Is], as a correction target current, so that as a result, the value of the actual excitation current If coincides with the initial target current Is, or leaving the target current Is as it is, a negative feedback detection current is set to If/α so that the actual excitation current If coincides with the initial target current Is.

As described above, at the stage of outgoing adjustment for a supply current control apparatus, a correction coefficient, which is the proportion of the target current to the actually measured current, is calculated and is stored in a program memory or a data memory.

Accordingly, there is demonstrated a feature that a current control error is suppressed from being caused by an inherent variation in the resistance value of a current detection resistor, the circuit constants of a differential amplifier, or the like, and hence high-accuracy current control can be implemented.

The program memory 123 further includes a control program, which is a conductive duty calculation means 1220, and a control program, which is a current feedback control means 1221; the driving circuits 170a through 170n are each provided with the current detection resistor 16n connected in series with the electromagnetic coil 71n and amplifies the voltage across the current detection resistor 16n so as to generate a current detection signal proportional to the excitation current for the electromagnetic coil 71n; letting Rc denote the resistance value of the electromagnetic coil 71n at a reference temperature, letting Is denote the target current, and letting Vbb denote the power-supply voltage, the conductive duty calculation means 1220 calculates the conductive duty Kd, which is the proportion of the circuit-closing time of the control on/off device 10n to the on/off cycle, through the equation (1) below; and in the case where there exists an error between the target current Is and the detection current obtained through the current detection resistor 16n, the current feedback control means 1221 corrects the conductive duty Kd in an increasing manner or in a decreasing manner as the error integration value increases or decreases.

$$Kd = Is \times Rc / Vbb \quad (1)$$

As described above, the excitation current is detected by use of the current detection resistor connected in series with the electromagnetic coil, and then negative feedback control is performed in such a way that the target current and the detection current coincide with each other.

Accordingly, there is demonstrated a feature that even when the resistance value of the electromagnetic coil changes due to self-heating thereof or a change in the ambient temperature, the target current and the detection current are made to coincide with each other so that when the target hydraulic pressure is changed, the transient error in the adjusted hydraulic pressure can further be suppressed.

The conductive duty calculation means 1220 further calculates the resistance value of the electromagnetic coil 71n at a present temperature and makes the conductive duty Kd change in proportion to the calculated present resistance value; the present resistance value is obtained by calculating an average applied voltage, as the moving-average value of the product of the power-supply voltage Vbb and the conductive duties Kd in a plurality of on/off cycles of the control on/off device 10n over the immediate past time, by calculating the average current, as an moving-average value of detection currents during the same period, and by dividing the average applied voltage by the average current; and immediately after the start of driving, a predetermined fixed constant, which is the resistance value of the electromagnetic coil 71n at the reference temperature, is utilized.

As described above, in the two or more immediate past on/off cycles of the control on/off device, the present resistance values of the electromagnetic coil are sequentially calculated, and the conductive duty of the control on/off device is corrected in proportion to the present resistance value.

Accordingly, there is demonstrated a feature that even when the resistance value of the electromagnetic coil changes due to self-heating thereof or a change in the oil temperature, the conductive duty of the control on/off device can be calculated based on the target current, the power-supply voltage, and the latest present resistance value.

The supply current control apparatus 120U and the engine control apparatus 110U, which are provided in such a way as to be separated from each other, collaborate with each other so as to perform mutual communication of input/output signals; the supply current control apparatus 120U is provided on the external wall or the internal wall of the transmission case; the plurality of linear solenoids 107a through 107n provided inside the transmission case are connected with the supply current control apparatus 120U by way of a connector; and the supply current control apparatus 120U includes a single control module 120M that selectively determines the linear solenoid (107a through 107n) to be energized, sets a target hydraulic pressure for the selected linear solenoid, and generates a command signal for obtaining the set target hydraulic pressure, and a driving circuit that supplies a driving current to the corresponding linear solenoid (107a through 107n).

As described above, the supply current control apparatus, which collaborates with the engine control apparatus, collectively controls a plurality of linear solenoids connected therewith through a connector.

Accordingly, the engine control apparatus, the supply current control apparatus, and a plurality of linear solenoids can be assembled in such a way that they are freely combined with one another, and can separately be replaced for maintenance; the supply current control apparatus that collectively controls the plurality of linear solenoids can be configured at a low cost; thus, there is demonstrated a feature that the control load of the engine control apparatus can be reduced.

In an opening/closing manner, the linear solenoids 107a through 107n drive the relief valve 43b, which is the hydraulic pressure adjustment valve, by use of the plunger 43a on which electromagnetic force produced by the electromagnetic coil 71n and repulsive force caused by the spring 44 are exerted, so that at a predetermined oil temperature, there is obtained a predetermined adjusted hydraulic pressure corresponding to the supply current for the electromagnetic coil 71n; and the pressure sensor 72n is a strain gauge to which an adjusted hydraulic pressure is applied through the communication tube 45c from the pipe portion 48a, which is a path for the activation oil 49b, and the pressure sensor 72n and the label resistors 73n through 75n are molded integrally with one another with the sealing resin 50.

As described above, the difference driving force between the repulsive spring force and the electromagnetic driving force competes with the pressure of the activation oil, and the supply current is corrected in response to a change in the oil temperature, so that control is performed in such a way that a constant hydraulic pressure can be obtained.

Accordingly, even when the valve opening amount is the same, the hydraulic pressure changes depending on the fluid viscosity of the activation oil, whereby the excitation-current control alone cannot make it possible to obtain an accurate hydraulic pressure; however, by correcting the target current by use of a pressure sensor, an accurate target hydraulic pressure can be obtained even when there exists a change in the oil temperature.

Because an inherent variation in the pressure detection characteristic of the pressure sensor is corrected by use of the label resistors, adjustment for the combination of the supply current control apparatus and the linear solenoid can be eliminated.

Embodiment 2

(1) Detailed Description of Configuration

Figure 15:
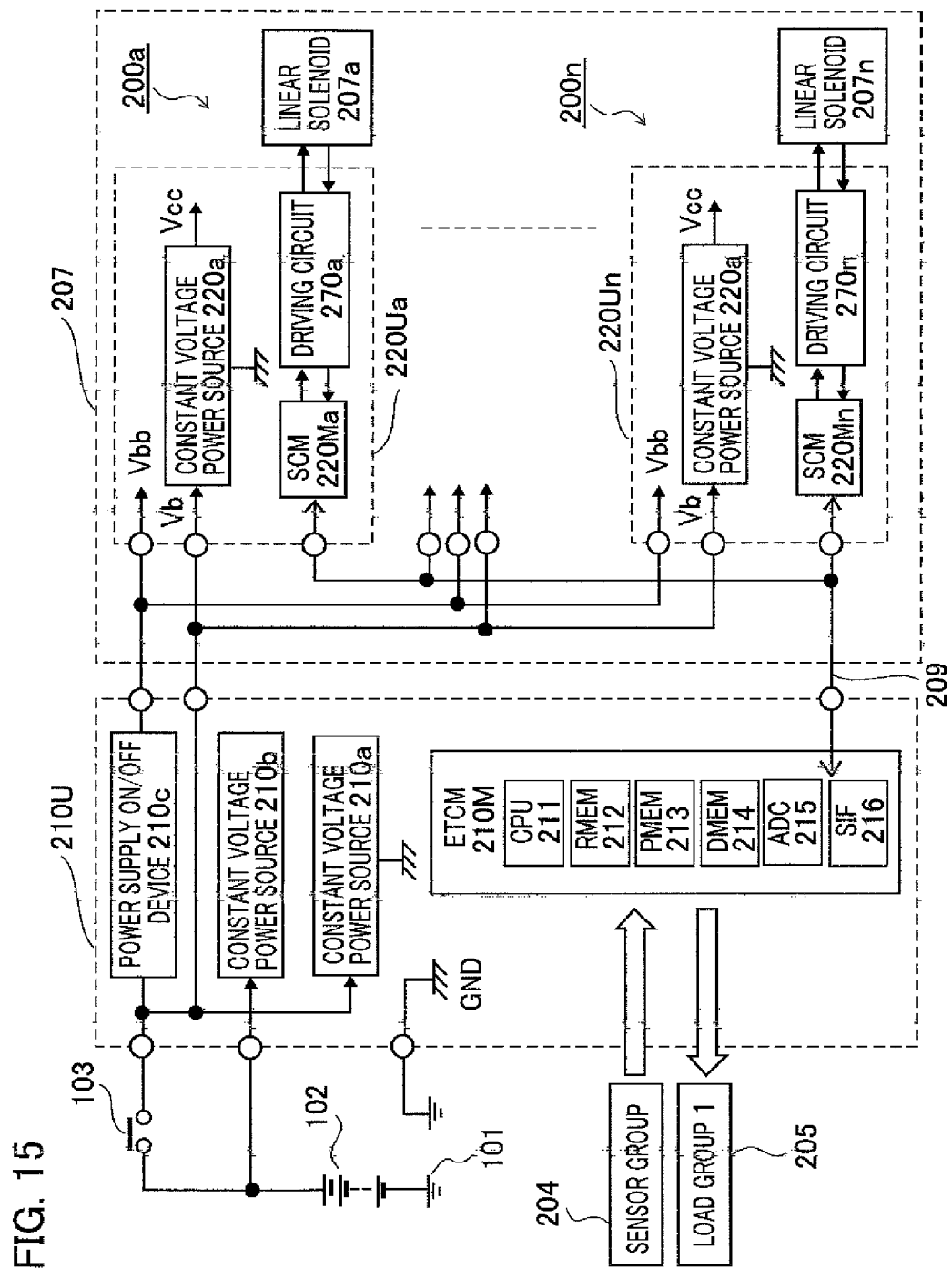
FIG. 15 is a configuration diagram of an overall transmission control apparatus according to Embodiment 2 of the present invention.

Next, a transmission control apparatus and an output characteristic adjustment method therefor according to Embodiment 2 of the present invention will be explained. FIG. 15 is a configuration diagram of an overall transmission control apparatus according to Embodiment 2 of the present invention. In the explanation below, the difference between the configuration of Embodiment 2 and the configuration, illustrated in FIG. 1, of Embodiment 1 will be mainly described. In each of the drawings, the same reference characters denote the same or similar portions; the reference characters in the 100s are replaced by the reference characters in the 200s that denote similar portions.

In FIG. 15, an engine control apparatus 210U provided in an engine room and a plurality of supply current control apparatuses 220Ua through 220Un fixed inside of a gearbox 207 of a vehicle transmission are configured in such a way as to collaborate with each other so as to control supply currents for linear solenoids 207a through 207n incorporated in the gearbox 207; in Embodiment 2, four to six supply current control apparatus 220Ua through 220Un are combined on a one-to-one basis with respective four to six linear solenoids 207a through 207n, and the respective combinations of the supply current control apparatuses and the linear solenoids form distributed-control-type transmission control apparatuses 200a through 200n.

The positive terminal of the vehicle battery 102 whose negative terminal is connected with the vehicle body ground terminal 101 supplies a battery voltage Vb to the engine control apparatus 210U and the supply current control apparatuses 220Ua through 220Un, by way of the output contact 103 of the unillustrated power supply relay.

A first group of sensors 204 whose outputs are inputted to the engine control apparatus 210U is a combination of the first group of sensors 104 and the second group of sensors 106 in FIG. 1 and includes a shift lever switch for indicating a shift lever position, a vehicle speed sensor, and the like in addition to analogue sensors, on/off switch sensors, manual command switches, or the like, such as accelerator position sensor that detects the accelerator-pedal depressing degree, a throttle position sensor that detects the intake valve opening degree of an engine, an air flow sensor that measures intake amount, an exhaust-gas sensor, an engine rotation sensor, a crank angle sensor, a power switch, and an engine starting command switch.

A group of electric loads 205 that respond to the output signals generated by the engine control apparatus 110U include, for example, a fuel-injection electromagnetic valve, an ignition coil (in the case of an gasoline engine), an intake valve opening degree control motor, a starter motor, and the like. In this regard, however, the engine control apparatus 210U includes part of the functions of the supply current control apparatus 120U in FIG. 1 in addition to the foregoing engine control functions and transmits respective hydraulic pressure command signals to the supply current control apparatuses 220Ua through 220Un byway of a communication line 209, in response to the selection position of the gearshift lever, the accelerator-pedal depressing degree, and the vehicle speed.

Inside the engine control apparatus 210U, there are provided a constant voltage power source 210a that is energized from the vehicle battery 102 by way of the output contact 103 of the power supply relay, a constant voltage power source 210b that is energized directly from the vehicle battery 102, the power supply on/off device 120c that supplies a supply voltage Vbb to the supply current control apparatuses 220Ua through 220Un, and a control module 210M. In the control module 210M, a microprocessor 211, which is a computing processing unit, a computing-processing RAM memory 212, a nonvolatile program memory 213, which is, for example, a flash memory, a nonvolatile data memory 214, a multi-channel A/D converter 215, and a serial-parallel converter 216 are connected with one another through a bus line.

In collaboration with the program memory 213, the microprocessor 211 controls the throttle valve opening degree in accordance with the accelerator-pedal depressing degree and supplies a fuel proportional to the intake amount; in the case of a gasoline engine, the ignition coil is on/off-controlled in accordance with the engine rotation speed and the fuel injection amount. In response to the selection position of the gearshift lever, the accelerator-pedal depressing degree, and the vehicle speed, the microprocessor 211 transmits respective hydraulic pressure command signals to be sent to the linear solenoids 207a through 207n through the communication line 209 and when the transmission gear ratios of the transmission are changed, the microprocessor 211 adjusts the fuel injection amount in such a way that the engine rotation speed gradually changes.

Inside each of the supply current control apparatuses 220Ua through 220Un, there is provided a constant voltage power source 220a that is energized from the vehicle battery 102 by way of the output contact 103 of the power supply relay and generates a stabilized control voltage Vcc of, for example, DC 5 V; the constant voltage power sources 220a supply electric power to respective control modules 220Ma through 220Mn and respective driving circuits 270a through 270n, described later.

Figure 16:
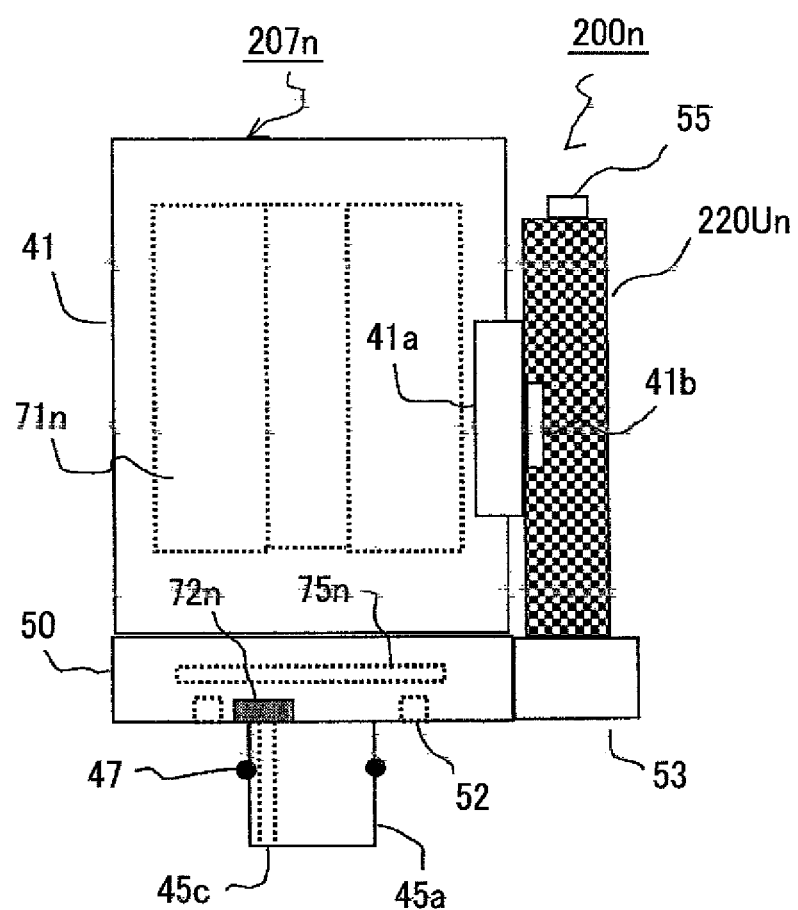
FIG. 16 is a schematic cross-sectional view of a linear solenoid in a transmission control apparatus according to Embodiment 2 of the present invention.

FIG. 16 is a schematic cross-sectional view of a linear solenoid in a transmission control apparatus according to Embodiment 2 of the present invention. In FIG. 16, in the yoke 41, which has been described in detail with reference to FIG. 4, there is provided the mounting foot 41a; the mounting foot 41a and the mounting foot 41b provided on the supply current control apparatus 220Un are fixed to each other with screws. At the opening end of the yoke 41, there are provided a label resistor 75n and a pressure sensor 72n that are integrated with each other by the sealing resin 50; the electromagnetic coil 71n and the label resistor 72n are connected with the supply current control apparatus 220U by the intermediary of the coupling connector 53. By the intermediary of the wiring connector 55, the supply current control apparatus 220Un and the engine control apparatus 210U are connected with each other through the communication line 209.

Figure 17:
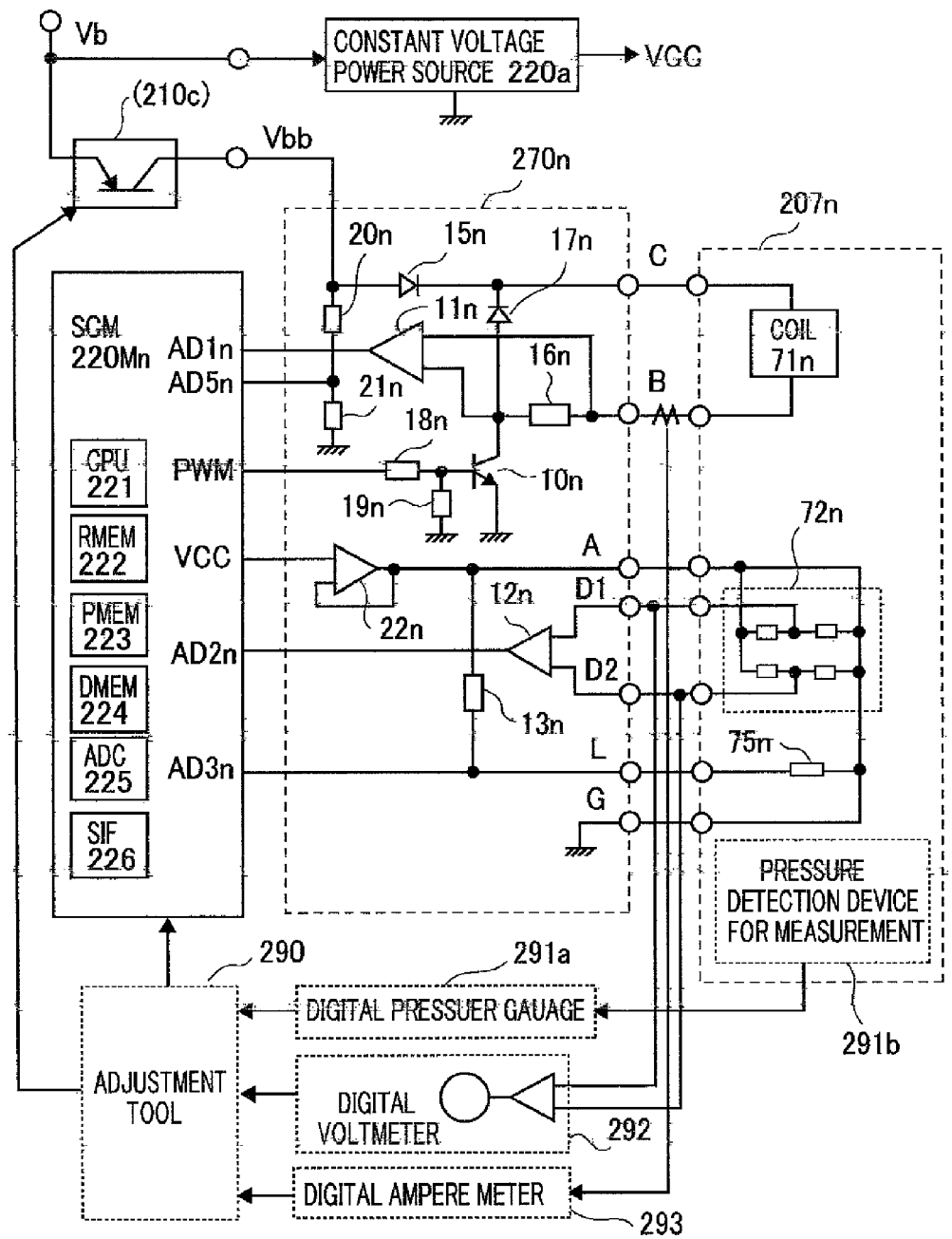
FIG. 17 is a circuit diagram of a driving circuit unit in a transmission control apparatus according to Embodiment 2 of the present invention.

Next, the driving circuit units 270a through 270n illustrated in FIG. 15 will be explained. FIG. 17 is a circuit diagram of the driving circuit unit in a transmission control apparatus according to Embodiment 2 of the present invention. In FIG. 17, each of the control modules 220Ma through 220Mn is configured in a single and the same manner; each of the driving circuits 270a through 270n is configured in a single and the same manner; each of the linear solenoids 207a through 207n is configures in a single and the same manner. Hereinafter, there will be explained the control module 220Mn that represents the control modules 220Ma through 220Mn, the driving circuit 270n that represents the driving circuits 270a through 270n, and the linear solenoid 207n that represents the linear solenoids 207a through 207n.

In the control module 220Mn, a microprocessor 221, a computing-processing RAM memory 222, a nonvolatile program memory 223, which is, for example, a flash memory, a nonvolatile data memory 224, a multi-channel A/D converter 225, and a serial-parallel converter 226 are connected with one another through a bus line. The serial-parallel converter 226 and the serial-parallel converter 216 in the engine control apparatus 210U are connected in series with each other through the communication line 209.

In response to a power supply start command issued by the microprocessor 211 in the engine control apparatus 210U, the power supply on/off device 210c that is situated in the engine control apparatus 210U and is supplied with electric power from the vehicle battery 102 byway of the output contact 103 of the power supply relay closes and generates a supply voltage Vbb to be supplied to the driving circuits 270a through 270n in the supply current control apparatuses 220Ua through 220Un.

The linear solenoid 207n is configured with the electromagnetic coil 71n having a low-resistance value of, for example, several ohms, the pressure sensor 72n that detects an adjusted hydraulic pressure, and a label resistor 75n.

The driving circuit 270n is configured in the same manner as the driving circuit 170n in FIG. 3 is configured; the driving circuit 270n that supplies the linear solenoid 207n with electric power is provided with the control on/off device 10n that responds to a control command signal PWM, the current detection resistor 16n, the reverse-flow prevention diode 15n, the commutation diode 17n, the differential amplifier 11n, the division resistors 20n and 21n, the buffer amplifier 22n, and the differential amplifier 12n. In this regard, however, instead of the pair of label resistors 73n and 74n, a single label resistor 75n, described later, is utilized. One terminal of the label resistor 75n is connected with the output terminal of the buffer amplifier 22n by way of a signal terminal L and a series resistor 13n, and the other terminal thereof is connected to the ground terminal G; a signal voltage at the signal terminal L is inputted to a multi-channel A/D converter 225 through an analogue input port AD3n.

The series resistor 13n may be situated either in the linear solenoid 207n or at the downstream side of the label resistor 75n. The method of calculating the resistance value of the label resistor 75n is the same as the method of calculating the resistance values of the label resistors 73n and 74n.

An adjustment tool 290 is connected in series with the control module 220Mn when the standard characteristic data items and discrete characteristic data items related to the adjustment pressure vs. current characteristic of the electromagnetic coil 71n and the pressure detection characteristic of the pressure sensor 72n are collected or when the current control characteristic of the supply current control apparatus 220Un is measured. The adjustment tool 290 includes the man-machine interface functions of an unillustrated operation switch, an unillustrated display panel, and the like.

A pressure gauge 291a amplifies the output signal of a pressure detection device 291b that is provided as test equipment for measurement, and inputs, as digital data, the actually measured value of an adjusted hydraulic pressure to the adjustment tool 290. The accuracy of pressure detection by the pressure gauge 291a and the pressure detection device 291b is higher than the accuracy of pressure detection by the pressure sensor 72n. A voltmeter 292 amplifies the detection output voltage of the pressure sensor 72n, applies digital conversion to the actually measured output voltage, and inputs the digital conversion value to the adjustment tool 290; the amplification factor thereof is set to a value the same as the designing theoretical amplification factor of the differential amplifier 12n; the accuracy of voltage detection by the voltmeter 292 is higher than the accuracy of voltage detection by the differential amplifier 12n and the multi-channel A/D converter 225.

An ampere meter 293 is connected to the upstream side or the downstream side of the electromagnetic coil 71n, measures an excitation current flowing in the electromagnetic coil 71n, and inputs the digital conversion value of the excitation current to the adjustment tool 290. The accuracy of current detection by the ampere meter 293 is higher than the accuracy of current detection by the current detection resistor 16n, the differential amplifier 11n, and the multi-channel A/D converter 225.

Next, the label resistor illustrated in FIG. 17 will be explained.

Figure 18:
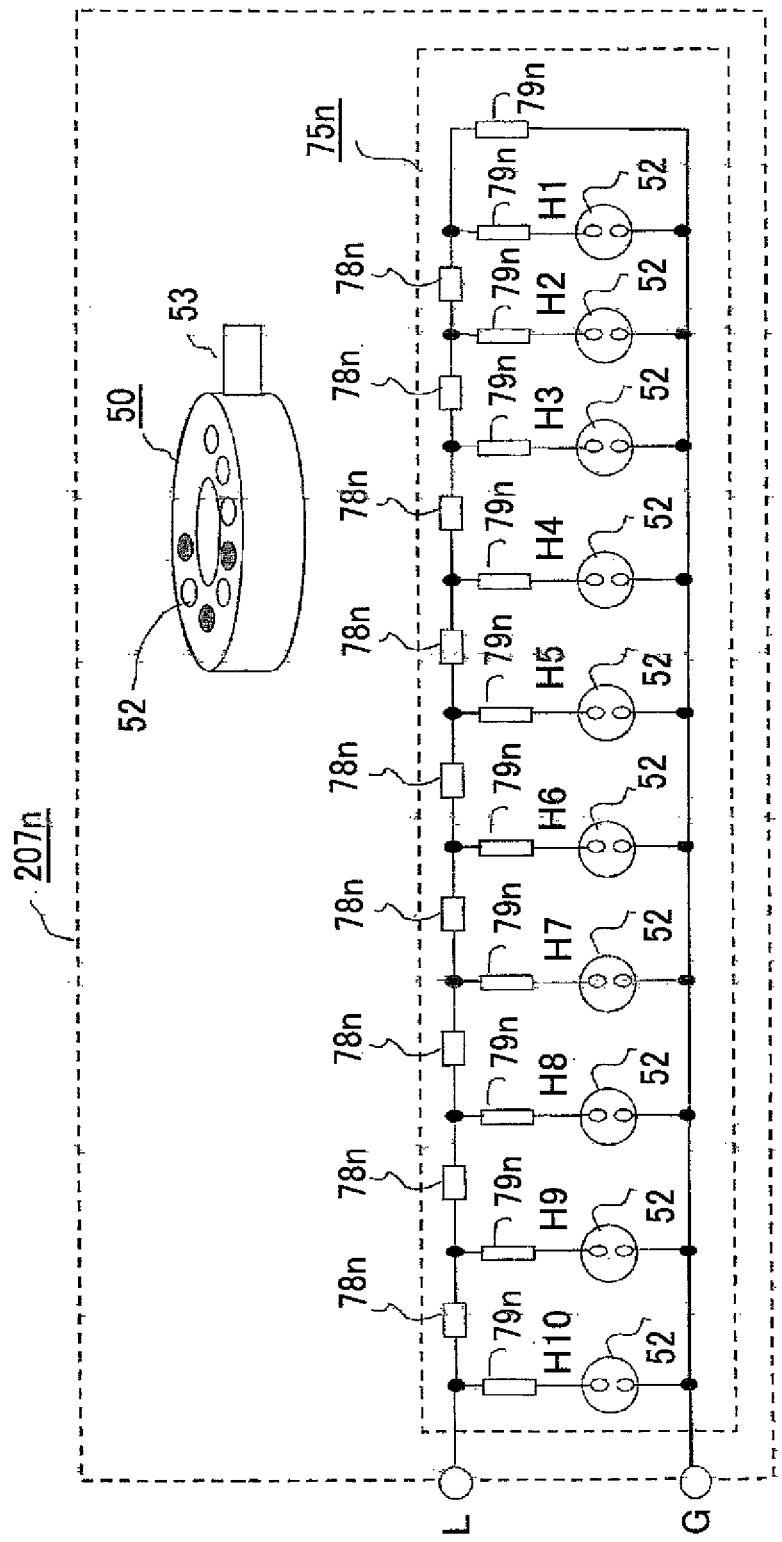
FIG. 18 is a circuit diagram of a ladder circuit for configuring a label resistor in a transmission control apparatus according to Embodiment 2 of the present invention.

FIG. 18 is a circuit diagram of a ladder circuit for configuring a label resistor in the transmission control apparatus according to Embodiment 2 of the present invention. In FIG. 18, the label resistor 75n is formed of a ladder circuit in which a plurality of first resistors 78n are sequentially connected in series with one another, and respective second resistors 79n having a resistance value of twice as large as the resistance value of the first resistor 78n are connected with the start point of the in-series connection circuit, the end point thereof, and the respective connection points between the plurality of first resistors 78n, and in which the respective other terminals of the second resistors 79n are selectively connected with the ground terminal by way of respective pairs of shorting/opening terminals H1 through H10. The respective shorting/opening terminals H1 through H10 are arranged at the respective window openings 52 in the sealing resin 50 that seals the plurality of first resistors 78n and the plurality of second resistors 79n in an air-tight manner.

When the pair of shorting/opening terminal H1 is short-circuited, the second resistor 79n, which has been connected through the short-circuited pair of shorting/opening terminal H1, and the second resistor 79n at the end are connected in parallel with each other, and the value of the combined resistance is the same as the resistance value of the first resistor 78n; because the combination resistor is connected in series with the first resistor 78n at the end position, the present situation becomes equivalent to the situation in which at the right side of the next-stage pair of shorting/opening terminals H2 in FIG. 5, only a single second resistor 79n is connected.

When the circuit configuration is made in such a way as described above and the pairs of shorting/opening terminals H1 through H10 are short-circuited in an arbitrary combination, the combination resistance, as the label resistor 75n, changes depending on the combination; the change in the label resistor 75n, caused by short-circuiting the pairs of shorting/opening terminals H1 through H10 situated at the left side of FIG. 18, is larger than the change in the label resistor 75n, caused by short-circuiting the shorting/opening terminals H1 through H10 situated at the right side of FIG. 18; the pairs of shorting/opening terminals H1 through H10 situated at the left side of FIG. 18 are assigned as higher-order bits.

In Embodiment 2, the shorting/opening terminals H1 through H10 are allocated to the binary bits B1 through B10; in the case of the logic "0", the shorting/opening terminal is short-circuited; in the case of the logic "1", the shorting/opening terminal is opened so that the resistance value becomes large. However, the resistance value of the short-circuiting resistor 75n is not linearly proportional to the binary value, which determines the state of the shorting/opening terminal, but changes stepwise; therefore, because the binary conversion value of the resistance value of the short-circuiting resistor 75n and the state of the shorting/opening terminal do not coincide with each other, it is required to specify the relationship between the binary conversion value and the selected parameter, by use of a preliminarily created conversion table.

As the adjustment work for the label resistor 72n, part or all of the pairs of shorting/opening terminals H1 through H10 are short-circuited with solder, or in some cases, all of them are opened; after the adjustment work is completed, a seal material is poured into the window opening 52 provided in the sealing resin 50.

Figure 19:
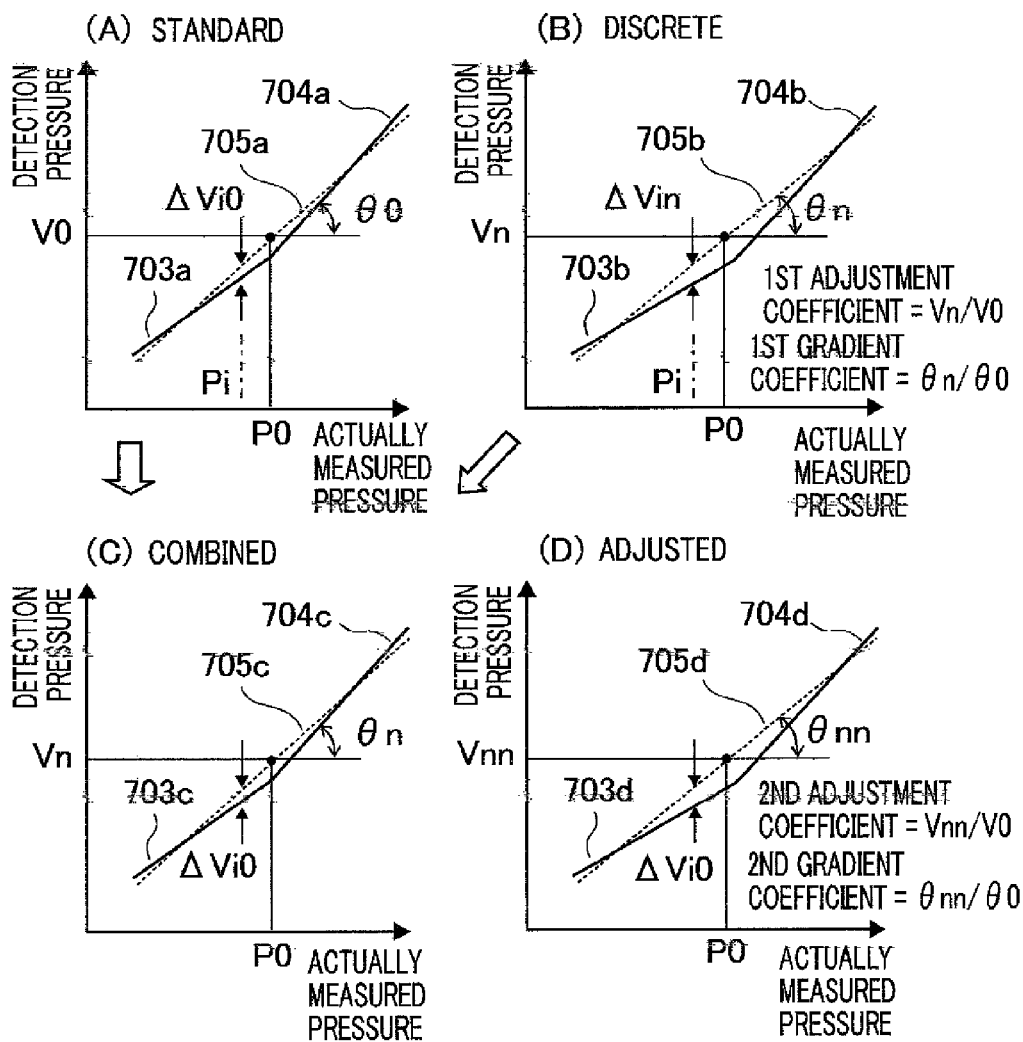
FIG. 19 is a set of characteristic curves related to the pressure detection characteristics of pressure sensors in a transmission control apparatus and an output characteristic control method therefor according to Embodiment 2 of the present invention.

Next, the pressure detection characteristic of the pressure sensor 72n illustrated in FIG. 17 will be explained. FIG. 19 is a set of characteristic curves related to the pressure detection characteristics of pressure sensors in a transmission control apparatus and an output characteristic control method therefor according to Embodiment 2 of the present invention; the abscissa denotes the actually measured pressure measured by the pressure detection device 291b and the pressure gauge 291a illustrated in FIG. 17, and the ordinate denotes the actually measured detection output voltage of the pressure sensor 72n measured by the voltmeter 292 illustrated in FIG. 17. FIG. 19(A) is a graph representing a standard characteristic; the standard characteristic can be approximated with a broken line consisting of a first line segment 703a and a second line segment 704a; the first line segment 703a and the second line segment 704a can be approximated with a single combination line 705a.

The combination line 705a passes through coordinates (P0, V0) and its gradient against the abscissa is θ0. Here, P0 is a predetermined actually measured pressure, and V0 is a detection output at the actually measured pressure P0; standard data (P0, V0, θ0) is configured with these elements. When the actually measured pressure is Pi, there exists an error ΔVi0 between the combination line 705a and the actually measured data, and difference data (ΔVi0) are configured in accordance with various actually measured pressures Pi. The standard data (P0, V0, θ0) and the difference data (ΔVi0) are stored, as standard detection characteristic data, in the program memory 223 or the data memory 224.

FIG. 19(B) is a discrete characteristic graph representing the pressure detection characteristic of a specific pressure sensor 72n, which is a subject for the outgoing inspection; the relationship between the abscissa and the ordinate is the same as that in FIG. 19(A). The discrete characteristic represented in FIG. 19(B) can be approximated with a broken line consisting of a first line segment 703b and a second line segment 704b; the first line segment 703b and the second line segment 704b can be approximated with a single combination line 705b. The combination line 705b passes through coordinates (P0, Vn) and its gradient against the abscissa is θn. Here, P0 is a predetermined actually measured pressure, and Vn is a detection output at the actually measured pressure P0; discrete data (P0, Vn, θn) is configured with these elements. When the actually measured pressure is Pi, there exists an error ΔV1n between the combination line 705b and the actually measured data, and difference data (ΔV1n) are configured in accordance with various actually measured pressures Pi.

Here, the proportion Vn/V0 of the detection output Vn in the discrete characteristic in FIG. 19(B) to the detection output V0 in the standard characteristic in FIG. 19(A) will be referred to as a first adjustment coefficient; the proportion θn/θ0 of the gradient θn in the discrete characteristic to the gradient θ0 in the standard characteristic will be referred to as a first gradient coefficient; then, (Vn/V0, θn/θ0) will be referred to as a first correction coefficient. The first correction coefficient (Vn/V0, θn/θ0) is represented by the resistance value of the label resistor 75n; the microprocessor 221 reads the resistance value of the label resistor 75n so as to decrypts the first correction coefficient (Vn/V0, θn/θ0) related to the utilized pressure sensor 72n.

As a result, based on the preliminarily stored standard characteristic data and the first correction coefficient that can be obtained by reading the resistance value of the label resistor 75n, the microprocessor 221 can obtain the discrete pressure detection characteristic of the pressure sensor 72n included in the utilized linear solenoid 207.

FIG. 19(C) is a graph representing the pressure detection characteristic obtained in such a manner as described above; a combination line 705c, which is the same as the discrete combination line 705b is reproduced by the standard combination line 705a and the first correction coefficient (Vn/V0, θn/θ0). The standard difference data ΔVi0 is algebraically added to the reproduced combination line 705c (=705b), so that the first line segment 703c and the second line segment 704c are created. The first correction broken line characteristic, represented in FIG. 19(C), that is created in such a manner as described above differs from the discrete detection characteristic in FIG. 19(B) in the difference data (ΔV1n).

FIG. 19(D) represents a first line segment 703d, a second line segment 704d, and a combination line 705d in the second correction broken line characteristic. The combination line 705d passes through coordinates (P0, Vnn) and its gradient against the abscissa is θnn; the label resistor 75n represents a second correction coefficient (Vnn/V0, θnn/θ0) instead of the first correction coefficient.

The second correction coefficient (Vnn/V0, θnn/θ0) is obtained by calculating the values of the second adjustment coefficient (Vnn/V0) and the second gradient coefficient (θnn/θ0) in such a way that the relative errors, between the first line segment 703c and the second line segment 704c in the first correction broken line characteristic and the first line segment 703b and the second line segment 704b in the discrete broken line characteristic, that are obtained when the values of the first adjustment coefficient (Vn/V0) and the first gradient coefficient (θn/θ0) are slightly increased or decreased become minimal.

The microprocessor 221 specifies the combination line 705d by use of the standard data (P0, V0, θ0) and the second correction coefficient read from the resistance value of the label resistor 75n, specifies the second correction broken line characteristic consisting of the first line segment 703d and the second line segment 704d, by algebraically adding the difference data ΔVi0 to the specified combination line 705d, and obtains a detection hydraulic pressure, corrected through the second correction broken line characteristic, from the detection output of the pressure sensor 72n.

The method of representing the first correction coefficient or the second correction coefficient by the label resistor 75n is the same as the method, of determining the resistance value of the label resistor, that has been described with reference to FIG. 8; however, in the case of the ladder-circuit label resistor 75n, it is required to preliminarily determine the allotment between the adjustment coefficient and the gradient coefficient, based on the binary conversion value in accordance with the states of the shorting/opening terminals.

(2) Detailed Description of Operation

Figure 20:
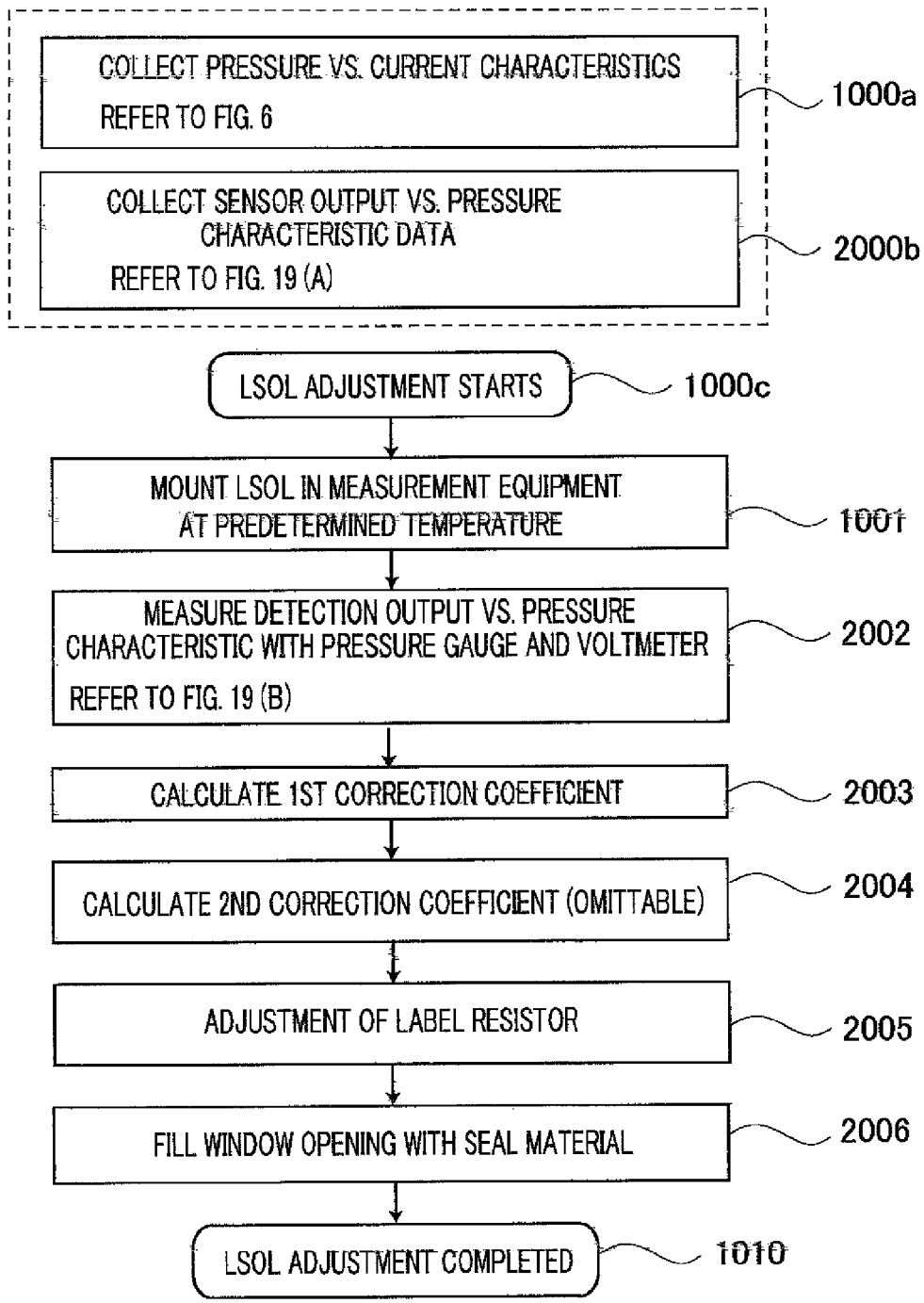
FIG. 20 is a flowchart representing adjustment work for a linear solenoid in a transmission control apparatus and an output characteristic control method therefor according to Embodiment 2 of the present invention.
Figure 21:
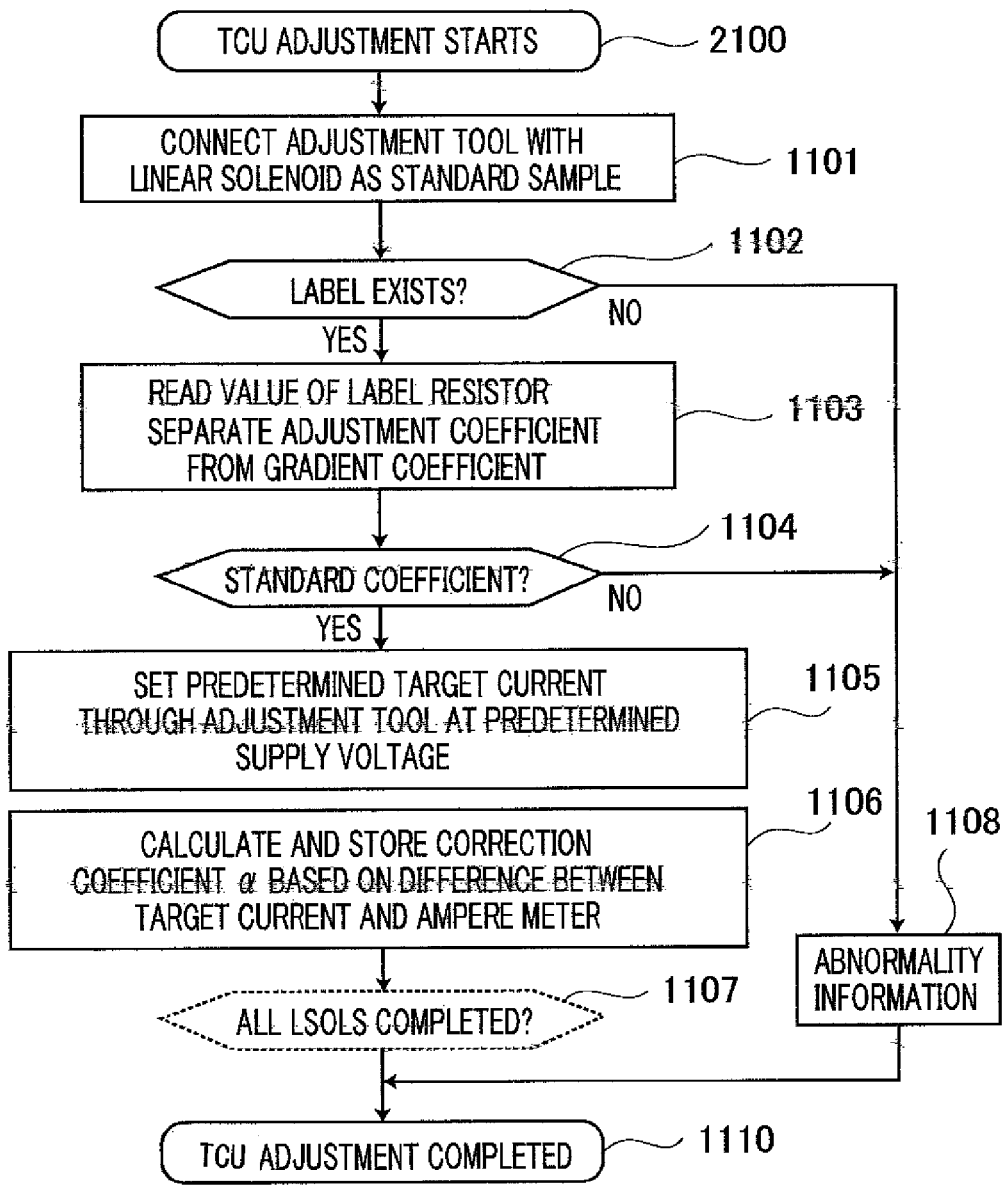
FIG. 21 is a flowchart representing the adjustment operation of a supply current control apparatus in a transmission control apparatus and an output characteristic control method therefor according to Embodiment 2 of the present invention.
Figure 22A:
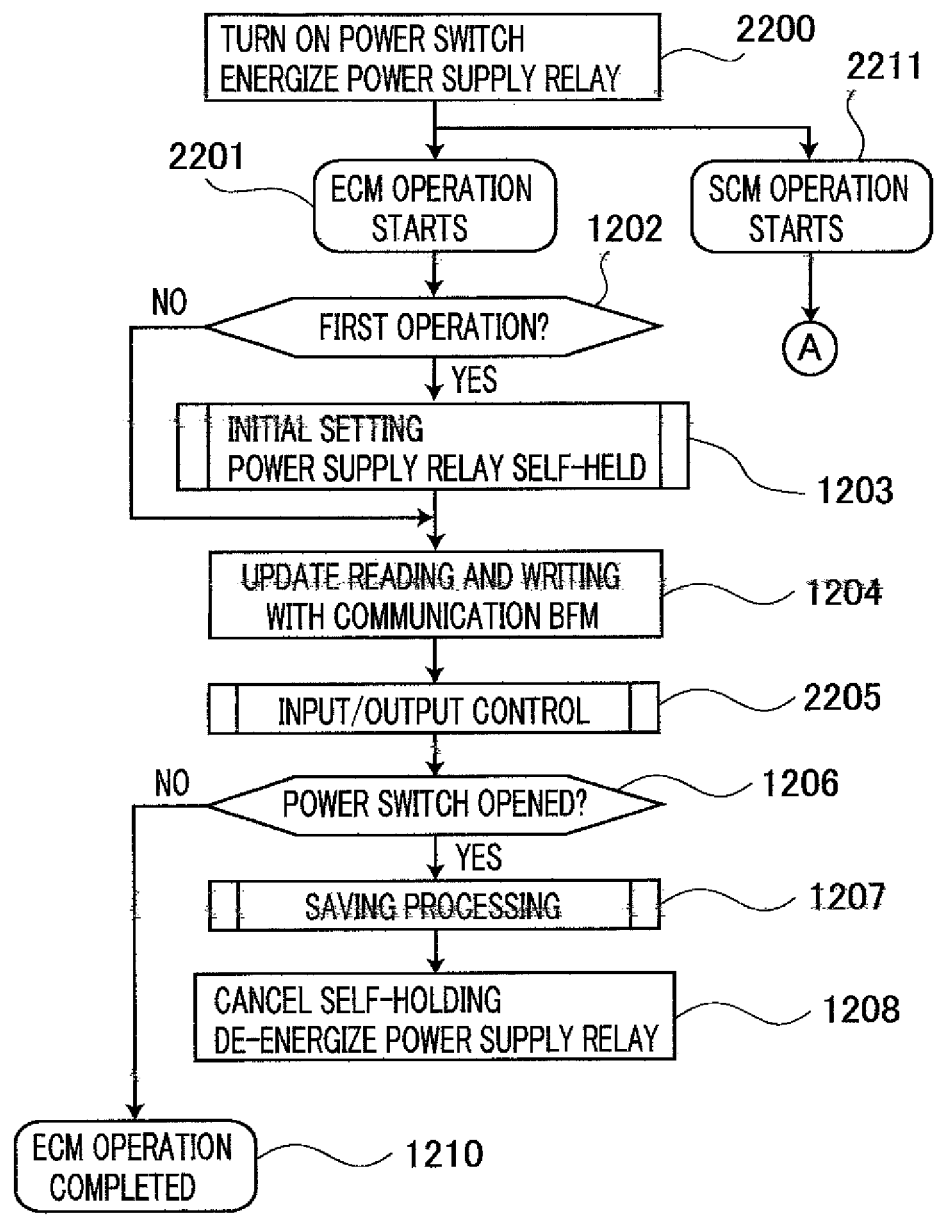
FIGS. 22A and 22B are a set of flowcharts representing the driving operation of a transmission control apparatus according to Embodiment 2 of the present invention.
Figure 22B:
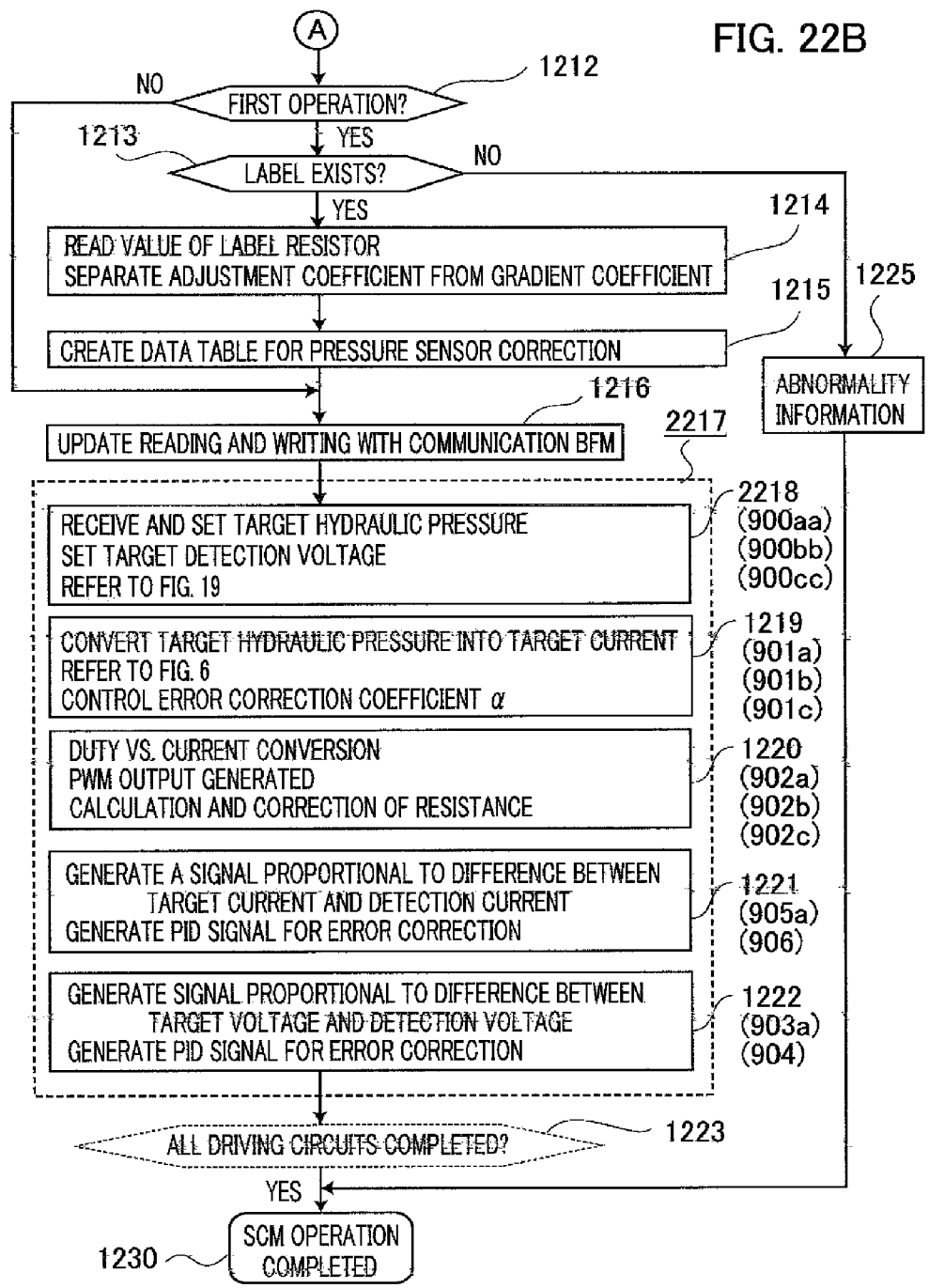

Next, the operations of a transmission control apparatus and an output characteristic adjustment method therefor according to Embodiment 2 of the present invention will be explained in detail. FIG. 20 is a flowchart representing adjustment work for a linear solenoid in a transmission control apparatus and an output characteristic adjustment method therefor according to Embodiment 2 of the present invention; FIG. 21 is a flowchart representing the adjustment operation of a supply current control apparatus in a transmission control apparatus and an output characteristic control method therefor according to Embodiment 2 of the present invention; FIGS. 22A and 22B are a set of flowcharts representing the driving operation of the transmission control apparatus according to Embodiment 2 of the present invention.

In FIGS. 20 through 22, the steps in which the same operation items as those in FIGS. 10 through 12 are performed are designated by the same reference numerals, and the steps in which different operation items are performed are designated by reference numerals in the 2000s; in the following explanation, the operation items of the steps in the 2000s will mainly be described. The main different point between Embodiment 1 and Embodiment 2 is that in Embodiment 2, when receiving a target pressure command from the engine control apparatus 210U, the supply current control apparatus 220Un performs power-supply control of a single linear solenoid 207n, and a single label resistor 75n provides correction information for an inherent variation in the pressure detection characteristic.

At first, in FIG. 20 which is a flowchart of outgoing adjustment work for a linear solenoid, in the step 1000a, which is a step in which experiment and measurement that are prior to the outgoing adjustment work are performed, the standard pressure vs. current characteristic, represented in FIG. 6, of the electromagnetic coil 71n is measured; in the step 2000b, the standard pressure detection characteristic, represented in FIG. 19(A), of the pressure sensor 72n is measured. The standard pressure vs. current characteristic and the standard pressure detection characteristic measured in the steps 1000a and 2000b, respectively, are preliminarily provided to the manufacture of the supply current control apparatus 220U and are stored, as approximation equations or data tables, in the program memory 123 or the data memory 124.

In a series of steps after the step 1000c in which the outgoing adjustment work for an individual linear solenoid is performed, in the step 2002, the pressure detection characteristic, represented in FIG. 19(B), is measured by the pressure detection device 291b, the pressure gauge 291a, and the voltmeter 292; in the step 2003, the first and second line segments 703b and 704b in FIG. 19(B) are specified and the first correction coefficient (Vn/V0, θn/θ0) is calculated; in the step 2004, the second correction coefficient (Vnn/V0, θnn/θ0) is calculated. In this regard, however, in the case where a sufficient approximation characteristic can be obtained with the first line segment 703c and the second line segment 704c, in FIG. 19(C), created from the first correction coefficient, the step 2004 can be omitted.

In the step 2005, the resistance value of the label resistor 75n is adjusted with reference to the list in FIG. 8; in the step 2006, the window opening 52 is filled with the seal material, so that the adjustment work is completed in the step 1010.

Next, in FIG. 21 which is a flowchart of the adjustment operation of the supply current control apparatus illustrated in FIG. 15, in the step 2100 is a step in which the outgoing adjustment work for the supply current control apparatus 220U is started. The following steps are the same as those in FIG. 11; however, because in FIG. 21, the number of linear solenoids to be controlled by the microprocessor 221 is only one (207n), the step 1107 in FIG. 11 is omitted.

Next, in FIGS. 22A and 22B which are a set of flowcharts of the overall driving operation of the control apparatus in FIG. 15, in the step 2200, an unillustrated power switch is closed; the power supply relay in FIG. 15 is energized so as to close the output contact 103; then, electric power is supplied to the engine control apparatus 210U and the supply current control apparatuses 220Ua through 220Un. In the step 2201, the constant voltage power source 210a in the engine control apparatus 210U generates a predetermined control voltage Vcc, so that the microprocessor 211 starts its operation. In the step 2211, the constant voltage power source 220a in the supply current control apparatus 220Un generates a predetermined control voltage Vcc, so that the microprocessor 221 starts its operation.

A series of steps following the step 2201 are the same as those in FIG. 12A; however, in the step block 2205 that replaces the step block 1205, the group of electric loads 205 is driven and controlled in response to the operation state of the first group of sensors 204, the operation state of the input signal received from the microprocessor 221 in the step 1204, and the contents of an input/output control program stored in the program memory 213; there is performed the control of the throttle valve opening degree, the fuel injection amount, and the ignition timing, in the case of a gasoline engine, in such a way that the engine output torque in accordance with the accelerator-pedal depressing degree and the engine rotation speed is generated; the transmission gear ratio is determined in response to the selection position of the gearshift lever, the accelerator-pedal depressing degree, and the vehicle speed; then, a command signal for the target pressure is issued to the supply current control apparatus (220Ua through 220Un) and is transmitted in the step 1204.

A series of steps following the step 2211 are the same as those in FIG. 12A; however, in the step 2218 in the step block 2217, in FIG. 22B, that corresponds to the step 1218 in the step block 1217n in FIG. 12B, the target hydraulic pressure received from the engine control apparatus 210U in the step 1216 is set, and based on the pressure detection characteristic of the pressure sensor 72n created in the step 1215, the target detection output voltage in FIG. 19(C) or 19(D) is set.

The contents of the step 2218 are represented in the control blocks 900aa, 900bb, and 900cc, described later, in FIG. 25.

(2) Gist and Feature of Embodiment 2

As is clear from the foregoing explanation, a transmission control apparatus (200a through 200n) according to Embodiment 2 of the present invention includes a linear solenoid (207a through 207n) that acts on a hydraulic pressure adjustment valve incorporated in a vehicle transmission and generates an adjustment hydraulic pressure output corresponding to a supply current; and a supply current control apparatus (220Ua through 220Un) for the linear solenoid.

In the linear solenoid, an electromagnetic coil 71n, a pressure sensor 72n that detects an adjusted hydraulic pressure, and a single label resistor 75n having a resistance value that serves as parameter data for correcting an inherent variation in the performance characteristic of the pressure sensor 72n are integrated with one another.

The supply current control apparatus is provided with a driving circuit (270a through 270n) that operates with a supply voltage Vbb, which is the output voltage of a power supply on/off device 210c connected between a vehicle battery 102 and all the plurality of linear solenoids and a control voltage Vcc, which is the output voltage of a constant voltage power source 220a that is supplied with electric power from the vehicle battery 102; and a control module (220Ma through 220Mn).

The driving circuit is provided with a measurement circuit that measures the resistance value of a resistor for supplying electric power to the label resistor 75n and a control on/off device 10n that is discretely and directly connected with the other terminal of the linear solenoid.

The control module includes a microprocessor 221 that generates a command signal for controlling the conduction state of the control on/off device 10n, a RAM memory 222 that collaborates with the microprocessor, a program memory 223, a nonvolatile data memory 224 that is provided in part of the region of the program memory or is provided in such a way as to be separated from the program memory, and a multi-channel A/D converter 225 to which, as a reference voltage, the control voltage Vcc is applied.

The program memory 223 is provided with a control program that functions as a label resistor reading and conversion means 1215.

In collaboration with the driving circuits 270a through 270n, the microprocessor 221 controls an energizing current for the electromagnetic coil 71n in such a way that the adjusted hydraulic pressure detected by the pressure sensor 72n becomes equal to a target setting hydraulic pressure.

The label resistor reading and conversion means 1215 calculates the resistance value of the label resistor 75n based on the proportion of a measured current that flows from the measurement circuit to the label resistor 75n to a measured voltage applied to the label resistor 75n, calculates or selectively determines, based on the calculated resistance value, parameter data for correcting an inherent variation in the pressure detection characteristic of the pressure sensor 72n, and stores the parameter data in the data memory 224 or the RAM memory 222.

The label resistor reading and conversion means 1215 is implemented at an operation start timing when the power switch is turned on; even when a linear solenoid is replaced for maintenance, the pressure detection characteristic of the pressure sensor 72n can be corrected in accordance with the resistance values of label resistors added to the replaced linear solenoid.

The label resistor 75n is formed of a ladder circuit in which the plurality of first resistors 78n are sequentially connected in series with one another, and respective second resistors 79n are connected with the start point of the in-series connection circuit, the end point thereof, and the respective connection points between the plurality of first resistors 78n, and in which the respective other terminals of the second resistors 79n are selectively connected with the ground terminal by way of respective pairs of shorting/opening terminals.

The pairs of shorting/opening terminals are arranged at the respective window openings 52 in the sealing resin 50 that seals the plurality of first resistors 78n and the plurality of second resistors 79n in an air-tight manner.

As described above, the respective pairs of shorting/opening terminals of the label resistor, included in the ladder circuit, can be short-circuited through the window opening in the sealing resin. Accordingly, there is demonstrated a feature that through post-processing after air-tight mounting of the label resistor, the resistance value of the label resistor can be adjusted stepwise without a measuring instrument.

The digital conversion value of the resistance value of the label resistor 75n measured by the microprocessor 221 is utilized in such a way as to be divided into a group of high-order bits and a group of low-order bits; any one of the group of high-order bits and the group of low-order bits of the label resistor 75n is a first parameter for selecting an adjustment coefficient, which is the proportion of the detection output corresponding to a predetermined hydraulic pressure of the pressure sensor 72n to the standard detection output, which is the average value of the detection outputs of a plurality of samples; the other one of the group of high-order bits and the group of low-order bits of the label resistor 75n is a second parameter for selecting a gradient coefficient, which is the proportion of the gradient of the detection output vs. hydraulic pressure characteristic of the pressure sensor to the standard gradient, which is the average value of the gradients of the plurality of samples.

Alternatively, the group of high-order bits and the group of low-order bits of the label resistor 75n represent first and second adjustment coefficients, which are proportions of the first and second detection outputs corresponding to first and second predetermined hydraulic pressures of the pressure sensor 72n to the first and second standard detection outputs, which are average values of the detection outputs of the plurality of samples. One of the first and second adjustment coefficients becomes the first parameter; based on the first and second adjustment coefficients, the gradient coefficient is calculated and becomes the second parameter.

The feature of this configuration is the same as the feature described in Embodiment 1.

In the output characteristic adjustment method for a transmission control apparatus according to Embodiment 2 of the present invention, an adjustment tool 290 is connected with the microprocessor 221 and the standard detection output and a discrete detection characteristic of the pressure sensor 72n are preliminarily measured; standard detection characteristic data of the pressure sensor 72n measured by the adjustment tool 290 is stored in the program memory 223 or the data memory 224; a pressure detection device 291b, a pressure gauge 291a, and a voltmeter 292 are connected with the adjustment tool 290, and the average characteristic obtained by measuring, for each of the plurality of the pressure sensor 72n, the relationship between the actually measured hydraulic pressure obtained by measuring the hydraulic pressure applied to the pressure sensor 72n and the actually measured detection output voltage of the pressure sensor 72n is approximated with a standard broken line characteristic consisting of a first line segment 703a and a second line segment 704a; a combination line 705a is calculated in such a way that the relative error between the first line segment 703a and the second line segment 704a becomes minimal; and the standard detection characteristic data is configured with standard data (P0, V0, θ0) including a detection output V0 on the combination line 705a corresponding to a predetermined actually measured pressure P0 and the gradient θ0 of the combination line 705a and with difference data ΔVi0, which is the error between the average characteristic of a plurality of large and small actually measured pressures Pi and the combination line 705a.

Discrete detection characteristic data is measured in the outgoing inspection of the linear solenoid 207n; the pressure detection device 291b, the pressure gauge 291a, and the voltmeter 292, as test equipment, are connected with the adjustment tool 290; the relationship between the actually measured hydraulic pressure obtained by measuring a hydraulic pressure applied to the pressure sensor 72n and the actually measured detection output voltage of the pressure sensor 72n is approximated with a discrete broken line characteristic consisting of the first line segment 703*b* and the second line segment 704*b*; a combination line 705*b* is calculated in such a way that the relative error between the first line segment 703*b* and the second line segment 704*b* becomes minimal; the discrete detection characteristic data is configured with discrete data (P0, Vn, θn) including a detection output Vn on the combination line 705*b* corresponding to the predetermined actually measured pressure P0 and the gradient θn of the combination line 705*b*; the resistance value of the label resistor 75*n* is adjusted to a resistance value for specifying the values of the first adjustment coefficient (Vn/V10) and the first gradient coefficient (θn/θ0) related to the combination line 7705*b*; the microprocessor 221 reads the resistance value of the label resistor 75*n* so as to extract the values of the first adjustment coefficient (Vn/V0) and the first gradient coefficient (θn/θ0), which configure the first correction coefficient, through a predetermined equation or data table, specifies a combination line 705*c*, which is the same as the discrete combination line 705*b*, based on the standard data (P0, V0, θ0) and the first correction coefficient, specifies the first correction broken line characteristic consisting of the first line segment 703*c* and the second line segment 704*c*, by algebraically adding the difference data ΔVi0 to the specified combination line 705*c*, and obtains a detection hydraulic pressure, corrected through the first correction broken line characteristic, from the detection output of the pressure sensor 72*n*.

As described above, the pressure detection characteristic of a pressure sensor is approximated with a broken line consisting of a first line segment and a second line segment; a single label resistor is provided in a linear solenoid; and the difference between the characteristic of a subject linear solenoid and a standard characteristic obtained through a plurality of samples is represented by the first adjustment coefficient and the first gradient coefficient.

Accordingly, a complicated pressure detection characteristic can be represented by the resistance values of the label resistors; thus, there is demonstrated a feature that an inherent variation in the pressure detection characteristic of a pressure sensor can be corrected with a simple configuration.

The standard detection characteristic data includes difference value data between the average characteristic and the combination line; therefore, there is demonstrated a feature that by algebraically adding the difference value data to the combination line related to a utilized pressure sensor, correction equivalent to correction through a broken line characteristic can be performed by use of a single label resistor.

The adjustment tool 290 calculates a second adjustment coefficient (Vnn/V0) and a second gradient coefficient (θnn/θ0), which configure a second correction coefficient, based on the values of the first adjustment coefficient (Vn/V0) and the first gradient coefficient (θn/θ0), which configure the first correction coefficient; the second correction coefficient is obtained by calculating the values of the second adjustment coefficient (Vnn/V0) and the second gradient coefficient (θnn/θ0) in such a way that the relative errors, between the first line segment and the second line segment in the first correction broken line characteristic and the first line segment and the second line segment in the discrete broken line characteristic, that are obtained when the values of the first adjustment coefficient (Vn/V0) and the first gradient coefficient (θn/θ0) are slightly increased or decreased become minimal; the resistance value of the label resistor 75*n* is adjusted to a resistance value for specifying the values of the second adjustment coefficient (Vnn/V0) and the second gradient coefficient (θnn/θ0) related to the combination line 705*b*; and the microprocessor 221 specifies the combination line 705*d* by use of the standard data (P0, V0, θ0) and the second correction coefficient read from the resistance value of the label resistor 75*n*, specifies the second correction broken line characteristic consisting of the first line segment 703*d* and the second line segment 704*d*, by algebraically adding the difference data ΔVi0 to the specified combination line 705*d*, and obtains a detection hydraulic pressure, corrected through the first correction broken line characteristic, from the detection output of the pressure sensor 72*n*.

As described above, the pressure detection characteristic of a pressure sensor is corrected with the second correction coefficient so that the relative error between the discrete broken line characteristic and the second correction broken line characteristic becomes minimal.

Accordingly, there is demonstrated a feature that correction equivalent to correction through a broken line characteristic can accurately be performed by use of a single label resistor.

The program memory 223 includes a control program that serves as a target current setting means 1219, and an equation or a data table that serves as a standard pressure vs. current characteristic data is stored in the program memory 223 or the data memory 224; the standard pressure vs. current characteristic is a characteristic obtained by averaging, through a plurality of samples, the characteristics, related to the adjusted hydraulic pressure vs. excitation current for the electromagnetic coil 71*n*, that are measured for the linear solenoids 207*a* through 207*n* by use of the ampere meter 293, the pressure detection device 291*b*, and the pressure gauge 291*a* provided as test equipment; the target current setting means 1219 calculates the target current, corresponding to a target adjusted hydraulic pressure, that is obtained from the standard characteristic data and sets a target excitation current value for the electromagnetic coil 71*n*; and the microprocessor 221 and the driving circuits 270*a* through 270*n* collaborate with one another and correct the target current at least through an error integration value when there exists an error between the target hydraulic pressure and the corrected detection hydraulic pressure.

The feature of this configuration is the same as the feature described in Embodiment 1.

The program memory 223 or the data memory 224 stores adjustment data, which is a control error correction coefficient α, and the target current setting means 1219 includes a control program that serves as a current control error correction means; with regard to the adjustment data, the correction coefficient α is calculated through the equation [α=Is0/If0], when at the stage of outgoing adjustment for the supply current control apparatus (220Ua through 220Un), a linear solenoid, as the standard sample, is connected with the supply current control apparatus, a target current Is0 is set by use of the adjustment tool 290 connected with the microprocessor 221, and the value of the excitation current, for the linear solenoid, that is measured by the digital ampere meter 293 connected, as inspection equipment, with the adjustment tool 290 is If0; when it is desired to set a target current Is, the microprocessor 221 sets[α×Is], as a correction target current, so that the value of the actual excitation current If coincides with the initial target current Is, or leaving the target current Is as it is, a negative feedback detection current is set to If/α so that the actual excitation current If coincides with the initial target current Is.

The feature of this configuration is the same as the feature described in Embodiment 1.

The program memory 223 further includes a control program, which is a conductive duty calculation means 1220, and a control program, which is a current feedback control means 1221; the driving circuit (270a through 270n) is provided with the current detection resistor 16n connected in series with the electromagnetic coil 71n and amplifies the voltage across the current detection resistor 16n so as to generate a current detection signal proportional to the excitation current for the electromagnetic coil 71n; letting Rc denote the resistance value of the electromagnetic coil 71n at a reference temperature, letting Is denote the target current, and letting Vbb denote the power-supply voltage, the conductive duty calculation means 1220 calculates the conductive duty Kd, which is the proportion of the circuit-closing time of the control on/off device 10n to the on/off cycle thereof, through the equation (1) below; and $$Kd = Is \times Rc / Vbb \tag{1}$$

in the case where there exists an error between the target current Is and the detection current obtained through the current detection resistor 16n, the current feedback control means 1221 corrects the conductive duty Kd in an increasing manner or in a decreasing manner as the error integration value increases or decreases.

The feature of this configuration is the same as the feature described in Embodiment 1.

Each of the supply current control apparatuses 220Ua through 220Un collaborates with the engine control apparatus 210U provided outside the gearbox so as to perform communication of input/output signals with each other; the engine control apparatus 210U selectively determines the linear solenoids 207a through 207n to be energized, sets a target hydraulic pressure for the selected linear solenoid, and transmits the set target hydraulic pressure to the supply current control apparatuses 220Ua through 220Un; and the supply current control apparatus (220Ua through 220Un) is provided in the transmission case in such a way as to be integrated with corresponding one of the plurality of linear solenoids 207a through 207n through connecter connection and includes a control module (220Ma through 220Mn) that generates a command signal for obtaining the target hydraulic pressure commanded by the engine control apparatus 210U and a driving circuit (270a through 270n) that supplies a driving current to the linear solenoid (207a through 207n).

As described above, the supply current control apparatuses, which collaborate with the engine control apparatus, are integrated with the respective linear solenoids through connectors.

Accordingly, the engine control apparatus, a plurality of supply current control apparatuses, and a plurality of linear solenoids can be assembled in such a way that they are freely combined with one another and can separately be replaced for maintenance, and the supply current control apparatus individually controls the plurality of linear solenoids, so that there is demonstrated a feature that the supply current control apparatus including a current control power circuit, which is liable to cause a market trouble, can compactly and economically be configured, as a maintenance unit.

Moreover, there is demonstrated a feature that because a plurality of supply current control apparatuses include respective microprocessors so as to perform current control, no excessive control load is imposed on the engine control apparatus.

In an opening/closing manner, the linear solenoid (207a through 207n) drives the relief valve 43b, which is a hydraulic pressure adjustment valve, by use of the plunger 43a on which electromagnetic force produced by the electromagnetic coil 71n and repulsive force caused by the spring 44 are exerted, so that at a predetermined oil temperature, there is obtained a predetermined adjusted hydraulic pressure corresponding to the supply current for the electromagnetic coil 71n; and the pressure sensor 72n is a strain gauge to which an adjusted hydraulic pressure is applied through the communication tube 45c from the pipe portion 48a, which is a path for the activation oil 49b, and the pressure sensor 72n and the label resistor 75n are molded integrally with each other with the sealing resin 50.

The feature of this configuration is the same as the feature described in Embodiment 1.

Embodiment 3

(1) Detailed Description of Configuration

Figure 23:
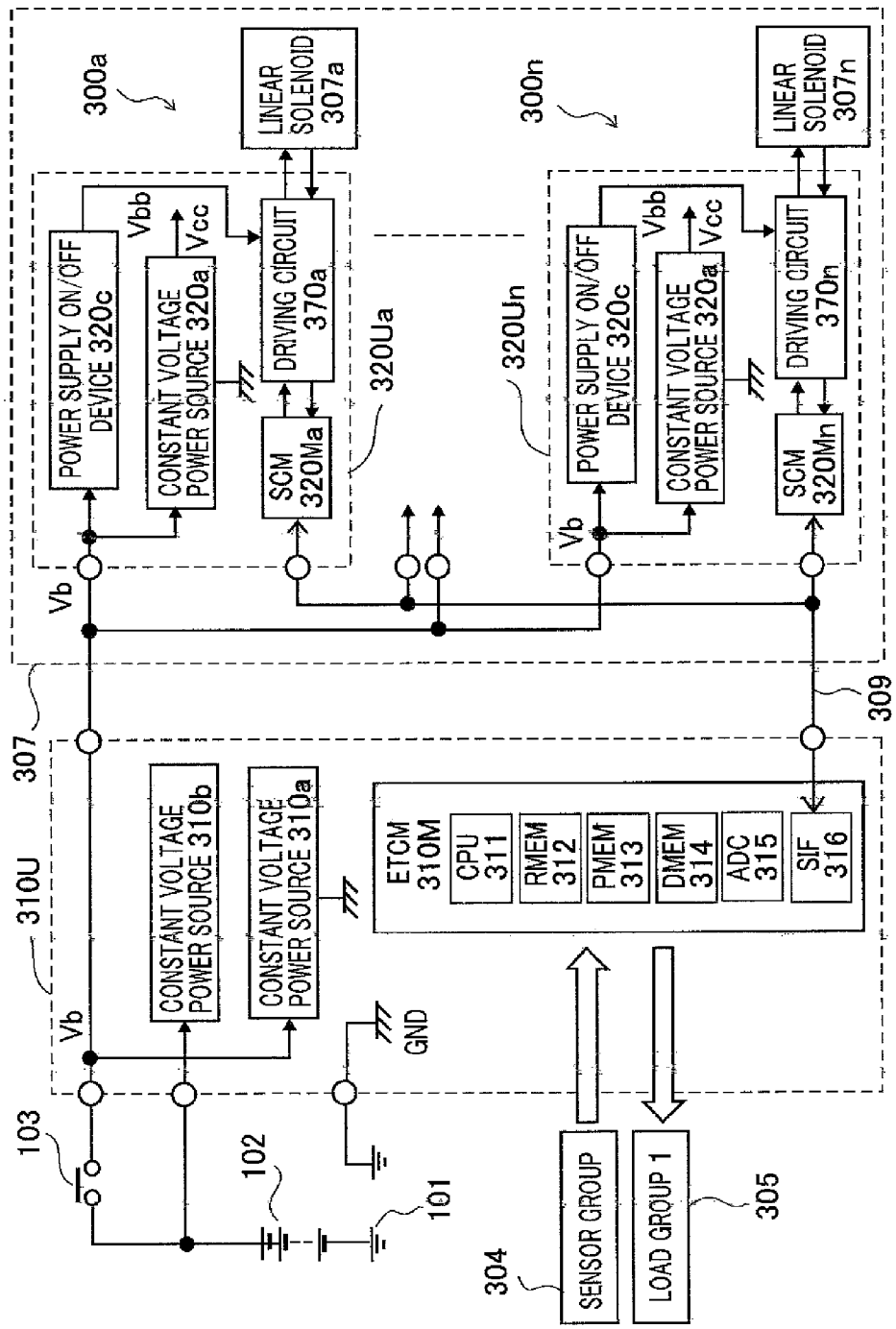
FIG. 23 is a configuration diagram of an overall transmission control apparatus according to Embodiment 3 of the present invention.

Next, a transmission control apparatus and an output characteristic adjustment method therefor according to Embodiment 3 of the present invention will be explained. FIG. 23 is a configuration diagram of an overall transmission control apparatus according to Embodiment 3 of the present invention. In each of the drawings, the same reference characters denote the same or similar portions; the reference characters in the 100s are replaced by the reference characters in the 300s that denote similar portions. In FIG. 23, an engine control apparatus 310U provided in an engine room and a plurality of supply current control apparatuses 320Ua through 320Un fixed inside of a gearbox 307 of a vehicle transmission are configured in such a way as to collaborate with each other so as to control supply currents for linear solenoids 307a through 307n incorporated in the gearbox 307. In Embodiment 3, four to six supply current control apparatus 320Ua through 320Un are combined on a one-to-one basis with respective four to six linear solenoids 307a through 307n; the respective combinations of the supply current control apparatus and the linear solenoid form distributed-control-type transmission control apparatuses 300a through 300n.

The positive terminal of a vehicle battery 102 whose negative terminal is connected with a vehicle body ground terminal 101 supplies a battery voltage Vb to the engine control apparatus 310U and the supply current control apparatuses 320Ua through 320Un, by way of an output contact 103 of an unillustrated power supply relay.

A first group of sensors 304 whose outputs are inputted to the engine control apparatus 310U is a combination of the first group of sensors 104 and the second group of sensors 106 in FIG. 1, and includes include analogue sensors, on/off switch sensors, manual command switches, or the like, such as accelerator position sensor that detects the accelerator-pedal depressing degree, a throttle position sensor that detects the intake valve opening degree of an engine, an air flow sensor that measures intake amount, an exhaust-gas sensor, an engine rotation sensor, a crank angle sensor, a power switch, and an engine starting command switch.

A group of electric loads 305 that respond to the output signals generated by the engine control apparatus 310U include, for example, a fuel-injection electromagnetic valve, an ignition coil (in the case of an gasoline engine), an intake valve opening degree control motor, a starter motor, and the like. In this regard, however, the engine control apparatus 310U includes part of the functions of the supply current control apparatus 120U in FIG. 1 in addition to the foregoing engine control functions and transmits respective hydraulic pressure command signals to the supply current control apparatuses 320Ua through 320Un byway of a communication line 309, in response to the selection position of the gearshift lever, the accelerator-pedal depressing degree, and the vehicle speed.

Inside the engine control apparatus 310U, there are provided a constant voltage power source 310a that is energized from the vehicle battery 102 by way of the output contact 103 of the power supply relay, a constant voltage power source 310b that is energized directly from the vehicle battery 102, and a control module 310M. In the control module 310M, a microprocessor 311, which is a computing processing unit, a computing-processing RAM memory 312, a nonvolatile program memory 313, which is, for example, a flash memory, a nonvolatile data memory 314, a multi-channel A/D converter 315, and a serial-parallel converter 316 are connected with one another through a bus line.

In collaboration with the program memory 313, the microprocessor 311 controls the throttle valve opening degree in accordance with the accelerator-pedal depressing degree and supplies a fuel proportional to the intake amount; in the case of a gasoline engine, the ignition coil is on/off-controlled in accordance with the engine rotation speed and the fuel injection amount. In response to the selection position of the gearshift lever, the accelerator-pedal depressing degree, and the vehicle speed, the microprocessor 311 transmits respective hydraulic pressure command signals to be sent to the linear solenoids 307a through 307n through the communication line 307 and when the transmission gear ratios of the transmission are changed, the microprocessor 211 adjusts the fuel injection amount in such a way that the engine rotation speed gradually changes.

Inside each of the supply current control apparatuses 320Ua through 320Un, there are provided a constant voltage power source 320a that is energized from the vehicle battery 102 by way of the output contact 103 of the power supply relay and generates a stabilized control voltage Vcc of, for example, DC 5 [V] and a power supply on/off device 320c that supplies a power-supply voltage Vbb; the constant voltage power source 320a and the power supply on/off device 320c supply electric power to the control module (320Ma through 320Mn) and a driving circuit (370a through 370n), described later.

The configuration of the linear solenoid 307n in FIG. 23 is the same as that in FIG. 16. At the opening end of the yoke 41 in FIG. 16, there is added a temperature sensor 76n for detecting the ambient temperature of the electromagnetic coil 71n, in addition to the label resistor 75n and the pressure sensor 72n that are integrated with each other by the sealing resin 50; the electromagnetic coil 71n, the label resistor 75n, the pressure sensor 72n, and the temperature sensor 76n are connected with the supply current control apparatus 320U by the intermediary of the coupling connector 53.

Figure 24:
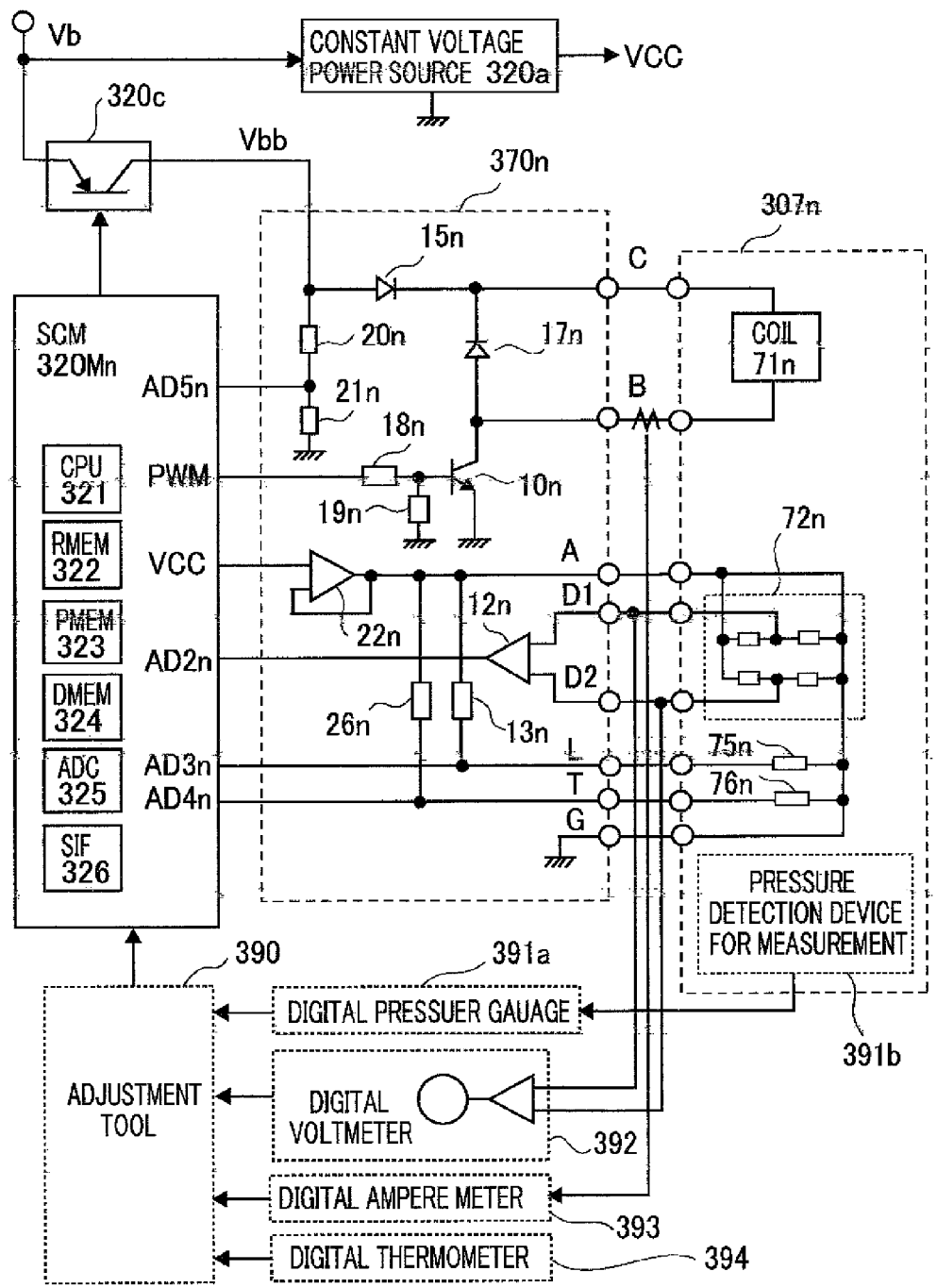
FIG. 24 is a circuit diagram of a driving circuit unit in a transmission control apparatus according to Embodiment 3 of the present invention.

Next, the driving circuit units 370a through 370n illustrated in FIG. 23 will be explained. FIG. 24 is a circuit diagram of the driving circuit unit in a transmission control apparatus according to Embodiment 3 of the present invention. In FIG. 24, each of the control modules 320Ma through 320Mn is configured in a single and the same manner; each of the driving circuits 370a through 370n is configured in a single and the same manner; each of the linear solenoids 307a through 307n is configures in a single and the same manner. Hereinafter, there will be explained the control module 320Mn that represents the control modules 320Ma through 320Mn, the driving circuit 370n that represents the driving circuits 370a through 370n, and the linear solenoid 307n that represents the linear solenoids 307a through 307n.

In the control module 320Mn, a microprocessor 321, a computing-processing RAM memory 322, a nonvolatile program memory 323, which is, for example, a flash memory, a nonvolatile data memory 324, a multi-channel A/D converter 325, and a serial-parallel converter 326 are connected with one another through a bus line; the serial-parallel converter 326 and the serial-parallel converter 316 in the engine control apparatus 310U are connected in series with each other through the communication line 309.

In response to a power supply start command issued by the microprocessor 321, the power supply on/off device 320c that is situated in the supply current control apparatus 320Un and is supplied with electric power from the vehicle battery 102 by way of the output contact 103 of the power supply relay closes and generates a supply voltage Vbb to be supplied to the driving circuit units 370a through 370n in the supply current control apparatuses 320Ua through 320Un. The linear solenoid 307n is configured with the electromagnetic coil 71n having a low-resistance value of, for example, several ohms, the pressure sensor 72n that detects an adjusted hydraulic pressure, the label resistor 75n, and the temperature sensor 76n.

The driving circuit 370n, which supplies the linear solenoid 307n with electric power, is configured in the same manner as the driving circuit 170n in FIG. 3; however, it is provided with the control on/off device 10n that responds to a control command signal PWM, the reverse-flow prevention diode 15n, the commutation diode 17n, the division resistors 20n and 21n, the buffer amplifier 22n, and the differential amplifier 12n. However, the current detection resistor 16n and the differential amplifier 11n are not provided. Instead of the pair of label resistors 73n and 74n, the label resistor 75n, described in FIG. 18, is utilized. Furthermore, one terminal of the temperature sensor 76n is connected with the output terminal of the buffer amplifier 22n by way of a signal terminal T and a series resistor 26n, and the other terminal thereof is connected to the ground terminal G; a signal voltage at the signal terminal T is inputted to the multi-channel A/D converter 325 through an analogue input port AD4n.

The series resistor 26n may be situated either in the linear solenoid 307n or at the downstream side of the temperature sensor 76n. The method of calculating the resistance values of the label resistor 75n and the temperature sensor 76n is the same as the method of calculating the resistance values of the label resistors 73n and 74n.

The adjustment tool 390 is connected in series with the control module 320M when the standard characteristic data items and discrete characteristic data items related to the adjustment pressure vs. current characteristic of the electromagnetic coil 71n and the pressure detection characteristic of the pressure sensor 72n are collected or when the current control characteristic of the supply current control apparatus 320U is measured; the adjustment tool 390 includes the man-machine interface functions of an unillustrated operation switch, an unillustrated display panel, and the like. A pressure gauge 391a amplifies the output signal of a pressure detection device 391b that is provided as test equipment, and inputs, as digital data, the actually measured value of an adjusted hydraulic pressure to the adjustment tool 390; the accuracy of pressure detection by the pressure gauge 391a and the pressure detection device 391b is higher than the accuracy of pressure detection by the pressure sensor 72n.

A voltmeter 392 amplifies the detection output voltage of the pressure sensor 72n, applies digital conversion to the actually measured output voltage, and inputs the digital conversion value to the adjustment tool 390; the amplification factor thereof is set to a value the same as the designing theoretical amplification factor of the differential amplifier 12n; the accuracy of voltage detection by the voltmeter 392 is higher than the accuracy of voltage detection by the differential amplifier 12n and the multi-channel A/D converter 225. An ampere meter 393 is connected to the upstream side or the downstream side of the electromagnetic coil 71n, measures an excitation current flowing in the electromagnetic coil 71n, and inputs the digital conversion value of the excitation current to the adjustment tool 390.

A thermometer 394 amplifies the ambient temperature of the linear solenoid 307n and inputs the digital conversion value thereof to the adjustment tool 390; the thermometer 394 corrects an inherent variation in the resistance vs. temperature characteristic of the temperature sensor 76n.

Next, the details of the supply current control apparatus illustrated in FIG. 23 will be explained. FIG. 25 is a control block diagram of a supply current control apparatus in a transmission control apparatus according to Embodiment 3 of the present invention. In the following explanation, there will be described a case where the microprocessor 321 in the control module 320Mn performs all the control items illustrated in FIG. 25, in collaboration with the program memory 323. In FIG. 25, in the control block 900aa, the microprocessor 321 receives a target pressure from engine control apparatus 310U through the communication line 309 and sets the target pressure. In the following control block 900bb, the detection output corresponding to a target hydraulic pressure on the abscissa is set in a converting manner by use of the discrete characteristic represented in FIG. 19(C) or 19(D); however, in the case where the control block 903bb, described later, is utilized, the detection output is set in a converting manner by use of the standard characteristic represented in FIG. 19(A).

In the case where the discrete characteristic is utilized in the control block 900bb, firstly, the resistance value of the label resistors 75n is read in the control block 900c so that the first or the second correction coefficient is calculated; then, the discrete characteristic represented in FIG. 19(C) or 19(D) is obtained by use of the standard characteristic graph FIG. 19(A) preliminarily stored in the program memory 323 and the calculated first or second correction coefficient.

In the control block 901a following the control block 900aa, the value on the abscissa, which is obtained by setting a target hydraulic pressure on the ordinate in the standard characteristic represented in FIG. 6, is determined as the target current. The standard characteristic represented in FIG. 6 is preliminarily stored in the program memory 323 and is read in the control block 901b. In the control block 901c, a target current Is is multiplied by a correction coefficient α; the correction coefficient α is calculated through the following equation when at the stage of outgoing adjustment for the supply current control apparatus 320U, a linear solenoid, as the standard sample, is connected with the supply current control apparatus, a target current Is0 is set by use of the adjustment tool 390, and the excitation current, for the linear solenoid, that is measured by the digital ampere meter 393 connected, as inspection equipment, with the adjustment tool 190 is If0.

The correction coefficient $\alpha = Is0/If0$

When it is desired to set the target current Is, the microprocessor 321 sets[α×Is], as a correction target current; as a result, the value of the actual excitation current If coincides with the initial target current Is. In this regard, however, when the correction coefficient α is calculated, the resistance value of the electromagnetic coil 71n is set to a predetermined reference value, and the power-supply voltage Vbb is measured at a predetermined reference voltage.

In the control block 902a, a control signal PWM having a conductive duty Kd based on the equation (2) below is generated.

$$Kd = Is \times Rt / Vbb \qquad (2)$$

where Is is the actual target current obtained through multiplication by the correction coefficient α, Rt is the resistance value, of the electromagnetic coil 71n at an ambient temperature detected by the temperature sensor 76n, that is calculated in the control block 902d, Vbb is the present value of the power-supply voltage Vbb calculated in the control block 902b, and the power-supply voltage Vbb is obtained by dividing the voltage, which has been inputted to the analogue input port AD5n and has been converted into a digital value, by the voltage division ratio determined by the division resistors 20n and 21n.

In the control block 903a, the input voltage, of the analogue input port AD2n, that is proportional to the output voltage of the pressure sensor 72n is converted into a digital value; in the control block 904, the PID signal is generated, based on a difference signal proportional to the difference between the target detection voltage set in the control block 900bb and the feedback detection voltage obtained in the control block 903a, and is algebraically added to the target pressure set in the control block 900aa.

In the case where in the control block 900bb, the target detection voltage is set through the standard characteristic represented in FIG. 19(A), the feedback detection voltage is corrected in the control blocks 903bb and 900 cc and then the difference between the target detection voltage and the feedback detection voltage may be calculated.

(2) Detailed Description of Operation

Next, the operations of a transmission control apparatus and an output characteristic adjustment method therefor according to Embodiment 3 of the present invention will be explained in detail.

Figure 26A:
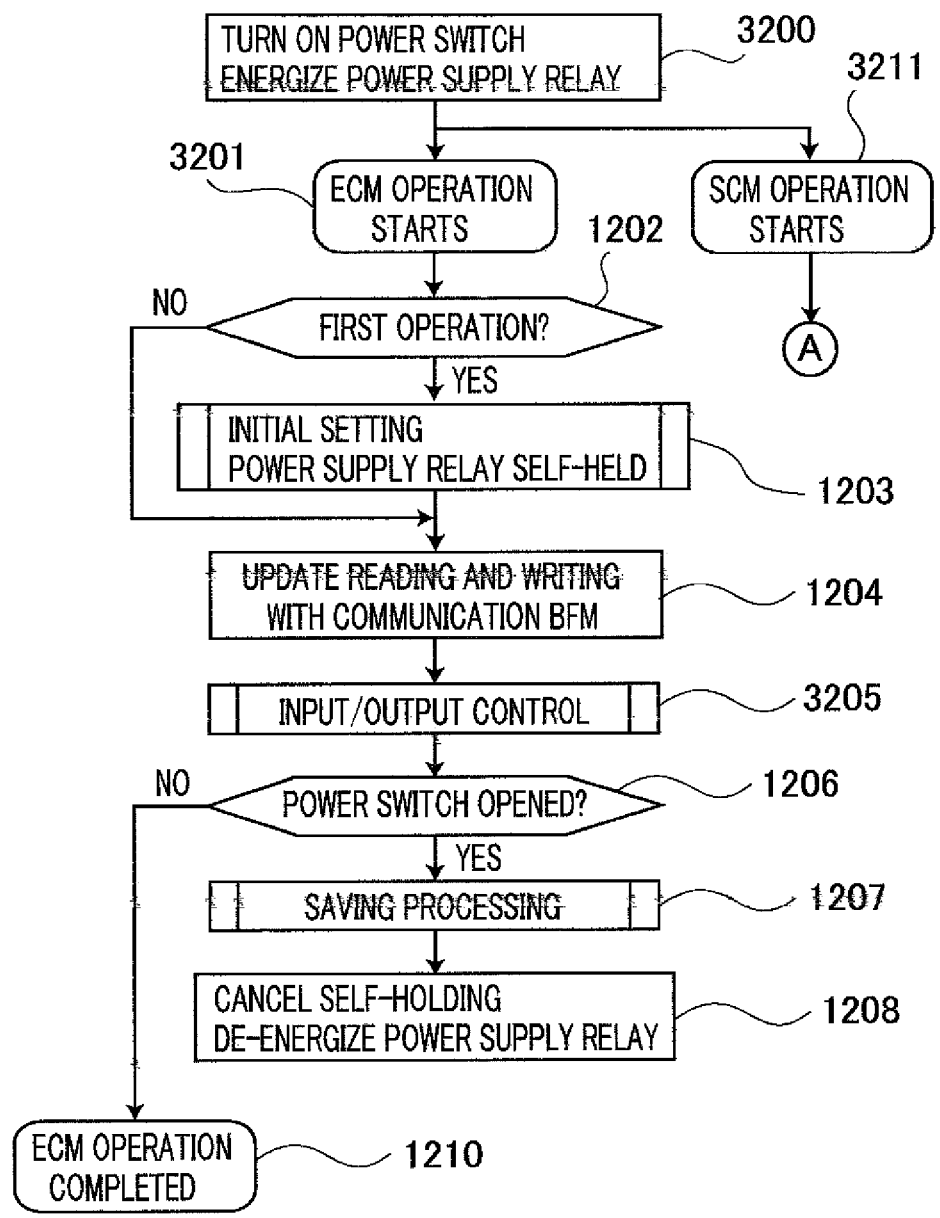
FIGS. 26A and 26B are a set of flowcharts representing the driving operation of a transmission control apparatus according to Embodiment 3 of the present invention.
Figure 26B:
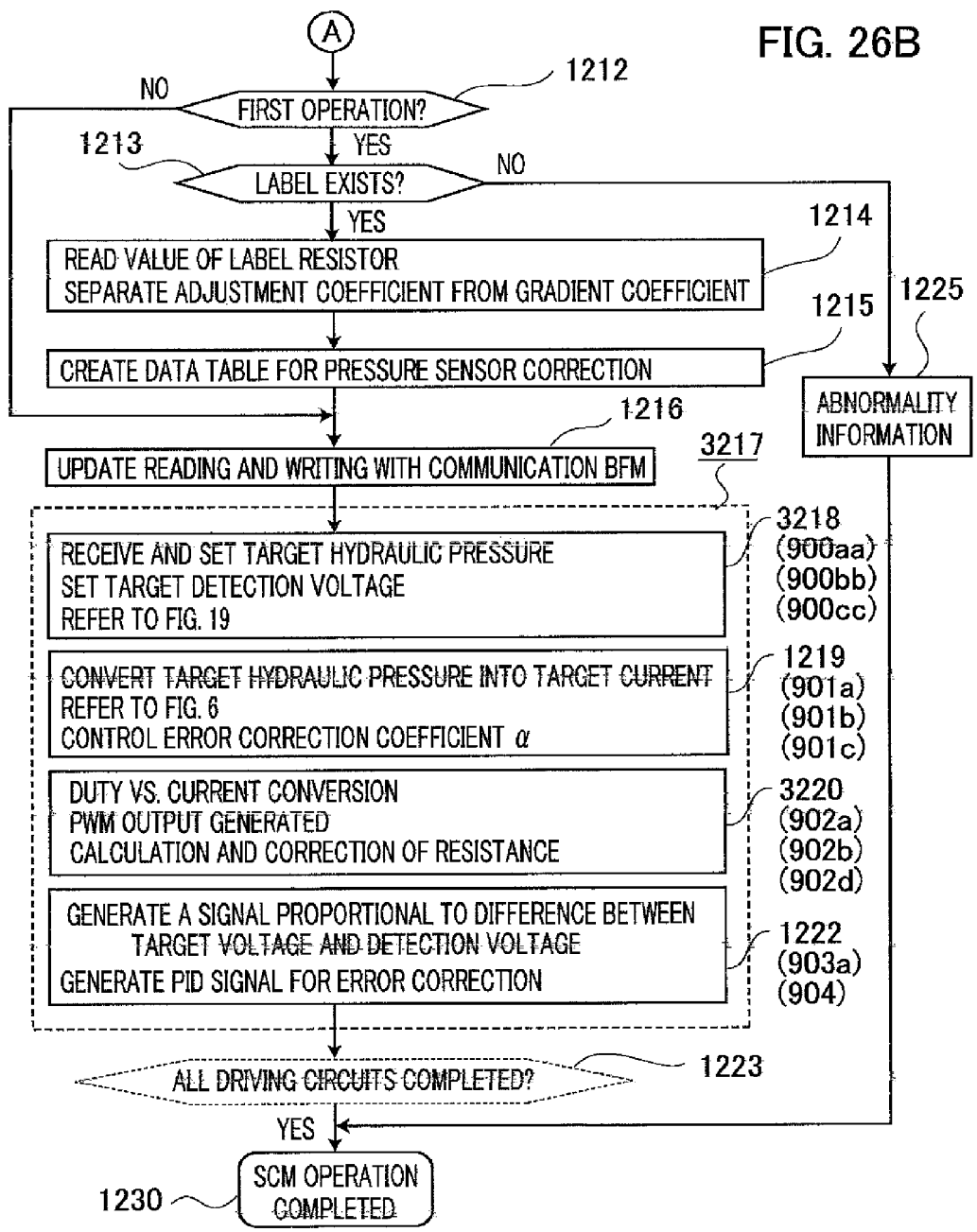

FIGS. 26A and 26B are a set of flowcharts representing the driving operation of a transmission control apparatus according to Embodiment 3 of the present invention. The flowchart of outgoing adjustment work for a linear solenoid is the same as that in FIG. 20; the flowchart of adjustment operation of a supply current control apparatus is the same as that in FIG. 21. In FIGS. 26A and 26B, the steps in which the same operation items as those in FIGS. 12A and 12B are performed are designated by the same reference numerals, and the steps in which different operation items are performed are designated by reference numerals in the 3000s; in the following explanation, the operation items of the steps in the 3000s will be described.

The main different point between Embodiment 1 and Embodiment 3, described below, is that in Embodiment 3, when receiving a target pressure command from the engine control apparatus 310U, the supply current control apparatus 320Un performs power-supply control of a single linear solenoid 307n, and a single label resistor 75n provides correction information for an inherent variation in the pressure detection characteristic. In the current detection resistor 16n and the differential amplifier 11n are not provided in Embodiment 3; however, the temperature sensor 76n for detecting the ambient temperature of the electromagnetic coil 71n is provided.

In the step 3200, an unillustrated power switch is closed; the power supply relay in FIG. 23 is energized so as to close the output contact 103; then, electric power is supplied to the engine control apparatus 310U and the supply current control apparatuses 320Ua through 320Un. In the step 3201, the constant voltage power source 310a in the engine control apparatus 310U generates a predetermined control voltage Vcc, so that the microprocessor 311 starts its operation; in the step 2211, the constant voltage power source 320a in the supply current control apparatus 320Un generates a predetermined control voltage Vcc, so that the microprocessor 321 starts its operation.

A series of steps following the step 3201 are the same as those in FIG. 12A; however, in the step block 3205 that replaces the step block 1205, the group of electric loads 305 is driven and controlled in response to the operation state of the first group of sensors 304, the operation state of the input signal received from the microprocessor 321 in the step 1204, and the contents of an input/output control program stored in the program memory 313; there is performed the control of the throttle valve opening degree, the fuel injection amount, and the ignition timing, in the case of a gasoline engine, in such a way that the engine output torque in accordance with the accelerator-pedal depressing degree and the engine rotation speed is generated; the transmission gear ratio is determined in response to the selection position of the gearshift lever, the accelerator-pedal depressing degree, and the vehicle speed; then, a command signal for the target pressure is issued to the supply current control apparatus (320Ua through 320Un) and is transmitted in the step 1204.

A series of steps following the step 3211 are the same as those in FIG. 12A; however, in the step 3218 in the step block 3217, in FIG. 26B, that corresponds to the step 1218 in the step block 1217n in FIG. 12, the target hydraulic pressure received from the engine control apparatus 310U in the step 1216 is set, and based on the pressure detection characteristic of the pressure sensor 72n created in the step 1215, the target detection output voltage in FIG. 19(C) or 19(D) is set.

Figure 25:
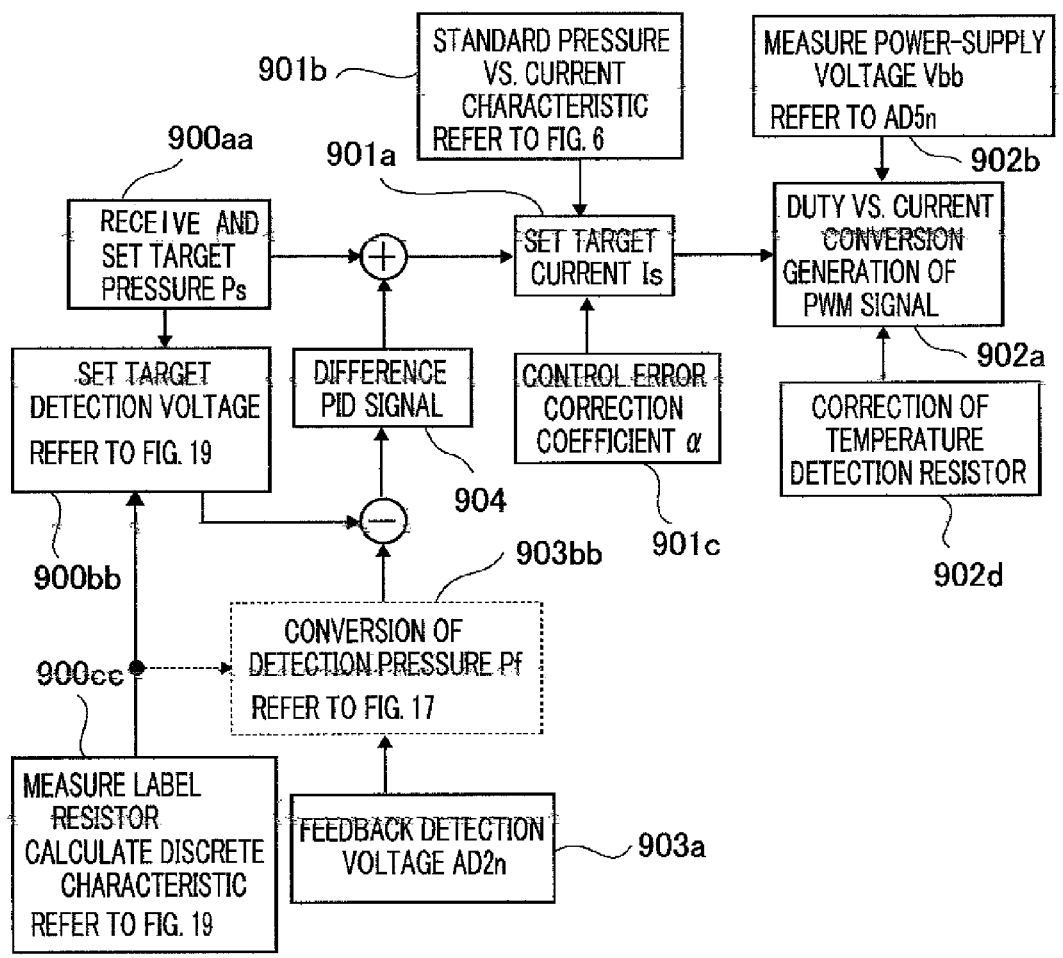
FIG. 25 is a control block diagram of a supply current control apparatus in a transmission control apparatus according to Embodiment 3 of the present invention.

The contents of the step 3218 are represented in the foregoing control blocks 900aa, 900bb, and 900 cc in FIG. 25. In the step 3220, as explained in the control blocks 902a, 902b, and 902d in FIG. 25, the conductive duty of the control on/off device 10n corresponding to the target current set in the step 1219 is calculated.

In the above explanation, the differential amplifier 12n is provided in the driving circuit (170n, 270n, and 370n); however, when the differential amplifier 12n is provided at the side of the linear solenoid (107n, 207n, 307), there is demonstrated a feature that the number of the signal lines between the supply current control apparatus and the linear solenoid can be reduced and it is not required to provide a preamplifier having an amplification factor the same as that of the differential amplifier 12n in the voltmeter (192, 292, 392) connected with the adjustment tool (190, 290, 390).

In the case where the standard characteristic of a linear solenoid is measured or the discrete characteristic of a specific linear solenoid is measured, it is also made possible to utilize devices that replace the foregoing supply current control apparatus and adjustment tool.

In the case where an inherent variation in the amplification factor of the differential amplifier 12n cannot be neglected, the detection voltage obtained by the voltmeter 192 and the digital conversion value, of the input voltage to the analogue input port AD2n, that is obtained by the multi-channel A/D converter 125 are compared with each other, so that a correction coefficient, with which they coincide with each other, can preliminarily be calculated.

(3) Gist and Feature of Embodiment 3

As is clear from the foregoing explanation, a transmission control apparatus (300a through 300n) according to Embodiment 3 of the present invention includes a linear solenoid (307a through 307n) that acts on the hydraulic pressure adjustment valve incorporated in a vehicle transmission and generates an adjustment hydraulic pressure output corresponding to a supply current, and a supply current control apparatus (320Ua through 320Un) for the linear solenoid.

In the linear solenoid, an electromagnetic coil 71n, a pressure sensor 72n that detects an adjusted hydraulic pressure, and a single label resistor 75n having a resistance value that serves as parameter data for correcting an inherent variation in the performance characteristic of the pressure sensor 72n are integrated with one another.

The supply current control apparatus is provided with a driving circuit (370a through 370n) that operates with a supply voltage Vbb, which is the output voltage of a power supply on/off device 310c connected between a vehicle battery 102 and all the plurality of linear solenoids or a discrete liner solenoid and a control voltage Vcc, which is the output voltage of a constant voltage power source 320a that is supplied with electric power from the vehicle battery 102; and a control module (320Ma through 320Mn).

The driving circuit is provided with a measurement circuit that measures the resistance value of a resistor for supplying electric power to the label resistor 75n and a control on/off device 10n that is discretely and directly connected with the other terminal of the linear solenoid.

The control module includes a microprocessor 321 that generates a command signal for controlling the conduction state of the control on/off device 10n, a RAM memory 322 that collaborates with the microprocessor, a program memory 323, a nonvolatile data memory 324 that is provided in part of the region of the program memory or is provided in such a way as to be separated from the program memory, and a multi-channel A/D converter 325 to which, as a reference voltage, the control voltage Vcc is applied.

The program memory 323 is provided with a control program that functions as a label resistor reading and conversion means 1215.

In collaboration with the driving circuits 370a through 370n, the microprocessor 321 controls an energizing current for the electromagnetic coil 71n in such a way that the adjusted hydraulic pressure detected by the pressure sensor 72n becomes equal to a target setting hydraulic pressure.

The label resistor reading and conversion means 1215 calculates the resistance value of the label resistor 75n based on the proportion of a measured current that flows from the measurement circuit to the label resistor 75n to a measured voltage applied to the label resistor 75n, calculates or selectively determines, based on the calculated resistance value, parameter data for correcting an inherent variation in the pressure detection characteristic of the pressure sensor 72n, and stores the parameter data in the data memory 324 or the RAM memory 322.

The label resistor reading and conversion means 1215 is implemented at an operation start timing when the power switch is turned on; even when a linear solenoid is replaced for maintenance, the pressure detection characteristic of the pressure sensor 72n can be corrected in accordance with the resistance values of label resistors added to the replaced linear solenoid.

The program memory 323 includes a control program that serves as a target current setting means 1219, and an equation or a data table that serves as a standard pressure vs. current characteristic data is stored in the program memory 323 or the data memory 324; the standard pressure vs. current characteristic is a characteristic obtained by averaging, through a plurality of samples, the characteristics, related to the adjusted hydraulic pressure vs. excitation current for the electromagnetic coil 71n, that are measured for the linear solenoids 307a through 307n by use of the ampere meter 393, the pressure detection device 391b, and the pressure gauge 391a provided as test equipment; the target current setting means 1219 calculates the target current, corresponding to a target adjusted hydraulic pressure, that is obtained from the standard characteristic data and sets a target excitation current value for the electromagnetic coil 71*n*; and the microprocessor 321 and the driving circuits 370*a* through 370*n* collaborate with one another and correct the target current at least through an error integration value when there exists an error between the target hydraulic pressure and the corrected detection hydraulic pressure.

The feature of this configuration is the same as the feature described in Embodiment 1.

The program memory 323 or the data memory 324 stores adjustment data, which is a control error correction coefficient α, and the target current setting means 1219 includes a control program that serves as a current control error correction means; with regard to the adjustment data, the correction coefficient α is calculated through the equation [α=Is °/If0], when at the stage of outgoing adjustment for the supply current control apparatus (320Ua through 320Un), a linear solenoid, as the standard sample, is connected with the supply current control apparatus, a target current Is0 is set by use of the adjustment tool 390 connected with the microprocessor 321, and the value of the excitation current, for the linear solenoid, that is measured by the digital ampere meter 393 connected, as inspection equipment, with the adjustment tool 390 is If0; when it is desired to set the target current Is, the microprocessor 321 sets[α×Is], as a correction target current; as a result, the value of the actual excitation current If coincides with the initial target current Is.

The feature of this configuration is the same as the feature described in Embodiment 1.

The linear solenoid (307*a* through 307*n*) includes a temperature sensor 76*n* provided in the vicinity of the electromagnetic coil 71*n*; the driving circuit (370*a* through 370*n*) includes a measurement circuit for the resistance value of the temperature sensor 76*n*.

The resistance value of the temperature sensor 76*n* is obtained by dividing the voltage across the temperature sensor 76*n* by the current flowing in the temperature sensor 76*n*.

The program memory 323 further includes a control program that functions as a conductive duty calculation means 3220; the program memory 323 or the data memory 324 includes calculation equations or a data table for the resistance value vs. temperature characteristic of the temperature sensor 76*n* and the resistance value vs. temperature characteristic of the electromagnetic coil 71*n*.

Based on the resistance value and the resistance value vs. temperature characteristic of the temperature sensor 76*n*, the conductive duty calculation means 3220 calculates the resistance value Rt of the electromagnetic coil 71*n* at the present temperature; letting Is denote the target current, and letting Vbb denote the power-supply voltage, the conductive duty calculation means 3220 calculates the conductive duty Kd, which is the proportion of the circuit-closing time of the control on/off device 10*n* to the on/off cycle thereof, through the equation (2) below.

$$Kd = Is \times Rt / Vbb \quad (2)$$

As described above, the conductive duty of the control on/off device is calculated in accordance with the present-temperature resistance value, of the electromagnetic coil, that is detected by the temperature sensor, the target current, and the power-supply voltage.

Accordingly, there is demonstrated a feature that even when the resistance value of the electromagnetic coil changes due to self-heating thereof or a change in the ambient temperature, an excitation current near to the target excitation current is obtained and hence when the target hydraulic pressure is changed, the transient error in the adjusted hydraulic pressure can further be suppressed.

Moreover, because no negative feedback control regarding current control is performed, there is demonstrated a feature that a low-ripple excitation current can be supplied.

Each of the supply current control apparatuses 320Ua through 320Un collaborates with the engine control apparatus 310U provided outside the gearbox so as to perform communication of input/output signals with each other; the engine control apparatus 310U selectively determines the linear solenoids 307*a* through 307*n* to be energized, sets a target hydraulic pressure for the selected linear solenoid, and transmits the set target hydraulic pressure to the supply current control apparatuses 320Ua through 320Un; the supply current control apparatus (320Ua through 320Un) is provided in the transmission case in such a way as to be integrated with corresponding one of the plurality of linear solenoids 307*a* through 307*n* through connecter connection and includes a control module (320Ma through 320Mn) that generates a command signal for obtaining the target hydraulic pressure commanded by the engine control apparatus 310U and a driving circuit (370*a* through 370*n*) that supplies a driving current to the linear solenoid (307*a* through 307*n*).

The feature of this configuration is the same as the feature described in Embodiment 2.

In an opening/closing manner, the linear solenoid (307*a* through 307*n*) drives the relief valve 43*b*, which is a hydraulic pressure adjustment valve, by use of the plunger 43*a* on which electromagnetic force produced by the electromagnetic coil 71*n* and repulsive force caused by the spring 44 are exerted, so that at a predetermined oil temperature, there is obtained a predetermined adjusted hydraulic pressure corresponding to the supply current for the electromagnetic coil 71*n*; and the pressure sensor 72*n* is a strain gauge to which an adjusted hydraulic pressure is applied through the communication tube 45*c* from the pipe portion 48*a*, which is a path for the activation oil 49*b*, and the pressure sensor 72*n* and the label resistor 75*n* are molded integrally with each other with the sealing resin 50.

The feature of this configuration is the same as the feature described in Embodiment 1.

In the foregoing explanation, as the correction coefficients, the adjustment coefficient and the gradient coefficient are utilized; however, a single straight line can also be specified by determining two comparison coordinates and utilizing a pair of adjustment coefficients. It has been described that each of the adjustment coefficient and the gradient coefficient is a proportion of the discrete characteristic to the standard characteristic and that the discrete characteristic can be obtained by multiplying the standard characteristic by the adjustment coefficient or the gradient coefficient.

However, the discrete characteristic can also be obtained in such a manner that instead of the adjustment coefficient or the gradient coefficient, a bias adjustment value or a gradient adjustment value, which is a deviation value obtained by subtracting the standard characteristic from the inherent characteristic, and the bias adjustment value or the gradient adjustment value is algebraically added to the standard characteristic.

For example, letting K (=θn/θ0) denote the gradient coefficient, the discrete gradient angle θn is calculated according to the equation "θn=K×θ0", when the standard gradient angle θ0 is known.

Similarly, letting Δθ (=θn−θ0) denote the gradient coefficient, the discrete gradient angle θn is calculated according to the equation "θ=θ0+Δθ=θ0×(1+Δθ/θ0)", when the standard gradient angle θ0 is known. Addition of the deviation value Δθ corresponds to multiplication by (1+Δθ/θ0), as a coefficient.

Therefore, the concept of the correction coefficient is represented assuming that the correction coefficient includes these algebraically added values.

Various modifications and alterations of this invention will be apparent to those skilled in the art without departing from the scope and spirit of this invention, and it should be understood that this is not limited to the illustrative embodiments set forth herein.

What is claimed is:

1. A transmission control apparatus comprising:
    a plurality of linear solenoids, each of which acts on a hydraulic pressure adjustment valve incorporated in a vehicle transmission and generates an adjustment hydraulic pressure output corresponding to a supply current; and
    a supply current control apparatus that controls the supply current for the linear solenoid,
    wherein in the linear solenoid, an electromagnetic coil, a pressure sensor that detects an adjusted hydraulic pressure that has been adjusted through the adjustment hydraulic pressure output, and a single or a plurality of label resistors having a resistance value that serves as parameter data for correcting an inherent variation in the performance characteristic of the pressure sensor are integrated with one another,
    wherein the supply current control apparatus includes a control module and a driving circuit that operates with a supply voltage, which is the output voltage of a power supply on/off device connected between a vehicle battery and all the plurality of linear solenoids or between the vehicle battery and each of the linear solenoids, and with a control voltage, which is the output voltage of a constant voltage power source that is supplied with electric power from the vehicle battery,
    wherein the driving circuit is provided with a measurement circuit for measuring the resistance value of the label resistor and a control on/off device that is discretely and seriously connected with the other terminal of the linear solenoid,
    wherein the control module includes a microprocessor that generates a command signal for controlling the conduction state of the control on/off device, a RAM memory that collaborates with the microprocessor, a program memory, a nonvolatile data memory that is provided in part of the region of the program memory or is provided in such a way as to be separated from the program memory, and a multi-channel A/D converter to which, as a reference voltage, the control voltage is applied,
    wherein the program memory includes a control program that functions as a label resistor reading and conversion means,
    wherein in collaboration with the driving circuit, the microprocessor controls an energizing current for the electromagnetic coil in such a way that the adjusted hydraulic pressure detected by the pressure sensor becomes equal to a target setting hydraulic pressure,
    wherein the label resistor reading and conversion means operates in such a way as to calculate the resistance value of the label resistor based on the proportion of a measured current that flows from the measurement circuit to the label resistor to a measured voltage applied to the label resistor, in such a way as to calculate or selectively determine parameter data for correcting an inherent variation in the pressure detection characteristic of the pressure sensor, based on the calculated resistance value, and in such a way as to store the parameter data in the data memory or the RAM memory, and
    wherein the operation of the label resistor reading and conversion means is implemented at an operation start timing when the power switch is turned on, and even when the linear solenoid is replaced for maintenance, the pressure detection characteristic of the pressure sensor is adjusted in accordance with the resistance value of a label resistor added to a replacement linear solenoid.

2. The transmission control apparatus according to claim 1, wherein the label resistor is sealed in an airtight manner with a sealing resin and is formed of a laser-trimming resistor, the resistance value of which is adjusted through an adjusting window provided in the sealing resin, while the resistance value is measured and monitored.

3. The transmission control apparatus according to claim 1, wherein the label resistor includes a plurality of first resistors that are connected in series with one another; and a plurality of second resistors, one end of each of which is connected with the starting position of the series circuit in which the plurality of first resistors are connected in series with one another, the ending position thereof, or a connection position where the first resistors are connected with each other, the other ends of which are selectively connected with one another by way of shorting/opening terminals, and which configure a ladder circuit along with the plurality of first resistors, and
    wherein the shorting/opening terminal is disposed at a window opening in a sealing resin that seals the plurality of first resistors and the plurality of second resistors in an airtight manner.

4. The transmission control apparatus according to claim 1, wherein a digital conversion value of the resistance value of the label resistor measured by the microprocessor is utilized in such a way as to be divided into a group of high-order bits and a group of low-order bits; any one of the group of high-order bits and the group of low-order bits of the label resistor is a first parameter for selecting an adjustment coefficient, which is the proportion of a detection output of the pressure sensor corresponding to a predetermined hydraulic pressure to a standard detection pressure, which is the average value of detection outputs of a plurality of samples, and the other one of the group of high-order bits and the group of low-order bits of the label resistor is a second parameter for selecting a gradient coefficient, which is the proportion of the gradient of a detection output vs. hydraulic pressure characteristic to a standard gradient, which is the average value of the gradients of detection output vs. hydraulic pressure characteristics of a plurality of samples; or the group of high-order bits and the group of low-order bits of the label resistor represent first and second adjustment coefficients, which are proportions of the first and second detection outputs of the pressure sensor corresponding to first and second predetermined hydraulic pressures to the first and second standard detection outputs, which are the respective average values of the detection outputs of the plurality of samples, and one of the first and second adjustment coefficients becomes the first parameter, and based on the first and second adjustment coefficients, the gradient coefficient is calculated and becomes the second parameter.

5. An output characteristic adjustment method for a transmission control apparatus, wherein the output characteristic adjustment method is to adjust the output characteristic of the transmission control apparatus according to claim 1, wherein standard detection characteristic data, as an average characteristic, based on the relationship between a plurality of actually measured hydraulic pressures obtained by measuring hydraulic pressures applied to pressure sensors for a plurality of linear solenoids, as samples, and a plurality of actually measured detection output voltages obtained by measuring the output voltages of the pressure sensors is stored in the program memory or the data memory in the transmission control apparatus, wherein discrete detection characteristic data based on the relationship between an actually measured hydraulic pressure obtained by measuring a hydraulic pressure applied to the pressure sensor for the linear solenoid and an actually measured detection output voltage obtained by measuring the output voltage of the pressure sensor is stored in the program memory or the data memory, wherein the standard detection characteristic data is approximated with a standard broken-line characteristic consisting of a first line segment having a first gradient $\theta10$ and a second line segment having a second gradient $\theta20$, and includes first standard data (P10, V10, $\theta10$) based on a first actually measured pressure P10 and a first detection output V10 on the first line segment and second standard data (P20, V20, $\theta20$) based on a second actually measured pressure P20 and a second detection output V20 on the second line segment, wherein the discrete detection characteristic data is approximated with a discrete broken-line characteristic consisting of a first line segment having a first gradient $\theta1n$ and a second line segment having a second gradient $\theta2n$, and includes first discrete data (P10, V1$n$, $\theta1n$) based on the first actually measured pressure P10 and a first detection output V1$n$ on the first line segment and second discrete data (P20, V2$n$, $\theta2n$) based on the second actually measured pressure P20 and a second detection output V2$n$ on the second line segment, wherein the resistance values of one group of the plurality of label resistors are adjusted to resistance values for specifying the value of the first adjustment coefficient (V1$n$/V10) based on the first detection output V1$n$ in the first discrete data and the first detection output V10 in the first standard data and the value of the first gradient coefficient ($\theta1n/\theta10$) based on the first gradient $\theta1n$ in the first discrete data and the first gradient $\theta10$ in the first standard data, wherein the resistance values of the other group of the plurality of label resistors are adjusted to resistance values for specifying the value of the second adjustment coefficient (V2$n$/V20) based on the second detection output V2$n$ in the second discrete data and the second detection output V20 in the second standard data and the value of the second gradient coefficient ($\theta2n/\theta20$) based on the second gradient $\theta2n$ in the second discrete data and the second gradient $\theta20$ in the second standard data, and wherein the microprocessor reads the resistance values of the plurality of label resistors and extracts, through predetermined equations or a data table, the values of the first adjustment coefficient (V1$n$/V10) and the first gradient coefficient ($\theta1n/\theta10$), which configure a first correction coefficient, and the values of the second adjustment coefficient (V2$n$/V20) and the second gradient coefficient ($\theta2n/\theta20$), which configure a second correction coefficient, specifies the equation for the first line segment in the discrete detection characteristic, based on the first standard data (P10, V10, $\theta10$) and the first correction coefficient, specifies the equation for the second line segment in the discrete detection characteristic, based on the second standard data (P20, V20, $\theta20$) and the second correction coefficient, and obtains, based on the specified discrete broken-line characteristic, an adjusted detection hydraulic pressure from the detection output of the pressure sensor.

6. The output characteristic adjustment method, for a transmission control apparatus, according to claim 5, wherein the standard detection characteristic data stored in the program memory or the data memory further includes a curvature radius, as third standard data, for arc-interpolating a portion where the first line segment and the second line segment in the standard detection characteristic data cross each other; and the portion where the first line segment and the second line segment in the discrete detection characteristic data cross each other is arc-interpolated by use of the curvature radius stored as the third standard data.

7. An output characteristic adjustment method for a transmission control apparatus, wherein the output characteristic adjustment method is to adjust the output characteristic of the transmission control apparatus according to claim 1, wherein standard detection characteristic data, as an average characteristic, based on the relationship between a plurality of actually measured hydraulic pressures obtained by measuring hydraulic pressures applied to pressure sensors for a plurality of linear solenoids, as samples, and a plurality of actually measured detection output voltages obtained by measuring the output voltages of the pressure sensors is stored in the program memory or the data memory in the transmission control apparatus, wherein discrete detection characteristic data based on the relationship between an actually measured hydraulic pressure obtained by measuring a hydraulic pressure applied to the pressure sensor for the linear solenoid and an actually measured detection output voltage obtained by measuring the output voltage of the pressure sensors is stored in the program memory or the data memory, wherein the standard detection characteristic data is approximated with a standard broken-line characteristic consisting of a first line segment and a second line segment; there is calculated a combination line in such a way that the relative error between the first line segment and the combination line and the relative error between the second line segment and the combination line become minimal; and the standard detection characteristic data is configured with standard data (P0, V0, $\theta0$) including a detection output V0 on the combination line corresponding to a predetermined actually measured pressure P0 and the gradient $\theta0$ of the combination line and with difference data $\Delta$Vi0, which is the error between the average characteristic corresponding to the plurality of actually measured pressures Pi and the combination line, wherein the discrete detection characteristic data is approximated with a discrete broken-line characteristic consisting of a first line segment and a second line segment; there is calculated a combination line in such a way that the relative error between the first line segment and the combination line and the relative error between the second line segment and the combination line become minimal; and the discrete detection characteristic data is configured with discrete data (P0, Vn, θn) including a detection output Vn on the combination line corresponding to the predetermined actually measured pressure P0 and the gradient θn of the combination line, wherein the resistance value of the label resistor is adjusted to a resistance value for specifying the value of a first adjustment coefficient (Vn/V10) based on the detection output Vn on the combination line in the discrete detection characteristic and the detection output V0 on the combination line in the standard detection characteristic and the value of a first gradient coefficient (θn/θ0) based on the gradient θn of the combination line in the discrete detection characteristic and the gradient θ0 of the combination line in the standard detection characteristic, wherein the microprocessor reads the resistance value of the label resistor and extracts, through predetermined equations or a data table, the values of the first adjustment coefficient (Vn/V0) and the first gradient coefficient (θn/θ0), which configure the first correction coefficient, specifies a combination line, which is the same as the combination line for the discrete detection characteristic, based on the standard data (P0, V0, θ0) and the first correction coefficient, specifies a first correction broken line characteristic consisting of a first line segment and a second line segment, by algebraically adding the difference data ΔVi0 to the specified combination line, and obtains, through the specified first correction broken line characteristic, an adjusted detection hydraulic pressure from the detection output of the pressure sensor.

8. The output characteristic adjustment method, for a transmission control apparatus, according to claim 7, wherein a second adjustment coefficient (Vnn/V0) and a second gradient coefficient (θnn/θ0), which configure a second correction coefficient, are calculated based on the values of the first adjustment coefficient (Vn/V0) and the first gradient coefficient (θn/θ0), which configure the first correction coefficient; and the second correction coefficient is obtained by calculating the values of the second adjustment coefficient (Vnn/V0) and the second gradient coefficient (θnn/θ0) in such a way that the relative errors, between the first line segment and the second line segment in the first correction broken line characteristic and the first line segment and the second line segment in the discrete broken line characteristic, that are obtained when the values of the first adjustment coefficient (Vn/V0) and the first gradient coefficient (θn/θ0) are slightly increased or decreased become minimal, wherein the resistance value of the label resistor is adjusted to a resistance value for specifying the values of the second adjustment coefficient (Vnn/V0) and the second gradient coefficient (θnn/θ0) related to the combination line, and wherein the microprocessor specifies a combination line by use of the standard data (P0, V0, θ0) and the second correction coefficient read from the resistance value of the label resistor, specifies a second correction broken line characteristic consisting of a first line segment and a second line segment, by algebraically adding the difference data ΔVi0 to the specified combination line, and obtains, through the specified second correction broken line characteristic, an adjusted detection hydraulic pressure from the detection output of the pressure sensor.

9. The transmission control apparatus according to claim 1, wherein the program memory includes a control program that functions as a target current setting means, wherein the program memory or the data memory stores an equation or a data table, which is a standard pressure vs. current characteristic data, wherein the standard pressure vs. current characteristic is a characteristic obtained by averaging the adjusted hydraulic pressure vs. electromagnetic-coil excitation current characteristics that are measured for a plurality of linear solenoid samples, by use of an ampere meter, a pressure detection device, and a pressure gauge provided as test equipment, and wherein the target current setting means calculates a target current that corresponds to a target adjusted hydraulic pressure and is obtained from the standard characteristic data, and sets a target excitation current value for the electromagnetic coil; and the microprocessor and the driving circuit collaborate with each other and correct the target current at least through an error integration value when there exists an error between the target hydraulic pressure and the adjusted detection hydraulic pressure.

10. The transmission control apparatus according to claim 9, wherein the program memory or the data memory stores adjustment data, which is a correction coefficient α for a control error, wherein the target current setting means includes a control program that functions as a current control error correction means, wherein with regard to the adjustment data, the correction coefficient α is calculated through the equation [α=Is0/If0], when at the stage of outgoing adjustment for the supply current control apparatus, a linear solenoid, as a standard sample, is connected with the supply current control apparatus, a target current Is0 is set by use of an adjustment tool connected with the microprocessor, and the value of an excitation current, for the linear solenoid, that is measured by an ampere meter connected, as inspection equipment, with the adjustment tool is If0, and wherein when it is desired to set a target current Is, the microprocessor sets [α×Is], as a correction target current, so that the value of the actual excitation current If coincides with the initial target current Is, or leaving the target current Is as it is, the microprocessor sets a negative feedback detection current to If/α so that the actual excitation current If coincides with the initial target current Is.

11. The transmission control apparatus according to claim 9, wherein the program memory further includes a control program that functions as a conductive duty calculation means and a control program that functions as a current feedback control means, wherein the driving circuit is provided with a current detection resistor connected in series with the electromagnetic coil and amplifies the voltage across the current detection resistor so as to generate a current detection signal proportional to the excitation current for the electromagnetic coil, and wherein letting Rc denote the resistance value of the electromagnetic coil at a reference temperature, letting Is denote a target current, and letting Vbb denote the power-supply voltage, the conductive duty calculation means calculates the conductive duty Kd, which is the proportion of a circuit-closing time of the control on/off device to the on/off cycle thereof, through the equation (1) below; and in the case where there exists an error between the target current Is and the detection current obtained through the current detection resistor, the current feedback control means corrects the conductive duty Kd in an increasing manner or in a decreasing manner as an error integration value increases or decreases $$Kd = Is \times Rc / Vbb \quad (1)$$

12. The transmission control apparatus according to claim 10,
wherein the program memory further includes a control program that functions as a conductive duty calculation means and a control program that functions as a current feedback control means,
wherein the driving circuit is provided with a current detection resistor connected in series with the electromagnetic coil and amplifies the voltage across the current detection resistor so as to generate a current detection signal proportional to the excitation current for the electromagnetic coil, and
wherein letting Rc denote the resistance value of the electromagnetic coil at a reference temperature, letting Is denote a target current, and letting Vbb denote the power-supply voltage, the conductive duty calculation means calculates the conductive duty Kd, which is the proportion of a circuit-closing time of the control on/off device to the on/off cycle thereof, through the equation (1) below; and in the case where there exists an error between the target current Is and the detection current obtained through the current detection resistor, the current feedback control means corrects the conductive duty Kd in an increasing manner or in a decreasing manner as an error integration value increases or decreases $$Kd = Is \times Rc / Vbb \quad (1)$$

13. The transmission control apparatus according to claim 11,
wherein the conductive duty calculation means further calculates the resistance value of the electromagnetic coil at a present temperature and makes the conductive duty Kd change in proportion to the calculated present resistance value; the present resistance value is obtained by calculating an average applied voltage, as the moving-average value of the multiplication products of the power-supply voltage Vbb and the conductive duty Kd in a plurality of on/off cycles of the control on/off device over the immediate past time, by calculating an average current, as the moving-average value of detection currents during the same period, and by dividing the average applied voltage by the average current; and immediately after the start of driving, a predetermined fixed constant, which is the resistance value of the electromagnetic coil at the reference temperature, is utilized.

14. The transmission control apparatus according to claim 9,
wherein the linear solenoid is provided with a temperature sensor disposed in the vicinity of the electromagnetic coil,
wherein the driving circuit includes a measurement circuit for the resistance value of the temperature sensor,
wherein the resistance value of the temperature sensor is obtained by dividing the voltage across the temperature sensor by the current flowing in the temperature sensor,
wherein the program memory further includes a control program that functions as a conductive duty calculation means,
wherein the program memory or the data memory includes calculation equations or a data table for the resistance value vs. temperature characteristic of the temperature sensor and the resistance value vs. temperature characteristic of the electromagnetic coil, and
wherein based on the resistance value and the resistance value vs. temperature characteristic of the temperature sensor, the conductive duty calculation means calculates the resistance value Rt of the electromagnetic coil at the present temperature; letting Is denote the target current, and letting Vbb denote the power-supply voltage, the conductive duty calculation means calculates the conductive duty Kd, which is the proportion of the circuit-closing time of the control on/off device to the on/off cycle thereof, through the equation (2) below $$Kd = Is \times Rt / Vbb \quad (2)$$

15. The transmission control apparatus according to claim 10,
wherein the linear solenoid is provided with a temperature sensor disposed in the vicinity of the electromagnetic coil,
wherein the driving circuit includes a measurement circuit for the resistance value of the temperature sensor,
wherein the resistance value of the temperature sensor is obtained by dividing the voltage across the temperature sensor by the current flowing in the temperature sensor,
wherein the program memory further includes a control program that functions as a conductive duty calculation means,
wherein the program memory or the data memory includes calculation equations or a data table for the resistance value vs. temperature characteristic of the temperature sensor and the resistance value vs. temperature characteristic of the electromagnetic coil, and
wherein based on the resistance value and the resistance value vs. temperature characteristic of the temperature sensor, the conductive duty calculation means calculates the resistance value Rt of the electromagnetic coil at the present temperature; letting Is denote the target current, and letting Vbb denote the power-supply voltage, the conductive duty calculation means calculates the conductive duty Kd, which is the proportion of the circuit-closing time of the control on/off device to the on/off cycle thereof, through the equation (2) below $$Kd = Is \times Rt / Vbb \quad (2)$$

16. The transmission control apparatus according to claim 1,
wherein the supply current control apparatus and an engine control apparatus, which are provided separately from each other, collaborate with each other and perform communication of input/output signals with each other; and the supply current control apparatus is provided on the external wall of the case of a transmission or on the internal wall of the case,
wherein the plurality of linear solenoids are provided inside the transmission case and are connected with the supply current control apparatus through connectors, and
wherein the supply current control apparatus includes a single control module that selectively determines the linear solenoid to be energized, sets a target hydraulic pressure for the selectively determined linear solenoid, and generates a command signal for obtaining the set target hydraulic pressure, and driving circuits that supply driving currents to the respective linear solenoids.

17. The transmission control apparatus according to claim 1,
- wherein the supply current control apparatus and an engine control apparatus provided outside a gearbox collaborate with each other so as to perform communication of input/output signals with each other,
- wherein the engine control apparatus selectively determines the linear solenoid to be energized, sets a target hydraulic pressure for the selectively determined linear solenoid, and transmits the set target hydraulic pressure to the supply current control apparatus, and
- wherein the supply current control apparatus is provided in the transmission case in such a way as to be integrated with corresponding one of the plurality of linear solenoids through connecter connection and includes a control module that generates a command signal for obtaining a target hydraulic pressure commanded by the engine control apparatus and a driving circuit that supplies a driving current to the linear solenoid.

18. The transmission control apparatus according to claim 16,
- wherein the linear solenoid drives a relief valve, which is the hydraulic pressure adjustment valve, in an opening/closing manner by use of a plunger on which electromagnetic force produced by the electromagnetic coil and repulsive force caused by a spring are exerted, so that at a predetermined oil temperature, a predetermined hydraulic pressure corresponding to a supply current for the electromagnetic coil is obtained, and
- wherein the pressure sensor is a strain gauge to which an adjusted hydraulic pressure is applied through the communication tube from the pipe portion, which is a path for the activation oil, and the pressure sensor and the label resistor are molded integrally with each other with a sealing resin.

19. The transmission control apparatus according to claim 17,
- wherein the linear solenoid drives a relief valve, which is the hydraulic pressure adjustment valve, in an opening/closing manner by use of a plunger on which electromagnetic force produced by the electromagnetic coil and repulsive force caused by a spring are exerted, so that at a predetermined oil temperature, a predetermined hydraulic pressure corresponding to a supply current for the electromagnetic coil is obtained, and
- wherein the pressure sensor is a strain gauge to which an adjusted hydraulic pressure is applied through the communication tube from the pipe portion, which is a path for the activation oil, and the pressure sensor and the label resistor are molded integrally with each other with a sealing resin.

* * * * *